United States Patent [19]
Nago

[11] Patent Number: 5,974,101
[45] Date of Patent: Oct. 26, 1999

[54] SPREAD SPECTRUM MODULATION COMMUNICATION APPARATUS FOR NARROW BAND INTERFERENCE ELIMINATION

[75] Inventor: Hidetada Nago, Yokohama, Japan

[73] Assignee: Canon Kabushiki Kaisha, Tokyo, Japan

[21] Appl. No.: 08/461,239

[22] Filed: Jun. 5, 1995

Related U.S. Application Data

[63] Continuation of application No. 08/053,915, Apr. 28, 1993.

[30] Foreign Application Priority Data

| Apr. 28, 1992 | [JP] | Japan | 4-136340 |
| Apr. 28, 1992 | [JP] | Japan | 4-136341 |
| May 25, 1992 | [JP] | Japan | 4-157455 |

[51] Int. Cl.$^6$ ............................................ H04B 1/10
[52] U.S. Cl. .................... 375/350; 375/206; 375/349; 455/307
[58] Field of Search ........................ 375/206, 350, 375/200, 346, 349; 455/307

[56] References Cited

U.S. PATENT DOCUMENTS

| 3,478,268 | 11/1969 | Coviello | 375/200 |
| 3,614,626 | 10/1971 | Dillard | 375/346 |
| 3,988,679 | 10/1976 | Clarke et al. | 455/306 |
| 4,398,296 | 8/1983 | Gott et al. | 375/200 |
| 4,812,851 | 3/1989 | Giubardo | 455/307 |
| 4,823,361 | 4/1989 | Yoshida | 375/349 |
| 4,947,361 | 8/1990 | Smith et al. | 455/306 |
| 4,958,359 | 9/1990 | Kato | 375/1 |
| 4,992,798 | 2/1991 | Nozue et al. | 455/296 |
| 5,046,101 | 9/1991 | Lovejoy | 381/57 |
| 5,058,139 | 10/1991 | Egler | 375/350 |
| 5,084,899 | 1/1992 | Harrington | 375/200 |
| 5,148,413 | 9/1992 | Endo et al. | 375/1 X |
| 5,168,508 | 12/1992 | Iwasaki et al. | 375/1 |
| 5,177,767 | 1/1993 | Kato | 375/1 |
| 5,185,762 | 2/1993 | Schilling | 375/200 |
| 5,222,106 | 6/1993 | Satoh et al. | 375/350 |
| 5,223,807 | 6/1993 | Konishi et al. | 375/350 |
| 5,228,053 | 7/1993 | Miller et al. | 375/1 |
| 5,235,612 | 8/1993 | Stilwell et al. | 375/1 |
| 5,239,556 | 8/1993 | Ishigaki et al. | 375/200 |
| 5,351,269 | 9/1994 | Schilling | 375/200 |
| 5,361,074 | 11/1994 | Hansen | 455/283 |
| 5,410,750 | 4/1995 | Cantwell et al. | 375/200 |
| 5,442,593 | 8/1995 | Woodbury et al. | 367/135 |

FOREIGN PATENT DOCUMENTS

| 61-255146 | 11/1986 | Japan | 375/350 |

OTHER PUBLICATIONS

DiPietro, R.C., "An FFT Based Technique for Suppressing Narrow–Band Interference in PN Spread Spectrum Communications Systems," 1989 IEEE Conf. on Acoutics, Speech and Signal Processing, pp. 1360–3, 1989.

A.B. Carlson, Communication Systems. New York: McGraw-Hill Book Company, pp. 286–8, 1986.

*Primary Examiner*—Stephen Chin
*Assistant Examiner*—Jeffrey Gluck
*Attorney, Agent, or Firm*—Morgan & Finnegan LLP

[57] ABSTRACT

A wireless communication apparatus employing spread spectrum modulation which detects and eliminates interference waves and temporarily stops and restarts communication for maintaining fine communication status. If the interference wave frequency band is known, a reception signal of the frequency band is eliminated. Communication is temporarily halted and restarted corresponding to interference occurrence period and/or radiowave propagation condition, and communication status is notified to a user. Further, if the interference wave occurrence period is unknown, the frequency of the interference wave is detected and a signal of the detected frequency is eliminated. In a case where communication is performed in packet form, the number of packets which can be transmitted sequentially without receiving reception confirmation is controlled based on the radiowave propagation condition. Moreover, a reception signal can be divided into a plurality of frequency band signals and interference wave detection can be performed in band signal units.

10 Claims, 54 Drawing Sheets

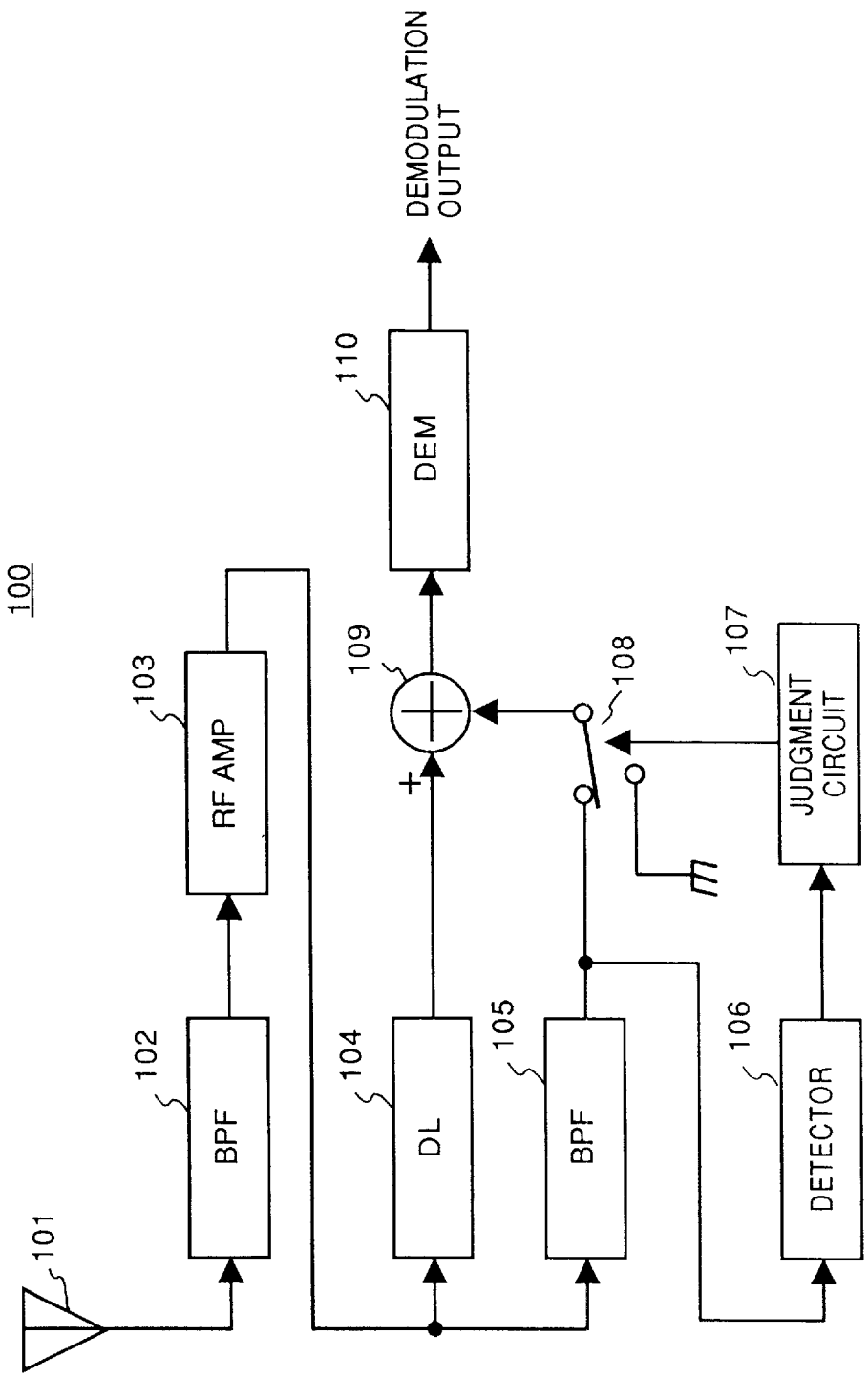

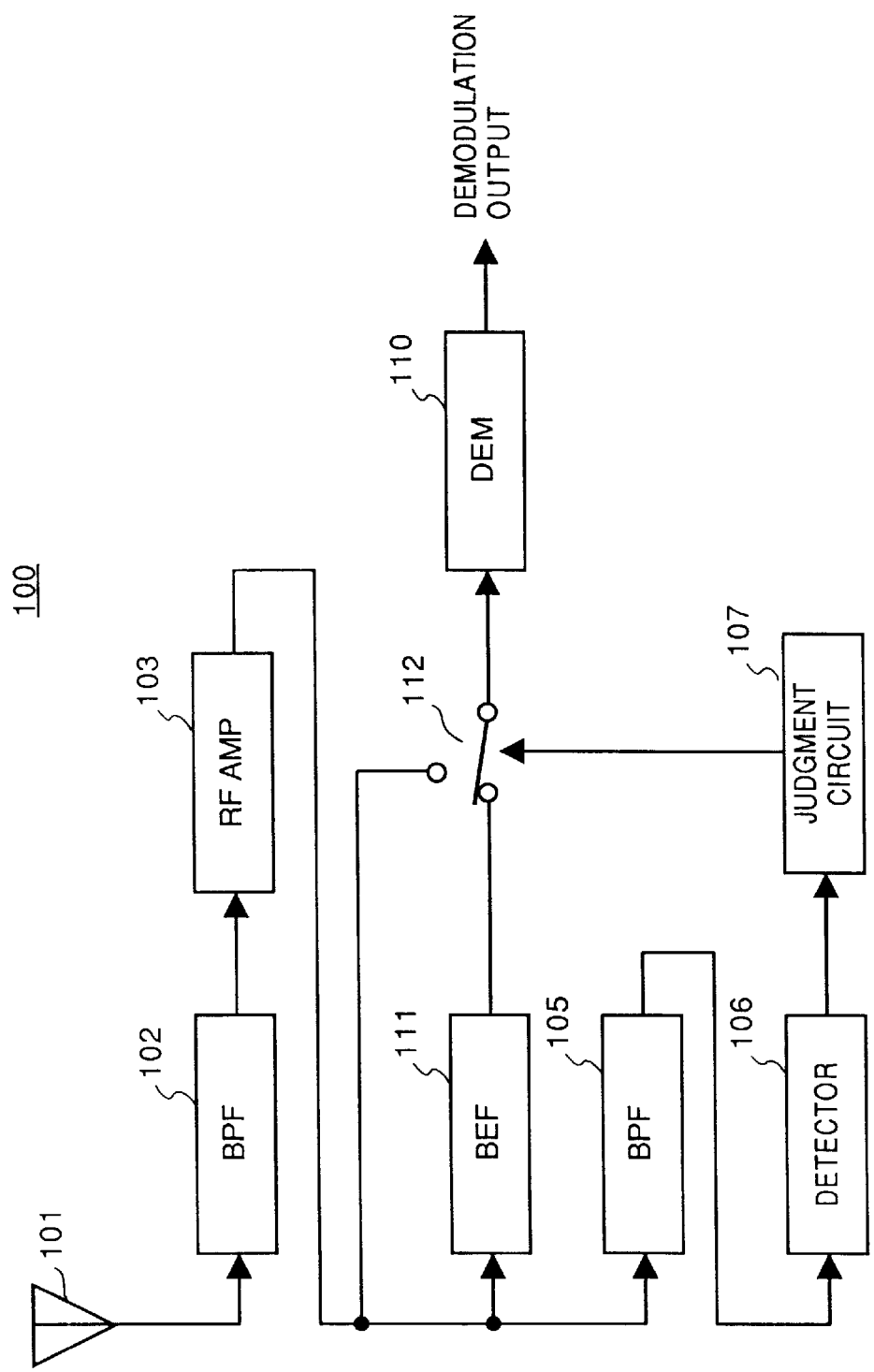

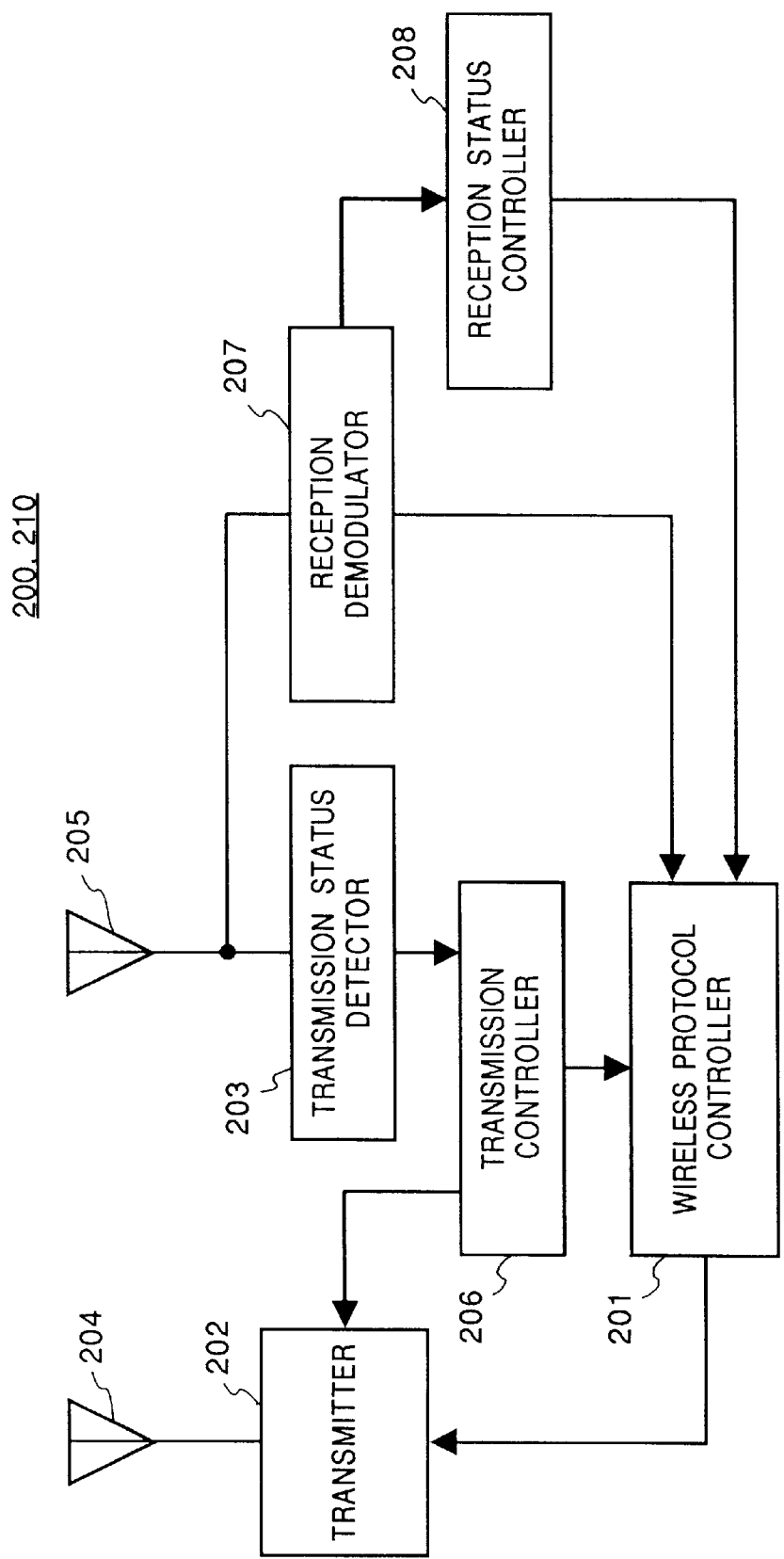

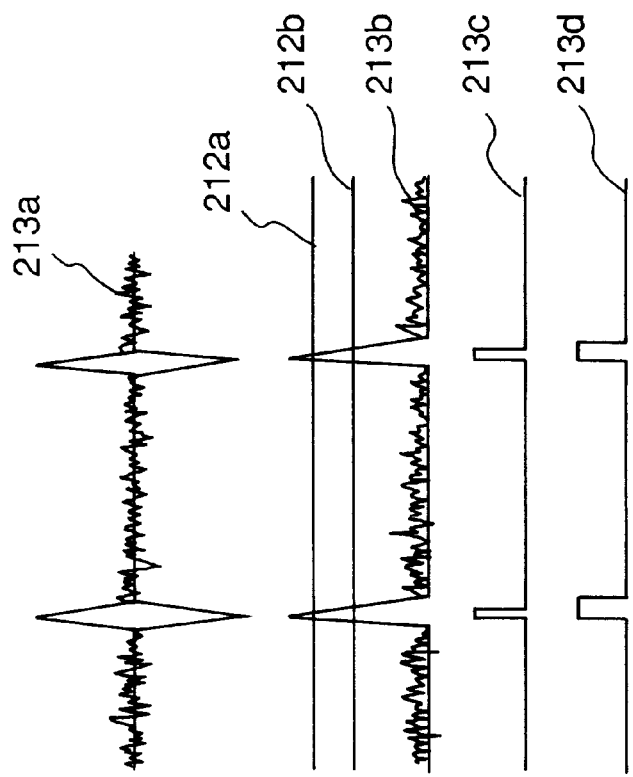

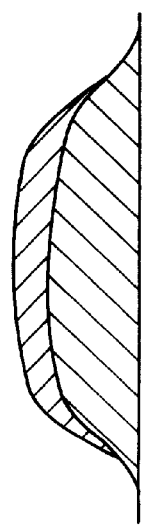
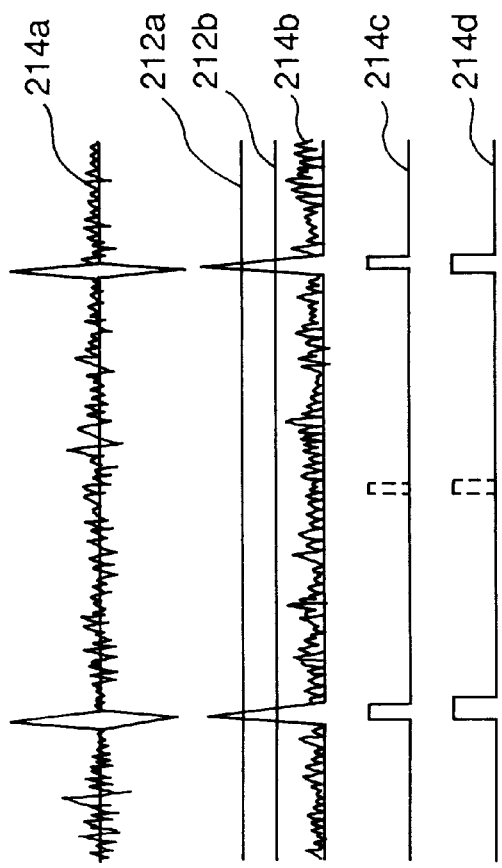

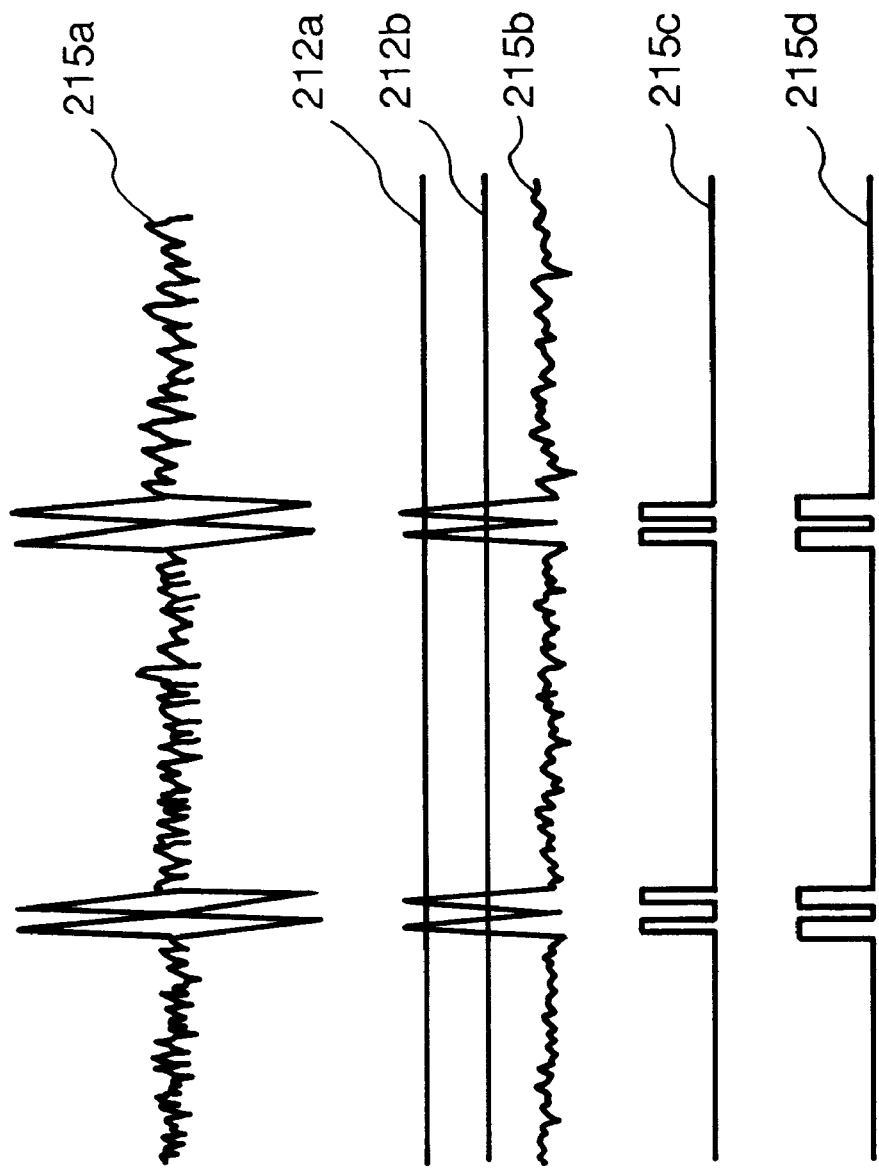

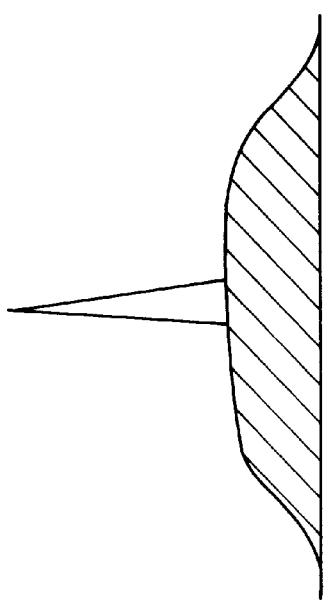
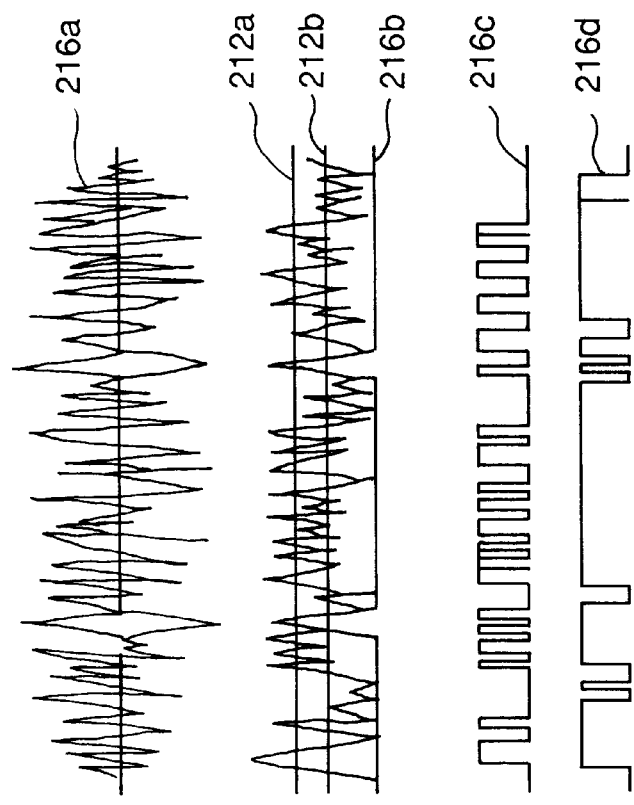

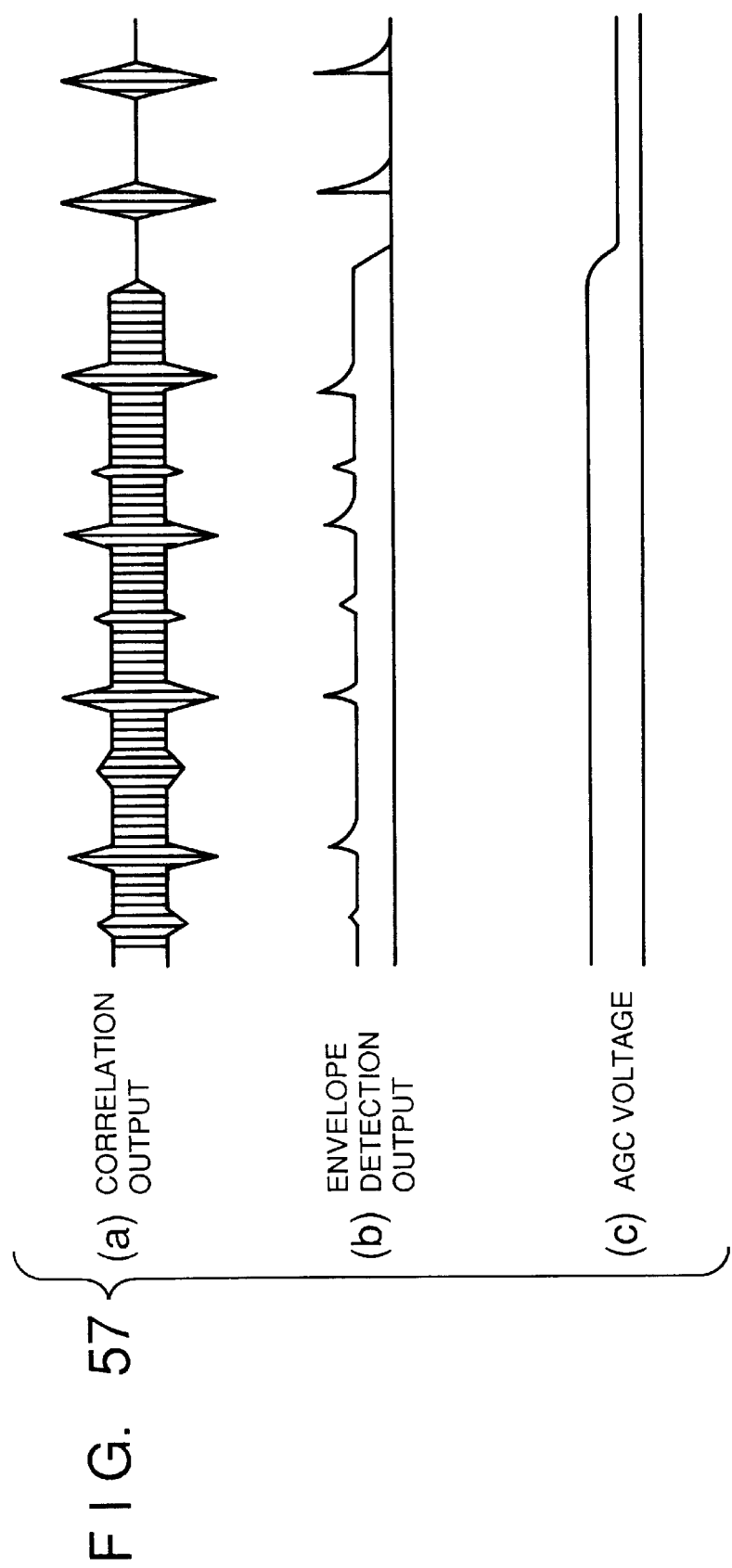
F I G. 57
(a) CORRELATION OUTPUT
(b) ENVELOPE DETECTION OUTPUT
(c) AGC VOLTAGE

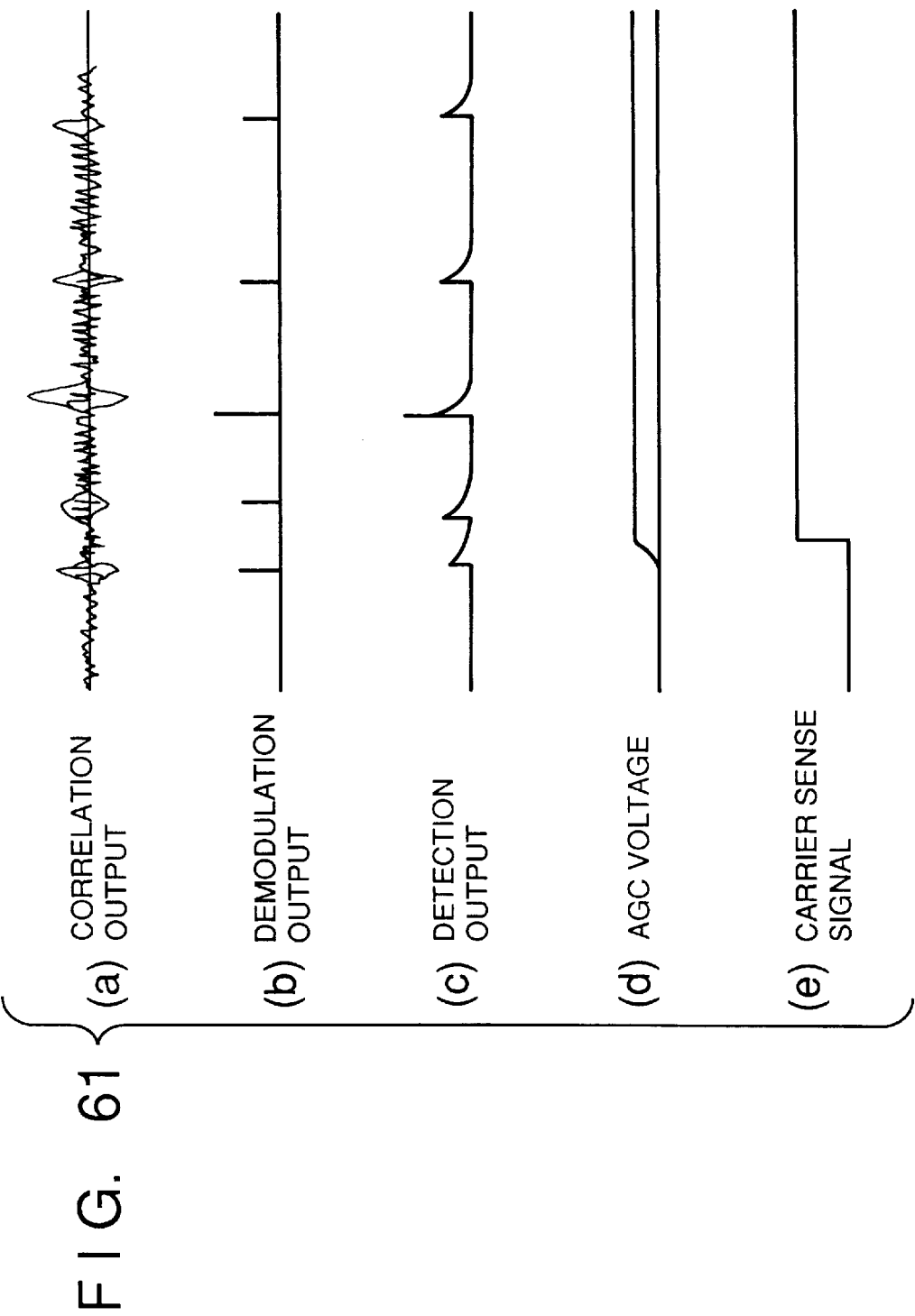

SPREAD SPECTRUM MODULATION COMMUNICATION APPARATUS FOR NARROW BAND INTERFERENCE ELIMINATION

This is a continuation of co-pending application Ser. No. 08/053,915, filed on Apr. 28, 1993.

BACKGROUND OF THE INVENTION

The present invention relates to a spread spectrum modulation communication apparatus and, more particularly, to a spread spectrum modulation communication apparatus which can detect or eliminate interference waves and maintain stable communication quality.

Generally, wireless communication apparatuses employing spread spectrum modulation are known for high anti-interference wave capability. Even if there exists a narrow-band interference wave within a reception band, the interference wave is spread in the spread spectrum demodulation process. The voltage of the demodulated interference wave becomes approximately 1/spread ratio (hereinafter, the spread ratio is represented by "s").

Accordingly, in comparison with a conventional narrow band system, the voltage of the anti-interference wave capability of the spread spectrum modulation type communication apparatus can be s times. FIGS. 42A to 42C show waveforms on reception in the spread spectrum modulation type communication apparatus (hereinafter, simply referred to as "communication apparatus"). FIG. 42A shows a spectrum signal waveform at a receiving terminal of the communication apparatus, FIG. 42B, a spectrum signal waveform after spread spectrum demodulation; and FIG. 42C, a spectrum signal waveform after passing through a narrow band-pass filter and before data demodulation.

However, if the communication apparatus and the conventional narrow band system share the same frequency, narrow band interference occurs so often. The interference wave power may become very large depending on the setting position of a receiving apparatus and exceed the anti-interference wave capability of the apparatus. In such case, it is impossible to maintain stable communication quality.

FIGS. 43A to 43C show signal waveforms in the above case. More specifically, FIG. 43A shows a spectrum signal waveform at the receiving terminal of the communication apparatus; FIG. 43B, a spectrum signal waveform after spread spectrum demodulation; and FIG. 43C, a spectrum signal waveform after passing through the narrow band-pass filter and before data demodulation.

Apparently, a non-negligible interference wave remains in a signal after spread spectrum demodulation and filtering by the narrow band-pass filter (FIG. 43C).

If the communication apparatus is used for digital data wireless communication, a communication protocol including an error correction procedure and a retransmission procedure is required for maintaining communication quality. For this reason, the data is transmitted in packet mode and the protocol is realized by, e.g., HDLC (High level Data Link Control) procedure.

FIGS. 44 and 45 show an example of the retransmission procedure according to the HDLC procedure. More specifically, FIG. 44 shows a rejection procedure (Rej) and FIG. 45 shows a selective rejection procedure (SRej).

In FIG. 44, a data transmitting apparatus (hereinafter, referred to as "transmitter") transmits a data packet (I), and one portion having a frame number "1" and a packet number "5" ($I_{1-5}$) fails to reach the data receiving apparatus (hereinafter, referred to as "receiver").

The receiver waits until time set to reception confirmation timer T2 becomes "over", then transmits an RR (receive ready) signal and starts retransmission timer T1. Thereafter, the receiver waits for a response from the transmitter.

On the other hand, the transmitter transmits the $I_{1-5}$ in which a poll bit (P: reception confirmation request bit) is set to "1" and starts the timer T1, thereafter, waits for confirmation till time set to the timer T1 becomes "over".

However, in FIG. 44, the transmitter cannot receive the RR signal from the receiver due to a communication condition, the time set to the timer T1 at the transmitting side becomes "over". Accordingly, the transmitter clears the timer T1 and restarts it, and at the same time transmits an RR signal in which the poll bit is set to "1". If there is no response from the receiver until the time set to the timer T1 becomes "over" again, the transmitter repeats the above retransmission up to $N_2$ times.

If the communication condition is reactivated and communication between the apparati becomes possible, the receiver compares a transmission status variable ($T_s$: value indicating a confirmed data packet number from the transmitter+1) indicated by RR signal and a reception status variable (Rs: value indicating a data packet number correctly received by the receiver). If the variables $T_s$ and $R_s$ are different, the receiver requests retransmission, i.e., transmits a Rej command in which the reception status variable $R_s$ set as a reception sequence number to the transmitter.

The transmitter receives the Rej command and retransmits the $I_{1-5}$ data corresponding to the reception sequence number included in the Rej command. As the poll bit of the data is "1", the transmitter waits for an RR signal having a variable $R_s$ corresponding to the $T_s$ from the receiver. Upon receiving the RR signal, the transmitter restarts to transmit the next data (I).

Next, the SRej (Selective Rejection) procedure will be described with reference to FIG. 45. In FIG. 45, only procedures different from the Rej procedure will be explained. As shown in FIG. 45, the poll bit (P) is not set to "1", i.e., the reception confirmation is not made, and the receiver does not receive data $I_{1-3}$ but correctly receives the next data $I_{1-4}$.

The receiver transmits a SRej command in which a parameter indicating a reception number of the not-received data $I_{1-3}$ to request retransmission. At this time, if the communication condition is fine, the transmitter that receives the SRej command during transmission ($I_{1-4}$) retransmits the data $I_{1-3}$ immediately after the transmission of the data $I_{1-4}$. Thereafter, the transmitter continues transmission in the initial transmission order.

In the above-described communication according to the HDLC procedure, the lack of data can be retransmitted as far as the degradation of communication condition is recovered in a short period. However, if the degradation of communication condition continues over seconds, the retransmission should be repeated up to the maximum number of retrying times set in the protocol as shown in FIG. 46. As a result, the data link might be disconnected.

Such repetition of retransmission up to the maximum number of times, the disconnection and re-establishment of the data link lower the throughput. In addition, the transmission of radiowaves in non-communicable status has ill effects on the radiowave propagation condition, which further influences the other wireless communication systems, causing problems in common use of radiowave resources.

In a system having only the Rej retransmission procedure, the transmitter sequentially performs data transmission up to an outstanding number (maximum number of times within which transmission without reception confirmation is possible). In a system which performs time division bidirectional communication, if a lack of packet occurs when the number of transmitted packets is small, the received data from the lacked packet data to the data at the outstanding number are deleted from the receiver. Accordingly, when the transmitter retransmits the lacked data at a point where the communication condition is reactivated, the transmitter should retransmit data from the head data, thus lowering the throughput. Further, the transmission of radiowaves in non-communicable status, for a long period, ill effects the radiowave propagation condition.

In a system having a combination of the SRej and Rej procedures, the outstanding number can be set to a greater number and the lowering of throughput can be improved. However, in order to increase the outstanding number, the storage capacity should be enlarged, and the protocol control becomes complicated. The enlarged system hardware causes an increase in manufacturing costs as well as difficulty in downsizing of the apparatus.

In the transmitting apparatus for the spread spectrum modulation, if the band is spread to a fully broad band with respect to its data transfer speed, the influence of interference waves can be ignored. In this case, if the spread spectrum (SS) signal is multiplexed in the same frequency band, it does not seriously influence the spread spectrum transmission efficiency.

However, if an intense external interference wave such as a microwave from radar and a microwave oven intrudes into the receiving apparatus during the multiplexing, it lowers the transmission efficiency, since the number of available channels and transmission capacity are restricted depending upon the size of the interference wave.

In one proposed method for improving the degradation of the transmission efficiency, increasing processing gain in the spread spectrum modulation communication system is used (hereinafter, referred to as "SS communication system).

However, in this method, widening of the spread bandwidth causes a band restriction problem and difficulties in initial synchronization seizure. For this reason, the processing gain cannot be increased without limitation. Another method for directly eliminating or reducing the interference wave is desired for improving the transmission efficiency in the SS communication system.

FIG. 47 shows a demodulator in the conventional SS communication system for eliminating/reducing interference wave.

In FIG. 47, a reception signal which enters input terminal a includes communication wave d(t), interference waves $U_s(t)$ and $U_i(t)$. $U_s(t)$ is an arbitrary spread spectrum interference wave; and Ui(t), a noise component and the other SS interference wave component.

In the method employed in the modulator of FIG. 47, spread spectrum demodulator (SSDEM) 831 spread-spectrum-demodulates the SS interference wave. After the S/N ratio is raised by narrow band-pass filter (narrow BPF) 832, spread spectrum modulator (SSMOD) 833 spread-spectrum-modulates the demodulated wave and supplies the reproduced SS interference wave to a negative (−) input terminal of subtracter 834. On the other hand, delay circuit 830 matches the phase and amplitude of the reception signal to the reproduced SS interference wave and supplies the reception signal to a positive (+) input terminal of the subtracter 834. Finally, the subtracter 834 subtracts the SS interference wave from the input signal.

It should be noted that the narrow BPF 832 can be replaced with a narrow band elimination filter such as narrow band elimination filter (BEF) 835 in FIG. 48. In this case, after the SS demodulation by the SSDEM 831, the narrow BEF 835 eliminates a narrow band SS demodulated signal, and the SSMOD 833 modulates the signal to reproduce a desired signal.

FIG. 49 shows another example of the demodulator. In FIG. 49, the interference wave included in the reception signal is eliminated by the narrow BEF 835 before SS demodulation by SSDEM 836.

FIG. 50 is a block diagram showing a detailed construction of the SSDEM 836. In FIG. 50, the SSDEM 836 comprises high pass filters (HPF) 837 and 838, multiplier 839 and low pass filter (LPF) 840.

The HPF's 837 and 838 can be replaced with LPF's, if their passing characteristics are the same. Cutoff frequency $f_c$ of the HPF's 837 and 838 corresponds to a point where the energy is approximately half of the mainrobe of the SS signal generated in the transmitter (not shown).

Next, the interference wave elimination by the SSDEM 836 will be described with reference to signal waveforms in FIG. 51.

In FIG. 51, waveform (a) denotes the information signal D having only the lower component spectrum before data spread by the transmitter (not shown); and waveform (b), a SS demodulated wave $D_{ss}$ in which the siderobe of the signal spread by the modulator using a spread code has been eliminated.

In mid-course of the transmission of the $D_{ss}$ wave by the transmitter via an antenna (not shown) of the receiver to the input terminal a in FIG. 50, mixture of interference wave easily occurs in the space propagation path. In FIG. 51, waveform (c) represents the $D_{ss}$ wave in which an intense interference wave is mixed.

In the demodulation by the SSDEM 836, lower frequency component from the cutoff frequency of the input signal from an input terminal a ((c) in FIG. 51) is reduced by the HPF 837 to obtain a spectrum signal $d(D'_{ss}+U')$ On the other hand, a spread signal P ((e) in FIG. 51) spread-modulated using the same spread code as that in the modulator of the transmitter is inputted from input terminal b. Also, lower frequency component from the cutoff frequency of the signal P is reduced to obtain a signal P' as shown in FIG. 51 (f). The signal P' and the signal $d(D'_{ss}+U')$ are provided to the multiplier 839 in which the $d(D'_{ss}+U')$ is demodulated, and a signal $g(U'_{ss}+D')$ is obtained. The signal $g(U'_{ss}+D')$ passes through the LPF 840, by which the interference wave and the spread-interference wave are eliminated, then only demodulated information signal D' ((h) in FIG. 51) can be outputted from output terminal c.

However, the above interference wave elimination method has a problem in that the noise component (noise component in the narrow BPF after the inverse-spread) remains in the demodulated information signal. Further, the conventional method is effective only if the frequency of interference wave is already-known. However, it is not effective against interference wave having an unknown frequency.

The SS communication apparatus has a variable attenuator for changing the damping rate to maintain a constant output voltage with respect to voltage variation of a reception radiowave.

FIG. 52 is a block diagram showing an intermediate frequency amplifier (IF AMP) with an automatic gain controller (AGC) which is generally used in an IF AMP. In FIG. 52, amplifiers (AMP's) 930, 932 and 933 respectively amplify an input signal. A portion surrounded by a broken line A generates a DC control voltage for controlling the damping rate of variable attenuator (variable ATT) 931. First, AMP 934 amplifies diode normal direction voltage used for envelope detection (to be described later) so that the voltage can have a fully large amplitude. Envelope detector 935 detects an envelope, then, integrator 936 converts the envelope into DC voltage, further, DC amplifier (DCAMP) 937 amplifies the DC voltage to obtain feedback loop gain. Thus, the output level variation with respect to the input level variation can be suppressed.

The AGC voltage generated in the above manner controls the variable ATT 931 which changes its damping rate to absorb the variation of the input voltage, thus a constant output voltage can be maintained. Especially, as SS modulated signals have a broad band, using an attenuator is effective. The conventional AGC varies the damping rate using e.g. PIN diode.

FIG. 53 is a block diagram showing the configuration of a conventional SS communication apparatus using the AGC in FIG. 52. This SS communication apparatus, performs half-duplex communication.

In FIG. 53, antenna 441 is used for both transmission and reception. Antenna switch (ANTSW) 462 switches over the transmission/reception of the antenna 441 by switchover signal $S_{11}$. The ANTSW 462 comprises a semiconductor switch utilizing PIN diode characteristics such as a high-frequency relay.

Further, the SS communication apparatus has a band-pass filter (BPF) 442 for eliminating unnecessary radiowave included in a reception signal, low-noise RF amplifier (RF AMP) 443 which amplifies the reception signal, local oscillator (local OSC) 444 for frequency conversion, mixer 445 which multiplies the signal from the local OSC 444 and the reception signal, BPF 446 for taking an IF frequency out of the output signal from the mixer 445, variable attenuator (ATT) 463 which attenuates the output from the BPF 446, AMP 447 which amplifies the attenuated signal outputted from the ATT 463, and correlator 448 for detecting a correlation peak in a spread code with respect to the reception signal.

Further, the SS communication apparatus has a delay device 449 which delays the correlation output, mixer 450 which multiplies the relayed output from the delay device 449 and the output from the correlator 448, LPF 451 which cuts off a high-frequency zone of the mixer 450 output, envelope detector 453 which detects an envelope in the output from the correlator 448, integrator 454 which integrates the detected signal outputted from the envelope detector 453, clock regenerator 456 which regenerates a clock from the detected signal, comparator 452 which judges the level of the LPF 451 output, and comparator 455 which judges the level of the integrator 454 output.

Further, the SS communication apparatus has reference oscillator (reference OSC) 457 for transmission, PN code generator 458 which adds a PN code to a transmission signal, mixer 459 which multiplies the transmission signal and the reference-oscillated frequency, mixer 460 which multiplies the frequency signal from the local OSC 444 and the reception signal, and RF amplifier (RF AMP) 461 which amplifies the transmission signal and outputs the signal to the ANTSW 462.

Upon transmission in the SS communication apparatus having the construction as described above, a controller (not shown) transmits an ON signal ($S_{12}$) for the RF AMP 461 and a switchover signal $S_{11}$ to switchover the ANTSW 462 to the antenna 441 side.

The mixer 459 modulates transmission data with a random code ((b) in FIG. 54) outputted from the PN code generator 458 and a carrier signal ((a) in FIG. 54) from the reference OSC 457 to obtain a spread signal ((c) in FIG. 54).

The mixer 460 converts the spread signal with the reference signal from the local OSC 444 into an RF frequency. The RF AMP 461 amplifies the RF frequency and supplies the amplified RF frequency to the antenna 441 via the ANTSW 462.

Upon reception, the controller transmits a switchover signal $S_{11}$ to switchover the antenna 441 by the ANTSW 462 to the reception side. The reception signal passes through the RF PBF 442, where unnecessary waves are eliminated and only a desired signal is outputted.

The RF AMP 443 amplifies this signal and inputs the amplified signal into the mixer 445, which converts the signal from the RF AMP 443 with a predetermined frequency signal from the local OSC 444 into an IF frequency (hereinafter, referred to as "IF signal").

Next, only the IF frequency component is taken out of the IF signal in the BPF 446, and the ATT 463 attenuates the IF frequency component signal in accordance with AGC voltage to supply a constant voltage IF signal to the correlator 448. In the correlation output from the correlator 448 ((a) in FIG. 55), the correlation output peak interval is proportional to transmission data speed ($T_1$). This correlation output is supplied to the envelope detector 453 and the delay device 449. The delay device 449 delays the correlation output by one bit of the transmission data ((b) in FIG. 55), and the mixer 450 multiplies the correlation output before delay and the delayed correlation output to obtain demodulation output ((c) in FIG. 55).

The demodulation output passes through the LPF 451, in which high-frequency component is eliminated. The comparator 452 judges the level of the demodulation output, and finally, reception data ((d) in FIG. 55) can be obtained. Note that as it is understood from the above description, the demodulator of this SS communication apparatus is a differential demodulator.

On the other hand, the envelope detector 453 detects an envelope out of the supplied correlation output and the envelope detection output ((a) in FIG. 56) is obtained. This detection output is inputted into the clock regenerator 456 in which clock component is extracted, and finally, reception clock ((c) in FIG. 56) is obtained.

Further, the envelope detection output is also supplied to the integrator 454 which converts the detection output into DC voltage corresponding to the peak level ((c) in FIG. 56). The DC voltage is used as the AGC voltage for controlling the damping rate of the ATT 463. The output of the integrator 454 is supplied to the comparator 455, which determines whether or not there is a desired voltage level, i.e., whether or not there is a reception signal, and outputs the integrator output as a carrier sense signal to the controller.

However, in the above SS communication apparatus, if the interference wave mixes in a reception signal, the effect of the interference wave appears in the correlation output (e.g., (a) in FIG. 57), degrading the correlation output S/N ratio.

Further, a signal other than the correlation output, e.g., the input voltage of the correlator, may directly appear as the correlation output. If AGC voltage is generated using such correlation output in the conventional manner, the envelope detection output may include its noise component ((b) in FIG. 57). Accordingly, the AGC voltage whose level corresponds to the correlation output noise ((c) in FIG. 57) may be generated, which becomes an impediment of exact automatic gain control.

For bidirectional communication by this SS communication apparatus, a full duplex system for simultaneous transmission/reception and a half duplex system for alternative transmission/reception can be considered. The former system comprises a transmission band and a reception band respectively. The latter system switches over the transmission/reception using a filter, a relay and a semiconductor switch.

As the full duplex system needs both transmission and reception frequency bands, this system is not advantageous in comparison with the latter system in consideration of effective use of frequency. However, it has many advantages in its configuration; e.g., it does not need transmission/reception switching control, and the system throughput can be raised. However, if this system is applied to a communication apparatus which can raise the system capability by using a wide band, such as a spread spectrum modulation communication apparatus, the apparatus should use an extremely wide frequency band in order to have dedicated transmission and reception bands. Thus it cannot attain the effective frequency use.

Accordingly, the system as shown in FIG. 53 performs the half-duplex communication, and it has the ANTSW 462 for switching over transmission/reception with the switchover signal $S_{11}$.

FIG. 58 is a block diagram showing the half-duplex communication highlighting the switching over of the ANTSW 462.

Half-duplex communication using a common antenna depends on separation of transmission from reception by the ANTSW 463. In order to prevent receiver 1000 from directly receiving a transmission signal, a high-frequency relay having excellent isolation is employed.

FIG. 59 is a block diagram showing the configuration of a SS communication apparatus using a high-frequency relay as an ANTSW. The construction shown in FIG. 59 corresponds to that in FIG. 53 except high-frequency relay 480 and AGC control by amplifier 447 in place of the damping rate control by the ATT 463. Therefore, the correspondent elements have the same reference numerals and the explanations of these elements will be omitted.

In FIG. 59, the high-frequency relay 480 can provide a 40 dB to 50 dB transmission/reception isolation with respect to a 2 GH$_z$ to 4 GH$_z$ frequency.

FIG. 60 is a block diagram showing the configuration of a SS communication apparatus using semiconductor switch 481 instead of the high-frequency relay 480. Similarly to FIG. 59, the elements corresponding to those in FIG. 53 have the same reference numerals and the explanations of these elements will be omitted.

In the apparatus of FIG. 60, a transmission/reception isolation can be about 30 dB with respect to about 2 GH$_z$ frequency. Power supply to the RF AMP 443 and the IF AMP 447 in the receiver is halted by switchover signal $S_{13}$ to ensure transmission isolation.

In the apparatus of FIG. 59, because the high-frequency relay 480 is very expensive and the device size is large, downsizing of the system and cost reducing are difficult.

Further, response period to the switchover signal $S_{11}$ is long, i.e., the interval from the applying of the switchover signal $S_{11}$ to normal relay operation is several seconds, thus lowering the system throughput.

When intense external interference wave arrives within the band, the interference wave intrudes in the receiver during transmission. The receiver amplifies the received signal including the interference wave, and the noise exists in the correlation output. As a result, erroneous operations such as generating a carrier sense signal may occur.

FIG. 61 shows signal waveforms respectively representing correlation output, demodulation output, detection output, AGC voltage and a carrier sense signal in case where interference wave has intruded in the receiver.

In the apparatus of FIG. 60, a conceivable problem occurs after the power supply to the RF AMP 443 and the IF AMP 447 is turned off and on again. When this occurs, operations of these AMP's become unstable, and it takes a long period to resume stable amplification operation. Thus, the throughput of the apparatus is extremely lowered.

Further, although the SS modulation communication is generally considered "tolerant of interference waves", if a radiowave transmitted in an intense output exceeding the anti-interference wave capability exists within the band, the apparatus is ill effected, causing degradation of communication quality and communication line disconnection.

Such interference waves cannot be predicted. Therefore, users cannot judge whether the cause of degradation of communication quality is the interference wave or not.

In present situations where using radiowaves in the same frequency band for different purposes has been considered, the above-described influences of the interference waves given to the SS communication apparatuses will be more serious.

SUMMARY OF THE INVENTION

The present invention has been made in consideration of the above situation, and has as its object to provide a wireless communication apparatus which can prevent an interference wave which occurs due to sharing the same frequency.

According to the present invention, the foregoing object is attained by providing a wireless communication apparatus in which spread spectrum modulation is employed, comprising: receiving means for receiving a spread spectrum signal to a predetermined frequency; detection means for detecting narrow band interference wave which occurs in the predetermined frequency band; judgment means for, if reception voltage of the narrow band interference wave exceeds a predetermined value, judging that an intense interference wave has mixed with the signal; and signal elimination means for, if the judgment means judges that an intense interference wave has mixed with the signal, eliminating a signal of the frequency band which corresponds to the narrow band interference wave.

In accordance with the present invention as described above, mixing of intense interference wave can be judged based on reception voltage of the interference wave, and a signal of a frequency band which corresponds to the interference wave can be eliminated.

It is another object of the present invention to provide a wireless communication apparatus which can control communication in accordance with radiowave propagation condition.

According to the present invention, the foregoing object is attained by providing a wireless communication apparatus, in which spread spectrum modulation is employed, for synchronously communicating with other station, comprising: a reception antenna; a transmission antenna; direct wave elimination means for, upon data transmission, eliminating direct wave component of a transmission signal transmitted by the transmission antenna from a reception wave received by the reception antenna; detection means for detecting radiowave intensity of the transmission signal transmitted from the transmission antenna within a transmission frequency band by using the reception wave in which the transmission signal direct wave component has been eliminated; first judgment means for judging possibility of damage of the transmission data and status of radiowave collision between the transmission wave and a radiowave from another communication apparatus based on the radiowave intensity detected by the detection means; second judgment means for, upon reception, judging reception status based on synchronization seizure condition and reception data quality; and communication control means for halting and restarting communication based on judgment results by the first judgment means and the second judgment means.

It is still another object of the present invention to provide a wireless communication apparatus which can control communication in accordance with interference wave occurence period.

According to the present invention, the foregoing object is attained by providing a wireless communication apparatus in which spread spectrum modulation is employed, comprising: interference wave detection means for detecting interference wave occurrence status; period inference means for inferring interference wave occurrence period based on the interference wave occurrence status detected by the interference wave detection means; correction means for correcting, based on the interference wave occurrence period inferred by the period inference means and interference wave occurrence status, the interference wave occurrence period; and communication means for, if interference wave is detected in accordance with the occurrence period inferred by the period inference means, halting and restarting communication corresponding to the occurrence period.

In accordance with the present invention as described above, communication is halted and restarted in accordance with radiowave propagation condition and interference wave occurrence period.

It is still another object of the present invention to provide a wireless communication apparatus which can judge radiowave propagation condition.

According to the present invention, the foregoing object is attained by providing a wireless communication apparatus in which spread spectrum modulation is employed, comprising: a transmission antenna; a reception antenna; direct wave cutoff means for cutting off a direct wave of a transmission spread signal transmitted by the transmission antenna from a reception wave received by the reception antenna; correlation means for obtaining correlation between the reception signal in which the direct wave has been eliminated and the transmission spread signal; detection means for detecting interference wave component based on correlation output from the correlation means; and judgment means for judging radiowave propagation condition upon transmission based on a detection signal detected by the detection means.

In accordance with the present invention as described above, radiowave propagation condition upon transmission can be judged in accordance with correlation between a transmission spread signal and a reception signal in which direct wave of the transmission signal has been excluded.

It is still another object of the present invention to provide a wireless communication apparatus which, in packet form data transmission/reception, can change the number of packets to be transmitted continuously in accordance with data propagation condition.

According to the present invention, the foregoing object is attained by providing a wireless communication apparatus capable of transmitting and receiving data in a packet form comprising: transmission means for transmitting data in a packet form to a receiving station; monitor means for monitoring data transmission status; reception means for receiving confirmation from the receiving station notifying that the data has been received; and transmission control means for controlling the transmission means to transmit packets sequentially without receiving the confirmation from the receiving station in accordance with the data transmission status, wherein a number of packets which can be transmitted sequentially is increased or decreased based on the data transmission status.

In accordance with the present invention as described above, the number of packets to be transmitted continuously without confirmation from the receiver can be changed based on the data propagation condition.

It is still another object of the present invention to provide a wireless communication apparatus which can eliminate arbitrary interference wave included in a reception signal.

According to the present invention, the foregoing object is attained by providing a wireless communication apparatus, in which spread spectrum modulation is employed, capable of eliminating interference wave from a received wave, comprising: elimination means for eliminating component out of a spread spectrum modulation frequency band from a reception signal; a voltage control oscillator in which oscillation output frequency varies based on input voltage; a voltage sweeper for supplying voltage to the voltage control oscillator; multiplication means for multiplying an output signal from the voltage control oscillator by the reception signal in which the component out of the spread spectrum modulation frequency band has been eliminated by the elimination means; cutoff means for cutting off high-frequency component from an output signal from the multiplication means and outputting a low-frequency component signal; integration means for integrating the low-frequency component signal outputted by the cutoff means; comparison means for comparing voltage of an output signal from the integration means with a predetermined value; control means for controlling the voltage sweeper based on output from the comparison means to control output frequency of the voltage control oscillator; inversion means for inverting a phase of the output signal from the voltage control oscillator; and addition means for adding an output signal from the inversion means to the reception signal in which the component out of the spread spectrum modulation frequency band has been eliminated by the elimination means.

According to the present invention, the foregoing object is attained by providing a wireless communication apparatus, in which spread spectrum modulation is employed, capable of eliminating interference wave from a received wave, comprising: elimination means for eliminating component out of a spread spectrum modulation frequency band from a reception signal; a voltage control oscillator in which oscillation output frequency varies based on input voltage; a voltage sweeper for supplying voltage to the voltage control oscillator; multiplication means for multiplying an output signal from the voltage control oscillator by the reception signal in which the component out of the spread spectrum modulation frequency band has been eliminated by the elimination means;cutoff means for cutting off high-frequency component from an output signal from the multiplication means and outputting low-frequency component signal; integration means for integrating the low-frequency component signal from the cutoff means; comparison means for comparing an output signal from the integration means with a predetermined value; control means for controlling the voltage sweeper based on output from the comparison means to control output frequency of the voltage control oscillator; and subtraction means for subtracting the output signal from the voltage control oscillator from the reception signal in which the component out of the spread spectrum modulation frequency band has been eliminated by the elimination means.

According to the present invention, the foregoing object is attained by providing a wireless communication apparatus, in which spread spectrum modulation is employed, capable of eliminating interference wave from received wave, comprising: elimination means for eliminating component out of a spread spectrum modulation frequency band from a reception signal; a voltage control oscillator in which oscillation output frequency varies based on input voltage; a voltage sweeper for supplying voltage to the voltage control oscillator; multiplication means for multiplying an output signal from the voltage control oscillator by the reception signal in which the component out of the spread spectrum modulation frequency band has been eliminated by the elimination means; cutoff means for cutting off high-frequency component from an output signal from the multiplication means and outputting low-frequency component signal; integration means for integrating the low-frequency component signal outputted by the cutoff means; comparison means for comparing voltage of an output signal from the integration means with a predetermined value; control means for controlling the voltage sweeper based on output from the comparison means to control output frequency of the voltage control oscillator; frequency elimination means for eliminating a signal of a frequency band which corresponds to output voltage from the voltage sweeper; and apply control means for controlling application of the output of the voltage sweeper to the frequency elimination means based on the output from the comparison means.

In accordance with the present invention as described above, an interference wave frequency is detected and an inverse phased signal of the frequency is generated to eliminate the interference wave or to eliminate only interference component of the frequency.

It is another object of the present invention to provide a wireless communication apparatus which can eliminate interference wave effectively, and which comprises an automatic gain controller for fine communication.

According to the present invention, the foregoing object is attained by providing a wireless communication apparatus, in which spread spectrum modulation is employed, having an automatic gain controller, comprising: reception means for receiving a spread-spectrum-modulated signal; demodulation means for demodulating the signal, wherein the demodulation means includes: correlation means for obtaining correlation between the spread/demodulated signal and a spread code which is the same as that employed upon generation of the spread signal by a modulator of transmitting apparatus; peak hold means for detecting a peak of a correlation signal obtained from the correlation means and holding the detected peak; and control means for controlling the correlation means based on peak output obtained from the peak hold means.

In accordance with the present invention as described above, the correlation means is controlled based on the peak output of the correlation signal from the correlation means in the demodulation means, thus, automatic gain control without influence by correlation output noise.

It is another object of the present invention to provide a half duplex wireless communication apparatus which can prevent a receiver from receiving a transmission wave of the apparatus.

According to the present invention, the foregoing object is attained by providing a half duplex wireless communication apparatus, in which spread spectrum modulation is employed, having a shared transmission/reception antenna, comprising: antenna switchover means for switching over the antenna for transmission/reception; transmission means for transmitting a transmission signal; reception means for receiving a reception signal, wherein the reception means includes: first filter means for passing a predetermined frequency band signal of the reception signal; second filter means for passing a signal of a frequency band different from the predetermined frequency band of the reception signal; and filter switchover means for, synchronizing with switching over of the antenna switchover means, selecting the first filter means upon reception, and selecting the second filter means upon transmission.

According to the present invention, the foregoing object is attained by providing a half duplex wireless communication apparatus, in which spread spectrum modulation is employed, having a shared transmission/reception antenna, comprising: antenna switchover means for switching over the antenna for transmission/reception; transmission means for transmitting a transmission signal; reception means for receiving a reception signal, wherein the reception means includes: filter means for passing a predetermined frequency band signal of the reception signal; filter switchover means for, synchronizing with switching over of the antenna switchover means, switching over the filter means and a ground so that output from the reception means can be inputted into the filter means upon reception, and the output from the reception means can be grounded upon transmission.

According to the present invention, the foregoing object is attained by providing ahalf duplex wireless communication apparatus, in which spread spectrum modulation is employed, having a shared transmission/reception antenna, comprising: antenna switchover means for switching over the antenna for transmission/reception; transmission means for transmitting a transmission signal; reception means for receiving a reception signal, wherein the reception means includes: filter means for passing a predetermined frequency band signal of the reception signal; and attenuation means, in which, synchronizing with switching over of the antenna switchover means, attenuation of an input signal into the filter means becomes active upon reception, and the attenuation becomes inactive upon transmission.

In accordance with the present invention as described above, synchronizing with switchover of transmission/reception antenna, switchover of filter means can be performed such that, upon reception, the filter means which passes only a signal of a predetermined frequency band corresponding to the reception frequency band can be selected, while upon transmission, another filter means or a ground which output from the reception means cannot enter can be selected. Further, synchronizing with the switchover of the transmission/reception antenna, the operation of the attenuator means which inputs a signal into the filter means is switched over.

It is still another object of the present invention to provide a wireless communication apparatus which can detect interference wave and notify a user of the detection of interference wave.

According to the present invention, the foregoing object is attained by providing a wireless communication apparatus in which spread spectrum modulation is employed, comprising: first conversion means for A/D converting a reception wave; second conversion means for Fourier transforming a digital signal obtained from the first conversion means; detection means for comparing spectrum data obtained from the second conversion means with a predetermined spectrum and detecting interference wave component included in the spectrum data; judgment means for judging whether or not the interference wave component has exceeded a range for maintaining communication quality based on detection result by the detection means; and notification means for notifying communication status based on judgment result by the judgment means.

In accordance with the present invention as described above, interference wave is detected from spectrum data obtained by A/D converting and Fourier transforming a reception wave signal, and whether or not the communication quality can be maintained is determined. The communication status is notified in accordance with the determination result.

It is still another object of the present invention to provide a wireless communication apparatus which can detect interference wave and control communication.

According to the present invention, the foregoing object is attained by providing a wireless communication apparatus in which spread spectrum modulation is employed, comprising: first conversion means for A/D converting a reception wave; second conversion means for Fourier transforming a digital signal obtained from the first conversion means; detection means for comparing spectrum data obtained from the second conversion means with a predetermined spectrum and detecting interference wave component included in the spectrum data; judgment means for judging whether or not the interference wave component has exceeded a range for maintaining communication quality; and communication control means for temporarily halting communication based on judgment result by the judgment means.

In accordance with the present invention as described above, interference wave is detected from spectrum data obtained by A/D converting and Fourier transforming a reception signal and whether or not the communication quality can be maintained is determined. Based on the determination result, communication is temporarily halted.

It is still another object of the present invention to provide a wireless communication apparatus which can detect interference wave in every divided frequency band.

According to the present invention, the foregoing object is attained by providing a wireless communication apparatus in which spread spectrum modulation is employed, comprising: division means for dividing a reception wave into a predetermined number of frequency band signals; a plurality of filter means for filtering the frequency band signals divided by the division means respectively; a plurality of first conversion means for A/D converting the frequency band signals divided by the division means respectively; a plurality of second conversion means for Fourier transforming digital signals obtained from the plurality of first conversion means respectively; a plurality of memory means for storing spectrum data obtained from the plurality of second conversion means when communication has been correctly performed as reference data, or storing spectrum data obtained from the plurality of second conversion means when communication has not been correctly performed as reference data; a plurality of comparison means for comparing spectrum data obtained from the plurality of second conversion means with the reference data stored by the plurality of memory means; and a plurality of judgment means for judging whether or not the reception wave includes interference wave based on comparison results by the plurality of comparison means.

In accordance with the present invention as described above, whether or not the reception signal includes interference wave is determined by comparing spectrum data obtained by A/D conversion and Fourier transformation with spectrum data obtained when communication is normally performed.

The invention is particularly advantageous since interference wave can be eliminated and stable communication quality can be ensured.

Further, as communication control based on radiowave propagation condition is performed by monitoring data transmission status and reception status, wasteful retransmission and data link disconnection can be avoided. Thus, the throughput of the data communication can be improved.

Further, the number of packets which can be transmitted without reception confirmation can be changed in accordance with radiowave propagation condition, unnecessary packets can be deleted, improving the overall data communication throughput.

Further, as the frequency of interference wave included in a reception signal is detected and the interference wave can be eliminated, communication transfer efficiency can be improved.

Further, stable automatic gain control without influence by noise included in the correlation output can be performed by controlling the correlation means in accordance with the correlation signal peak output obtained from the correlation means in the demodulation means. Accordingly, fine communication can be ensured.

Further, an appropriate switchover of filter means and appropriate signal input can be performed without using an expensive high-frequency relay, synchronizing with switchover of the transmission/reception antenna. Accordingly, the price of the wireless communication apparatus in the present invention can be reduced and the throughput can be maintained.

Further, interference wave included in a reception signal is detected, and if the interference wave influence exceeds the limitation of an allowable range, a user can be notified of it, or fine communication quality can be ensured by halting the communication temporarily. Moreover, the allowable range can be changed in accordance with a distance from the communication apparatus at the other end to detect the interference wave influence precisely.

Further, more effective interference wave detection can be performed by dividing a reception wave into a plurality of frequency bands and comparing spectrum data obtained in normal communication and spectrum data obtained from the reception wave to detect the existence of the interference wave.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the configuration of receiver 100 of a communication apparatus according to a first embodiment of the present invention;

FIG. 3 is a block diagram showing the configuration of the receiver 100 in which delay circuit 104, switch 108 and adder 109 are replaced with band elimination filter (BEF) 111 and switch 112;

FIG. 4 is a schematic block diagram showing communication apparatuses 200 and 201 according to a second embodiment of the present invention;

FIG. 7A shows signal waveforms detected by transmission status detector 203 during transmission by the communication apparatus 200;

FIG. 7B shows radiowave status within a transmission frequency band during transmission by the communication apparatus 200;

FIG. 8A shows signal waveforms detected by the transmission status detector 203 during transmission by the communication apparatus 200;

FIG. 8B shows radiowave status within the transmission frequency band during transmission by the communication apparatus 200;

FIG. 9 shows signal waveforms detected by the transmission status detector 203 during transmission by the communication apparatus 200;

FIG. 10A shows signal waveforms detected by the transmission status detector 203 during transmission by the communication apparatus 200;

FIG. 10B shows radiowave status within the transmission frequency band during transmission by the communication apparatus 200;

FIG. 57 shows a correlation output signal, an envelope detection output signal and an AGC voltage signal treated by the SS communication apparatus in case where interference wave mixes in a reception signal treated by the SS communication apparatus;

FIG. 61 shows a correlation output signal, a demodulation output signal, a detection output signal, an AGC voltage signal and a carrier sense signal in a case where an interference wave intrudes in a receiver of the apparatus upon transmission.

DETAILED DESCRIPTION OF THE PREFERRED EMBODIMENTS

Figure 2A:
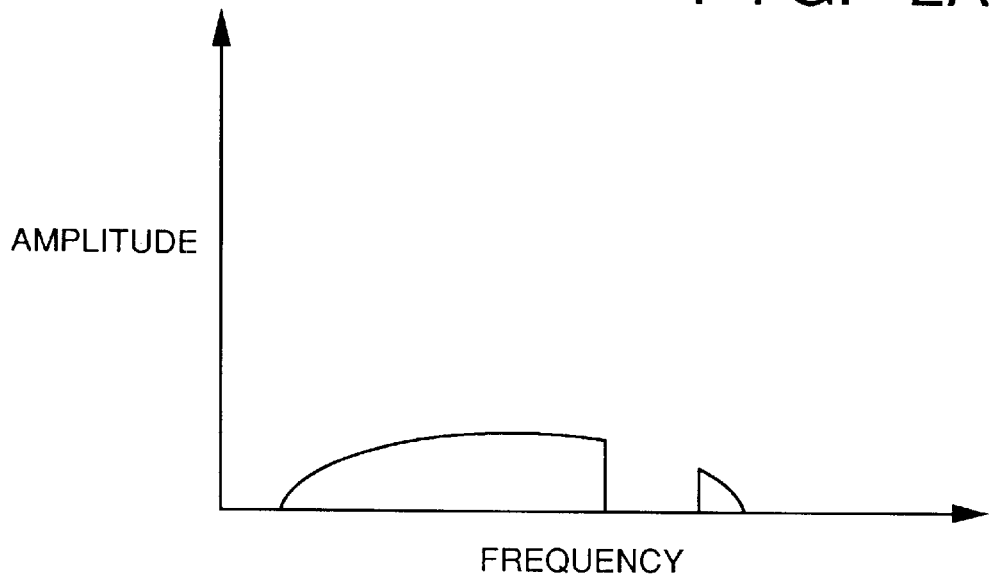
FIG. 2A illustrates spectrum signal waveform in a case where an intense interference wave is eliminated from a reception signal.

Preferred embodiments of the present invention will be described in detail in accordance with the accompanying drawings.

In the embodiments, a spread spectrum modulation communication apparatus (hereinafter, referred to as "communication apparatus") according to the present invention transmits/receives data signals using spread spectrum modulation. If various kinds of interference waves mix with the transmission/reception signal, the communication apparatus separates the interference waves from the signal, detects the interference waves, and eliminates the detected interference waves.

[First Embodiment (FIGS. 1–3)]

FIG. 1 is a block diagram showing the configuration of receiver 100 of a communication apparatus according to a first embodiment of the present invention.

In this embodiment, the frequency band used by this communication apparatus overlaps with that used by another narrow band communication system, and a transmission/reception radiowave of the other narrow band communication system mixes with the reception signal of the communication apparatus as interference wave.

The receiver 100 has reception antenna 101, bandpass filter (BPF) 102 for eliminating an unnecessary band signal in a reception wave, RF amplifier (RFAMP) 103 for amplifying the BPF 102 output, delay circuit 104 for delaying the RFAMP 103 output by a predetermined amount, BPF 105, having the same delaying characteristic as that of the delay circuit 104, for passing only a predetermined band signal, adder 109 for subtracting the BPF 105 output from the delay circuit 104 output, detector 106 for detecting the BPF 105 output, judgment circuit 107 for comparing the detector 106 output with a predetermined voltage, switch 108 for opening/closing a path between the BPF 105 and the adder 109, and demodulator 110 for demodulating the adder 109 output.

In the above construction, when a signal is inputted into the reception antenna 101, the BPF 102 outputs only a predetermined band component signal to the RF AMP 103. The RF AMP 103 amplifies the input signal to a predetermined level.

The RFAMP 103 inputs the amplified signal to the BPF 105, which passes only a signal of a frequency band overlapped with that of another narrow band communication system (interference wave). The detector 106 detects the BPF 105 output and inputs the detected signal into the judgment circuit 107. The detection output at this time is a voltage signal approximately proportional to the interference wave voltage.

The judgment circuit 107 compares the input detection signal with a predetermined voltage level. If the detection output is not less than or equal to the predetermined voltage level, the switch 108 selects the ground side, while it selects the BPF 105 side if the detection output is equal to or more than the voltage level, and the switch 108 output is inputted into the adder 109.

On the other hand, the RFAMP 103 output is inputted into the delay circuit 104, which delays the input signal by the same delay amount as that of the BPF 105, and outputs the delayed signal to the adder 109.

The adder 109 inputs the delay circuit 104 output into the demodulator 110, which performs normal spread spectrum demodulation such as spread spectrum demodulation and data demodulation.

Figure 42A:
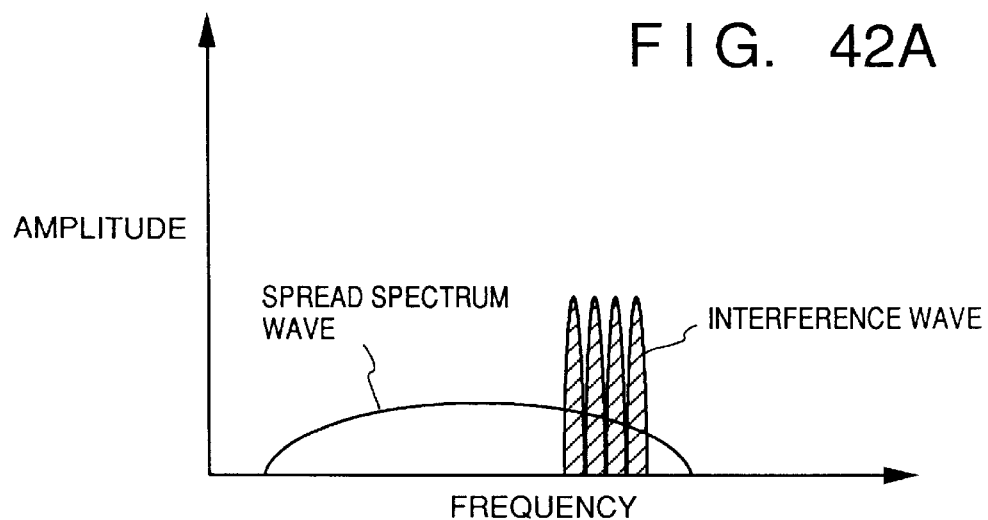
FIGS. 42A to 42C show reception signal waveforms upon reception by a conventional spread spectrum modulation communication apparatus.
Figure 42B:
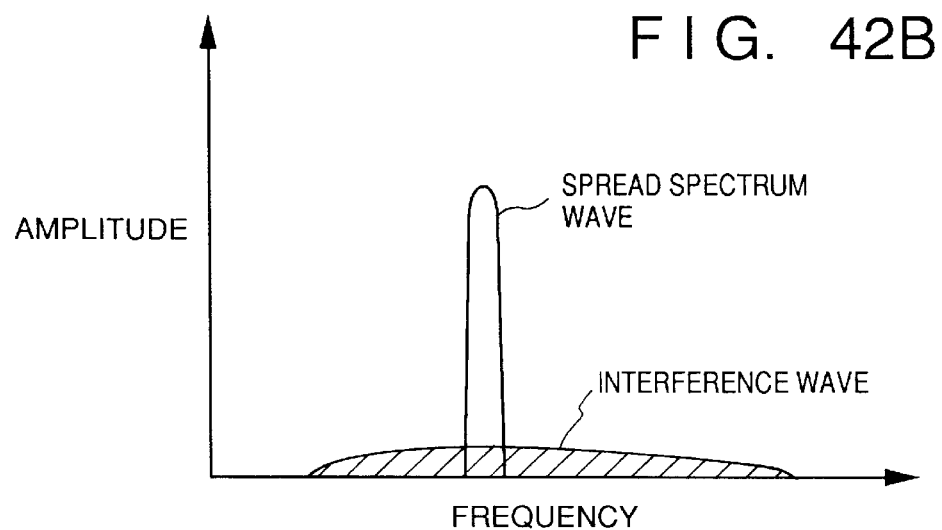
Figure 42C:
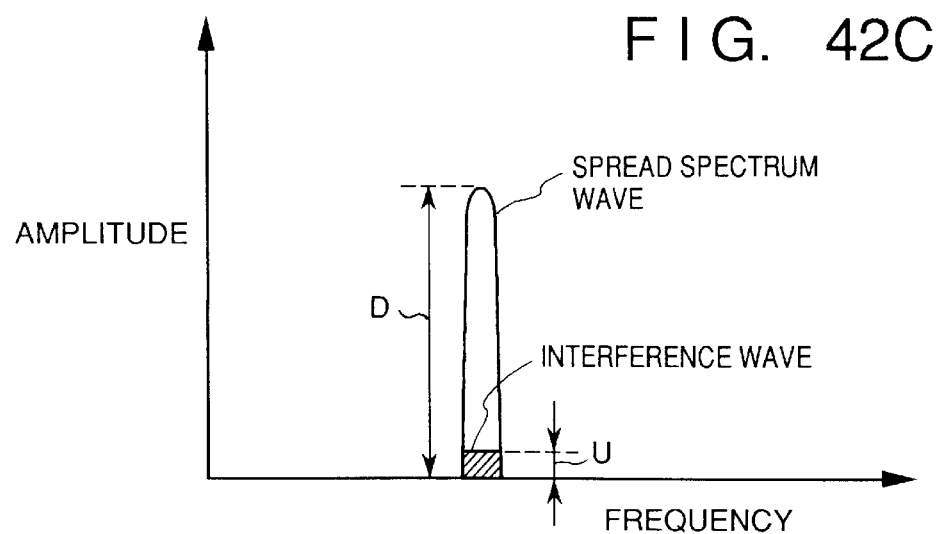
Figure 43A:
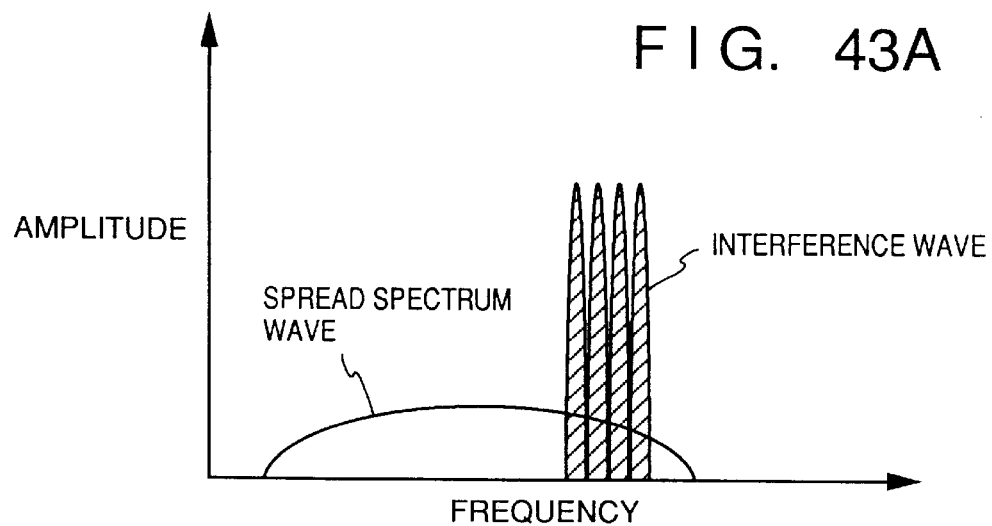
FIGS. 43A to 43C show signal waveform mixed with an intense interference wave the intensity of which exceeds anti-interference wave capability of the apparatus.
Figure 43B:
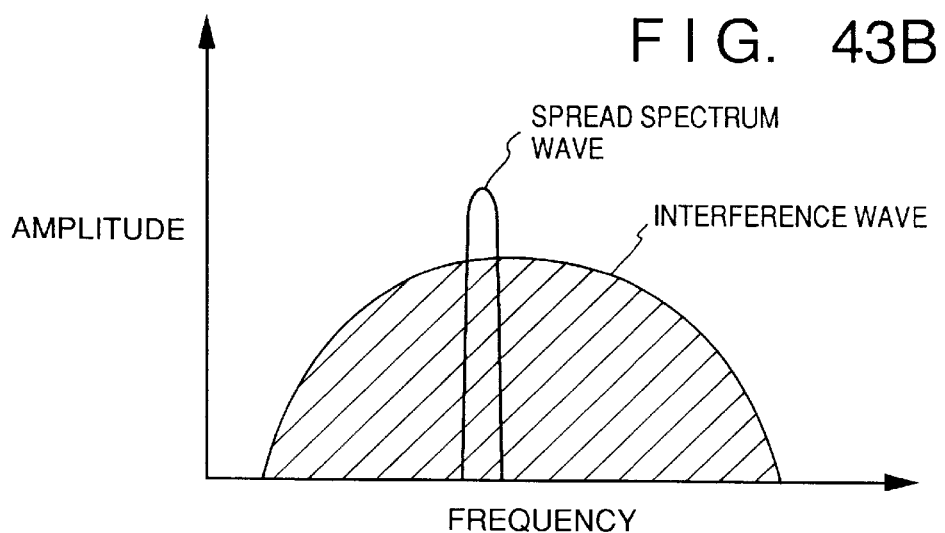
Figure 43C:
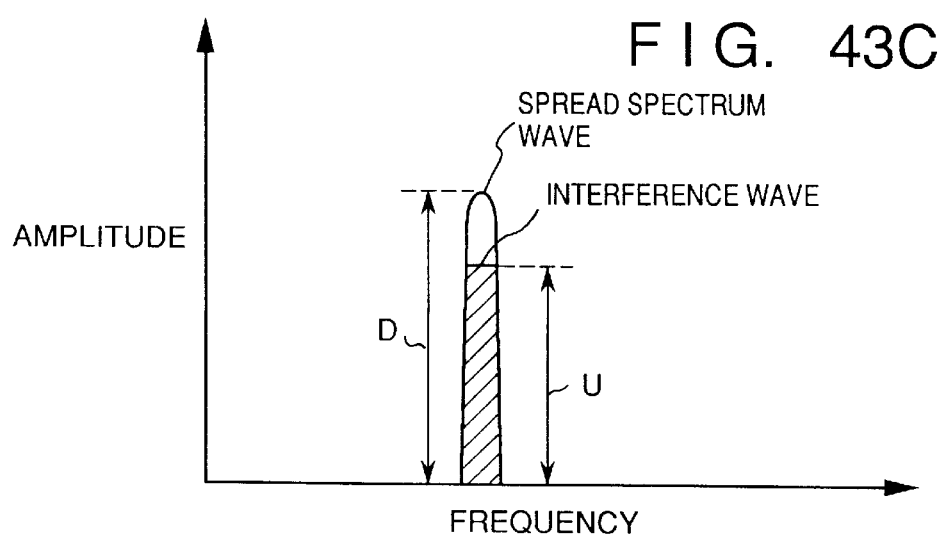
Figure 44:
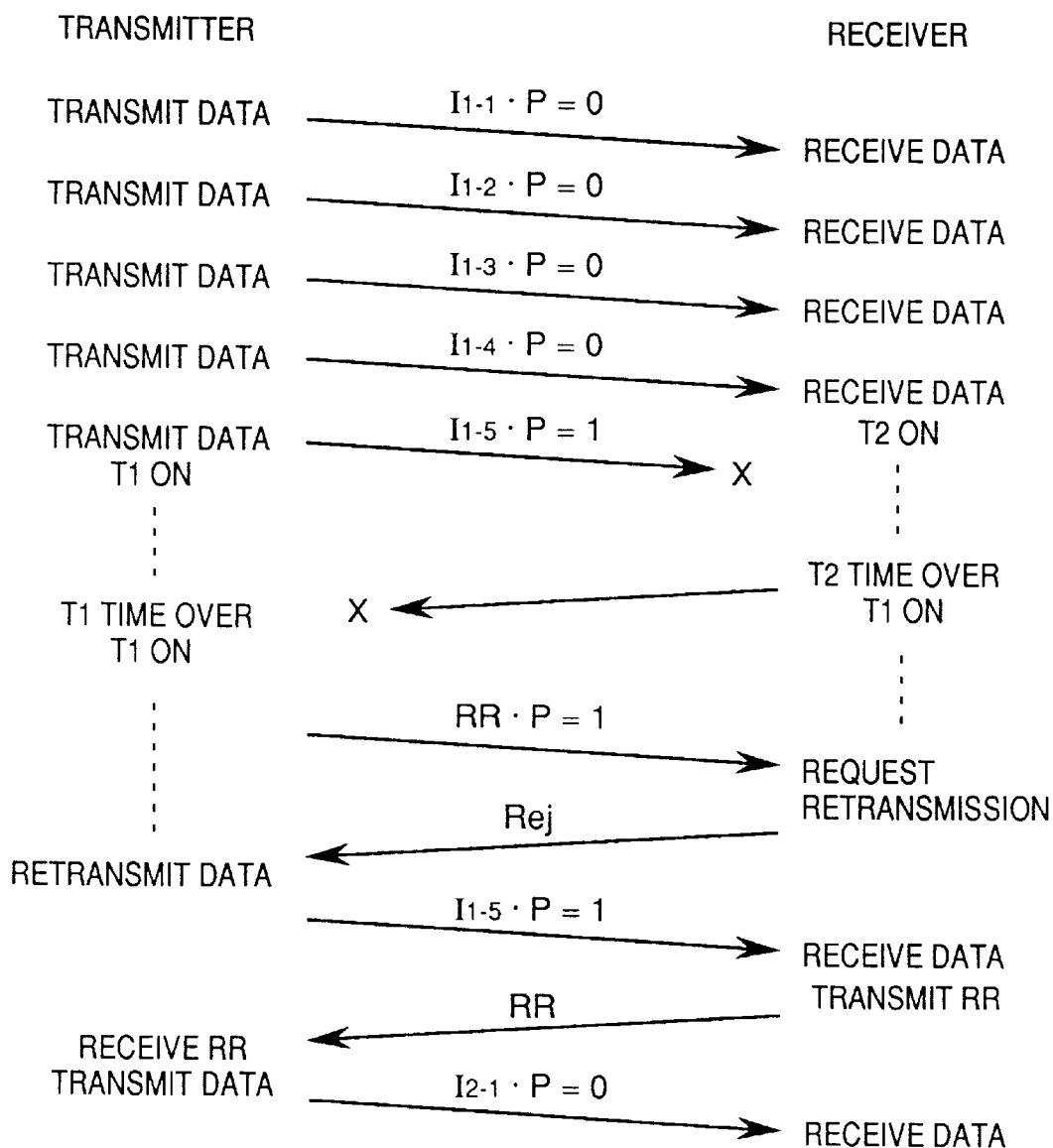
FIG. 44 illustrates rejection procedure (Rej) in retransmission according to HDLC procedure.
Figure 45:
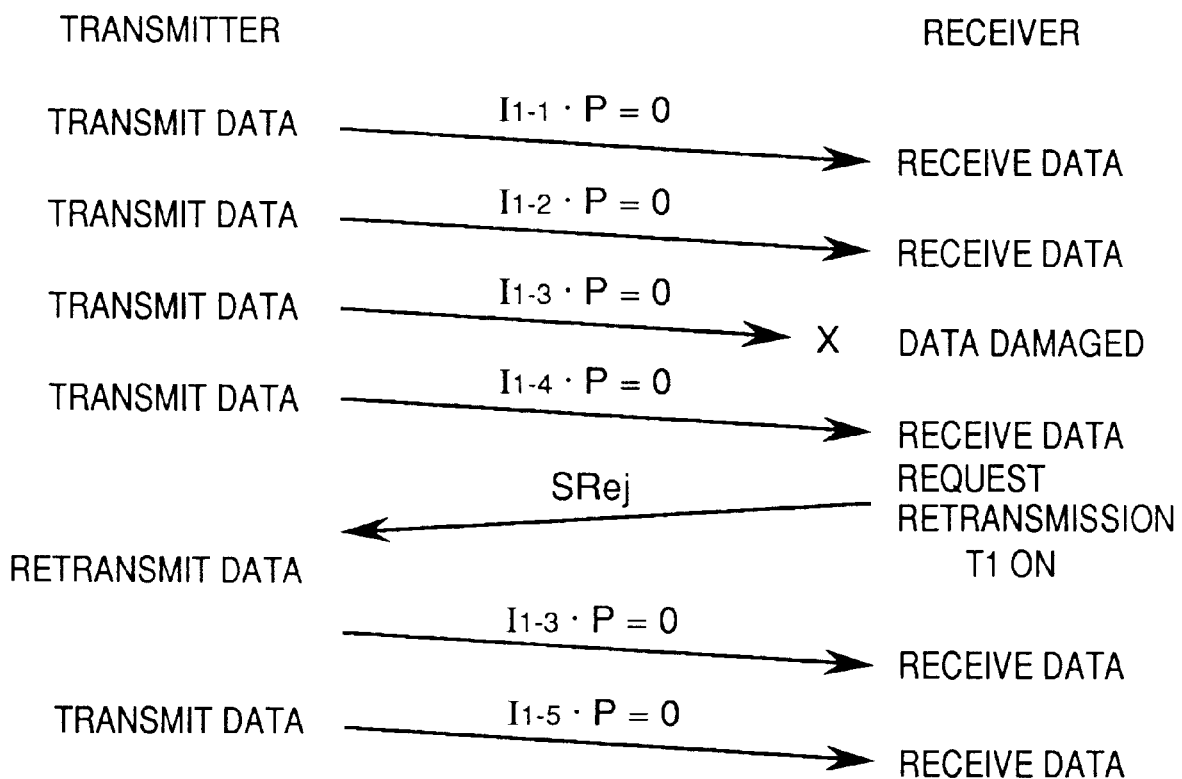
FIG. 45 illustrates selective rejection procedure (SRej) in retransmission according to the HDLC procedure.
Figure 46:
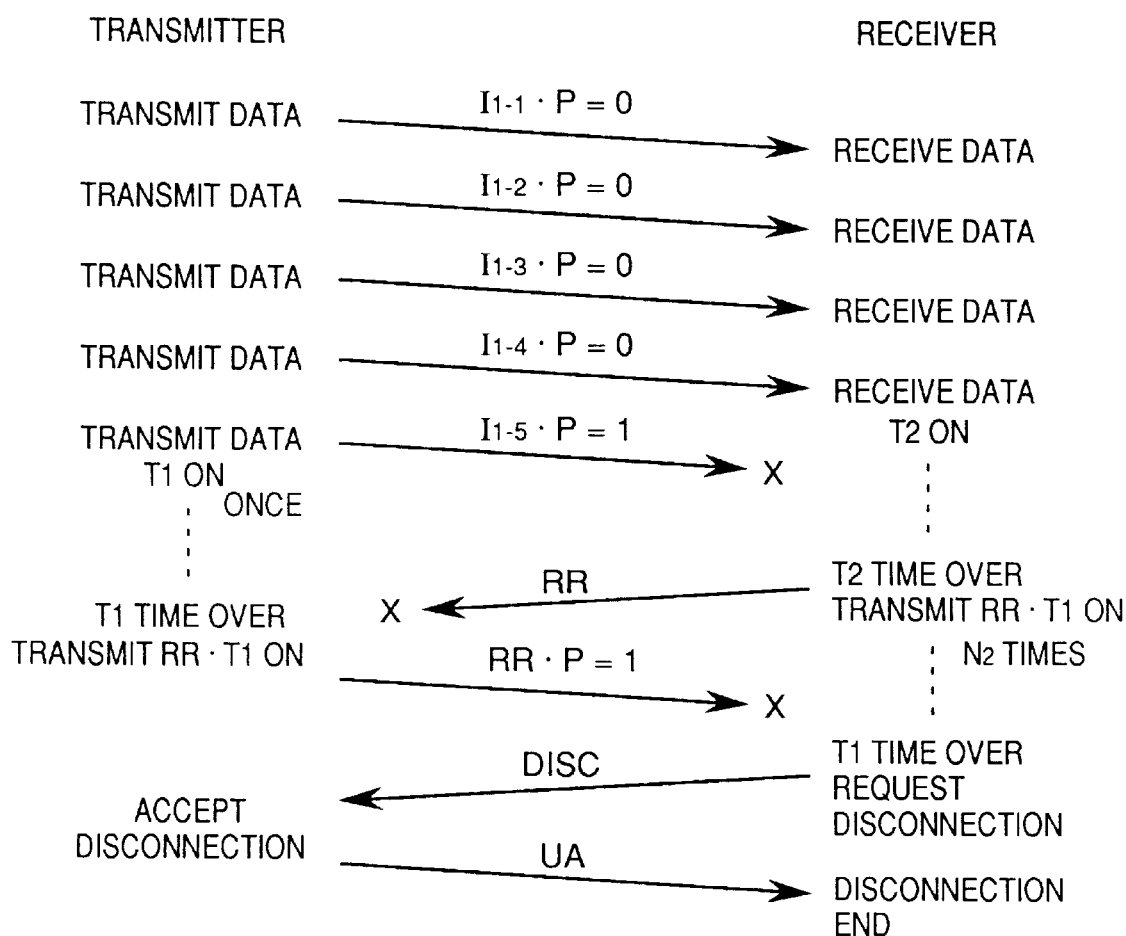
FIG. 46 illustrates data link disconnection in retransmission according to the HDLC procedure where the number of retransmission exceeds a retry maximum number.
Figure 47:
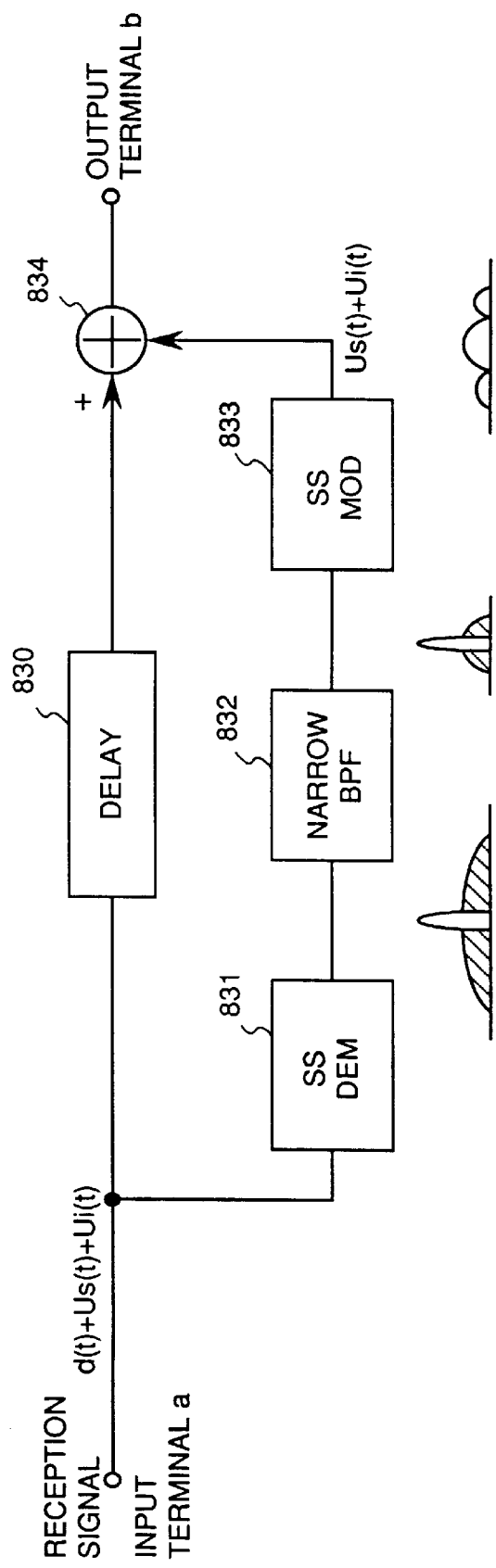
FIG. 47 is a block diagram showing the configuration of a demodulator in a conventional spread spectrum modulation communication system.
Figure 48:
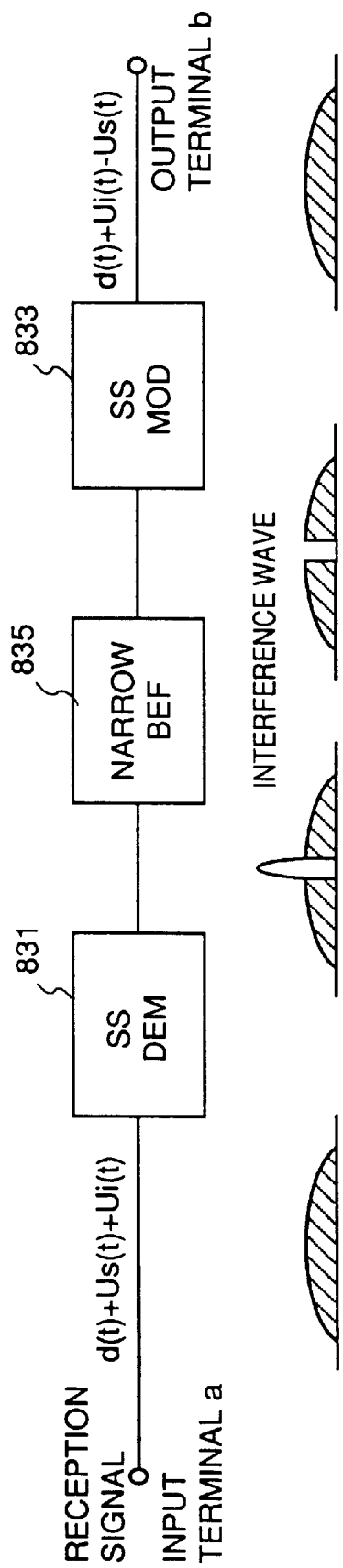
FIG. 48 is a diagram for explaining elimination of a narrow band spread spectrum demodulated signal using narrow band elimination filter after spread spectrum demodulation and spread spectrum modulation thereafter.
Figure 49:
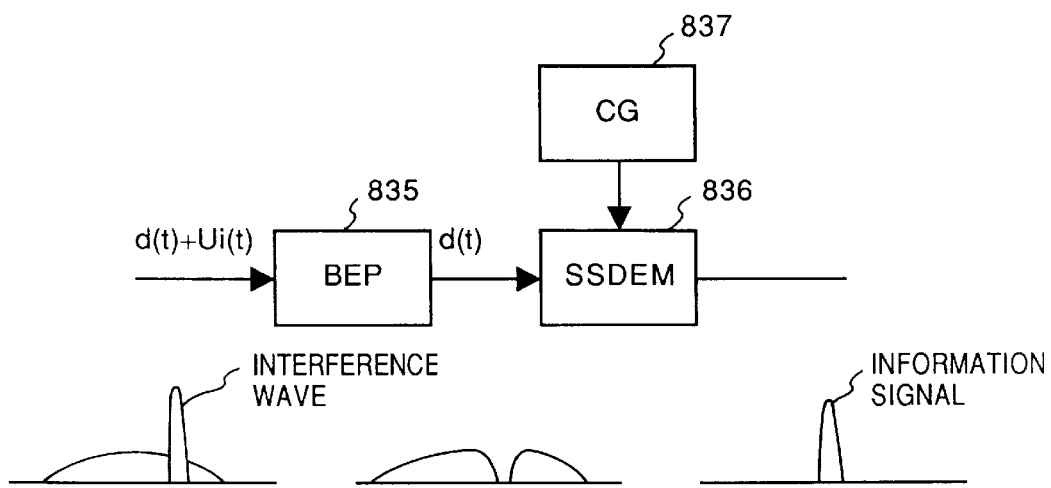
FIG. 49 is a diagram for explaining elimination of interference wave included in a reception signal using the narrow BEF before input into a spread spectrum demodulator and spread spectrum demodulation thereafter.
Figure 50:
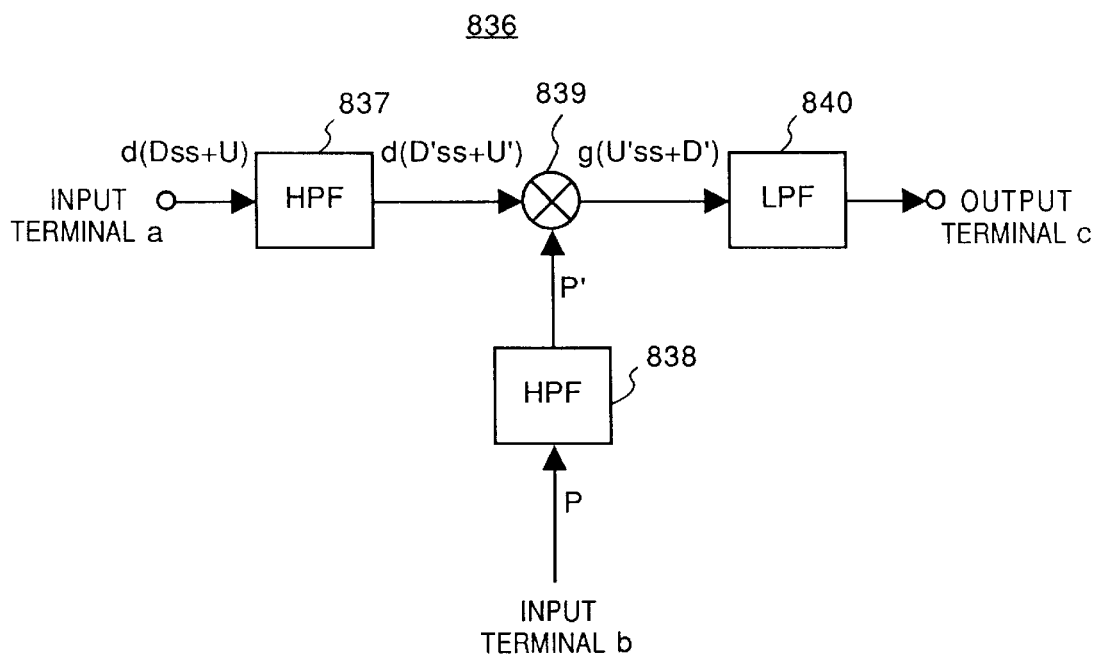
FIG. 50 is a block diagram showing the configuration of the spread spectrum modulator of FIG. 49.
Figure 51:
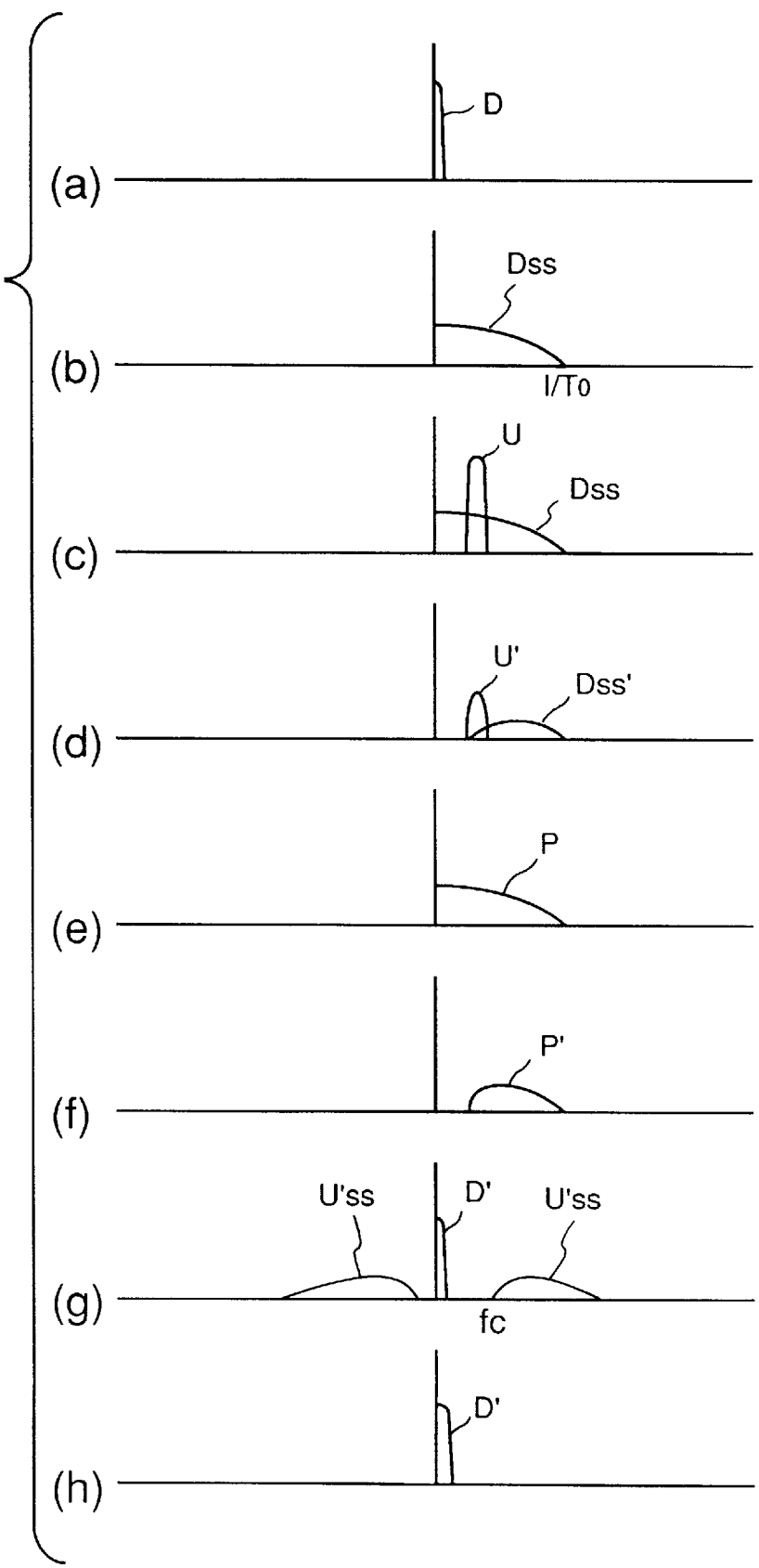
FIG. 51 illustrates a change in a signal waveform by interference wave elimination by the spread spectrum demodulator.
Figure 52:
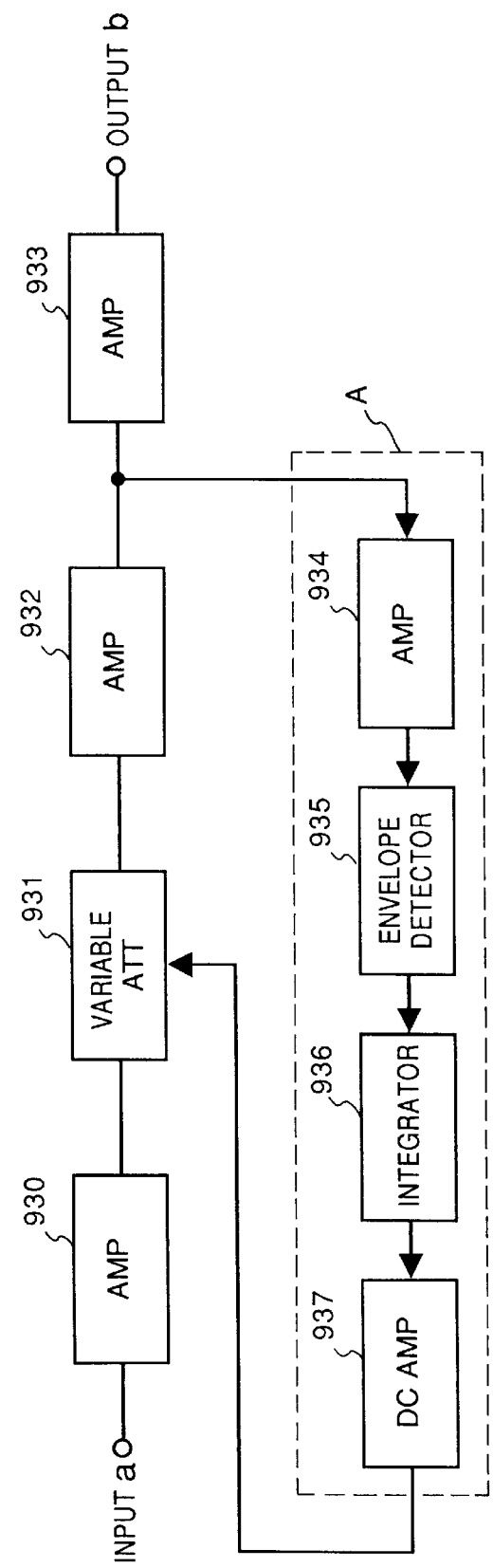
FIG. 52 is a block diagram showing an intermediate frequency amplifier (IF AMP) with an automatic gain controller in a conventional spread spectrum modulation communication apparatus.

As described above, if the interference wave is not intense, the switch 108 selects the ground side, and the adder 109 output becomes the delay circuit 104 output. As the spectrum signal waveform at this time is as shown in FIG. 42A and the spectrum signal waveform after the spread spectrum demodulation and before data modulation is as shown in FIG. 42C, the ratio of the spread spectrum wave to interference wave is large. In this case, stable demodulation is possible.

In contrast, if the interference wave is intense, the switch 108 selects the BPF 105 side. As the delay circuit 104 and the BPF 105 have the same delaying characteristic, the adder 109 subtracts the BPF 105 output from the delay circuit 104 output to generate a signal in which only the interference wave band signal is eliminated.

Figure 2B:
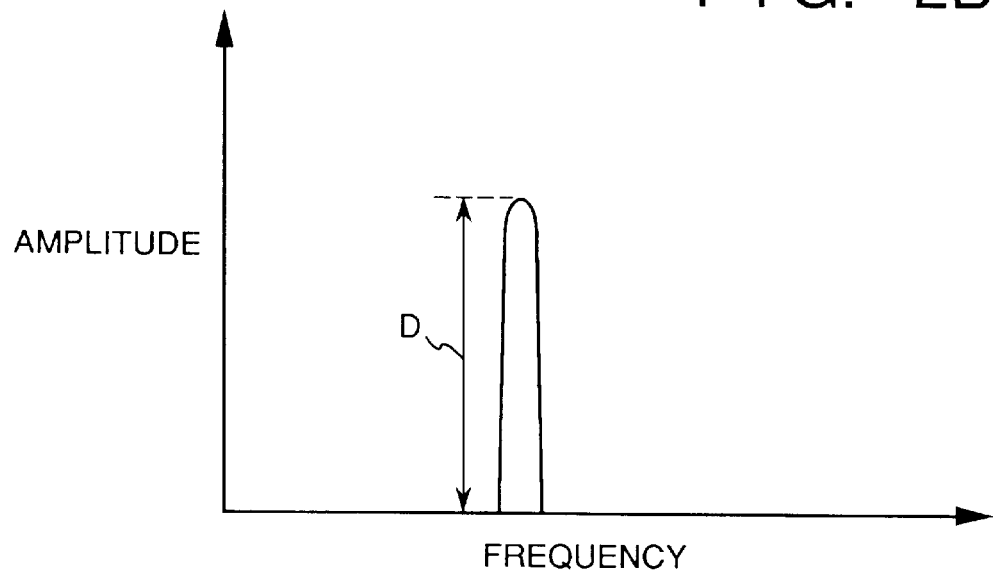
FIG. 2B illustrates spectrum signal waveform in case where the spectrum signal in FIG. 2A is demodulated.

The spectrum signal waveform in this case is as shown in FIG. 2A, and the spectrum signal waveform after spread spectrum demodulation and before data demodulation is as shown in FIG. 2B. Accordingly, the interference wave can be eliminated and stable demodulation is possible.

As described above, in this embodiment, a radiowave of interference wave band can be eliminated in accordance with the interference wave amplitude. Accordingly, the switch 108 opens/closes the path between the BPF 105 and the adder 109 based on the spread spectrum wave/interference wave ratio.

However, the present invention is not limited to this arrangement. For example, as shown in FIG. 3, the delay circuit 104, the switch 108 and the adder 109 can be replaced with band elimination filter (BEF) 111 and switch 112. In this construction, if an intense interference wave mixes in an input signal, the switch 112 selects the BEF 111 side in accordance with the judgment circuit 107 output to prevent the intense interference wave from being inputted into the demodulator 110. If the interference wave is not intense, the switch 112 selects the RF AMP 103 output side, and the RF AMP 103 output is demodulated.

[Second Embodiment (FIGS. 4–16)]

FIG. 4 is a block diagram schematically showing the configuration of a communication apparatus according to a second embodiment of the present invention. In this embodiment, a pair of communication apparatuses 200 and 210 perform communication according to the HDLC (High level Data Link Control) procedure, and if an intense interference wave mixes with an input signal during communication, perform recovery according to the HDLC procedure.

In FIG. 4, the communication apparatus 200 (210) has wireless protocol controller 201 for controlling wireless interval protocol, transmitter 202 for data transmission, transmission status detector 203 for detecting data transmission status, transmission antenna 204, reception antenna 205, transmission status controller 206 for judging transmission status and notifying the judgment result to the transmitter 202 and the wireless protocol controller 201, reception demodulator 207 for reception demodulation including synchronization seizure, synchronization hold and bit error correction, reception status controller 208 for judging data reception status and notifying the judgment result to the wireless protocol controller 201.

Figure 5:
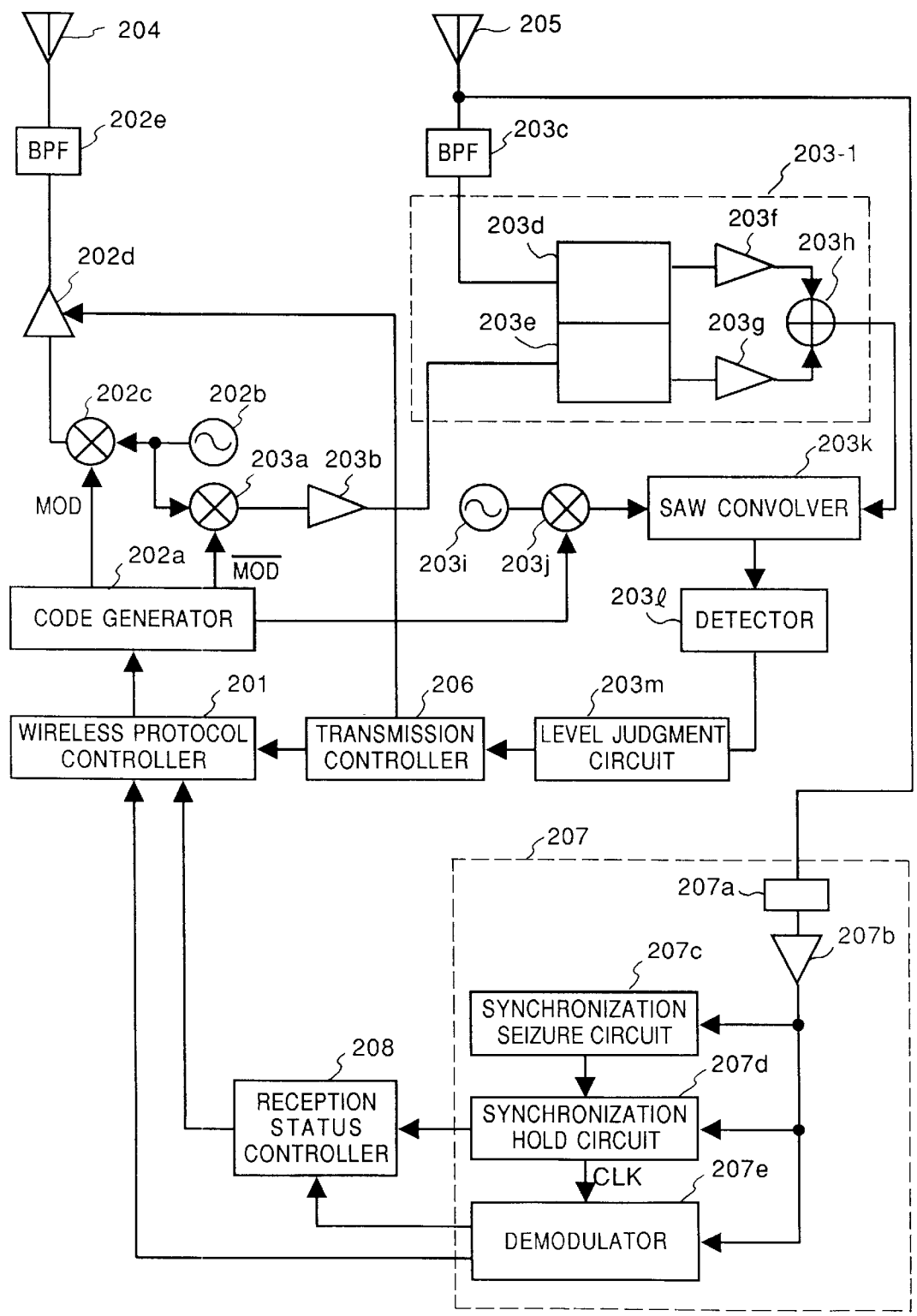
FIG. 5 is a block diagram showing the configuration of transmission/reception circuits in the second embodiment.

FIG. 5 is a block diagram showing the configuration of the transmission and reception circuits of the apparatus.

The transmitter 202 has code generator 202a for generating a spread spectrum code, oscillator 202b for generating a carrier frequency signal, mixer 202c for modulating the carrier signal using the spread code generated by the code generator 202a, amplifier (AMP) 202d for amplifying the spread signal to a transmission voltage level, and band-pass filter (BPF) 202e for passing a transmission band frequency signal.

The transmission status detector 203 has mixer 203a for modulating a carrier signal using a spread code generated by the code generator 202a, AMP 203b for amplifying an inverted-phase signal of a transmission signal inputted from the reception antenna 205, i.e., a direct wave, BPF 203c for passing a transmission band frequency signal, and cancel circuit 203-1 for eliminating transmission signal directly inputted into the reception antenna 205 i.e. direct wave. Note that the cancel circuit 203-1 performs 2 PSK (phase shift keying) cancellation, however, it may perform other cancellations, e.g., FSK (frequency shift keying).

Figure 6:
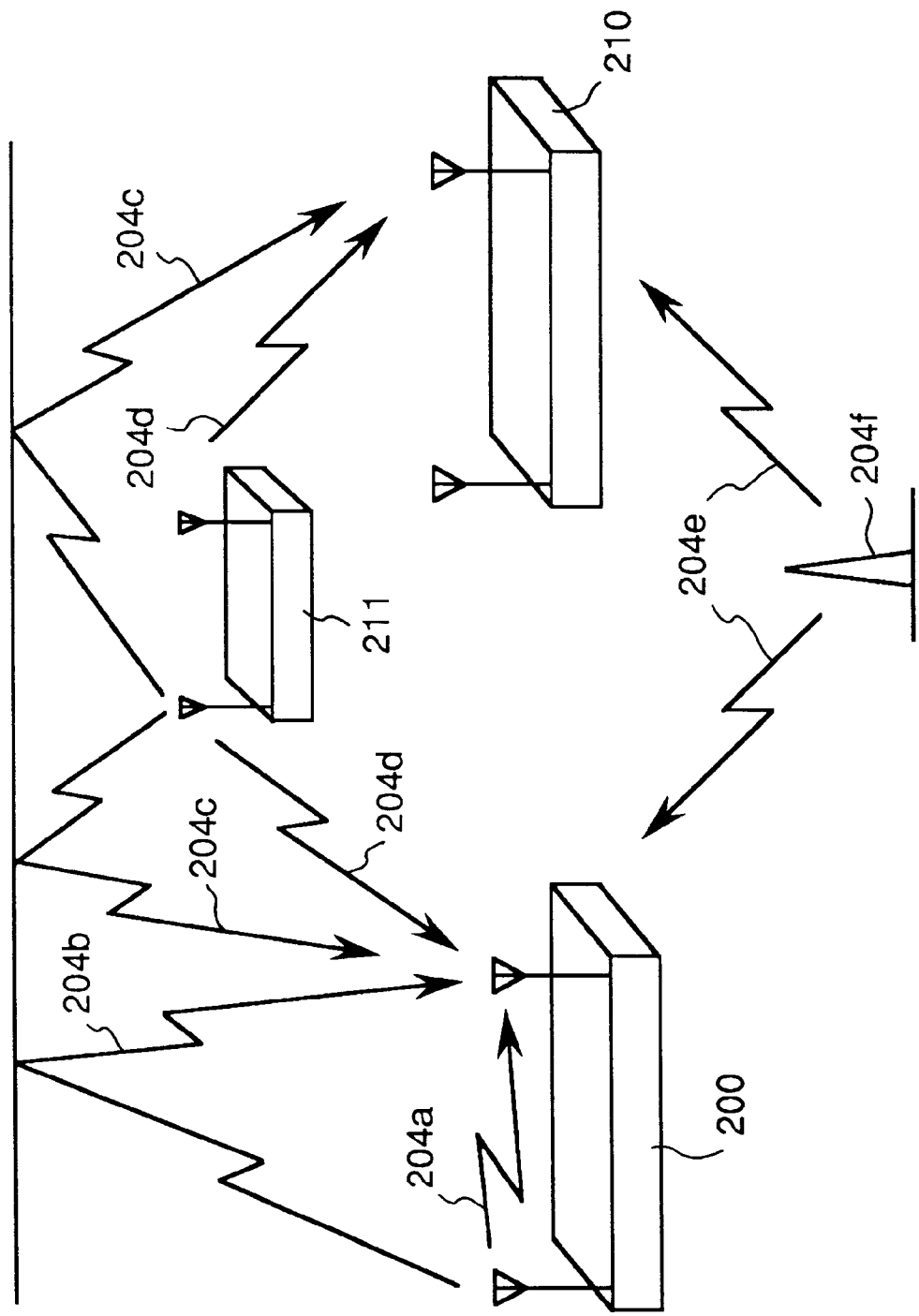
FIG. 6 illustrates radiowave propagation in the second embodiment.

The cancel circuit 203-1 has delay circuits 203d and 203e for matching the phase of the inverted-phase signal for eliminating direct wave and the phase of the direct wave, AMP's 203f and 203g for amplifying the signals from the delay circuits 203d and 203e, and adder 203h for adding the signals. As shown in FIG. 6, as the transmission antenna 204 and the reception antenna 205 are located at fixed positions, delay amount of the direct wave 204a becomes constant. The delay circuits 203d and 203e are adjusted based on this constant delay amount.

The transmission status detector 203 has SAW convolver 203k for outputting correlation between a reference signal and signals other than the direct wave (e.g. a reflection wave of the transmission signal), oscillator 203i for generating a carrier for the reference signal, mixer 203j for modulating the carrier using a spread code from the code generator 202a, detector 203l for detecting the SAW convolver 203k output, and level judgment circuit 203m for generating a status signal based on the detector 203l output level.

The reception demodulator 207 has BPF 207a for eliminating frequency signals other than the reception signal frequency signal, AGC (automatic gain control) AMP 207b for amplifying the reception level to a constant value, synchronization seizure circuit 207c for seizing initial synchronization from a reception wave, synchronization hold circuit 207d for holding the synchronization seized by the synchronization seizure circuit 207c, and demodulator 207e including a bit-error corrector.

FIG. 6 illustrates radiowave propagation in this embodiment.

In FIG. 6, the communication apparatuses 200 as the main unit of communication in the second embodiment and the communication apparatus 210 having the same construction as that of the apparatus 200, another communication apparatus 211 which performs spread spectrum modulation, and a high-output narrow band interference wave originator 204f are included in the radiowave propagation environment. Signal 204a is a direct wave from the apparatus 200 (transmission wave from the apparatus 200 directly received by the apparatus 200); signal 204b, a reflection wave of the apparatus 200 transmission signal; signal 204c, a reflection wave of a transmission signal from the apparatus 211; signal 204d, a direct wave from the apparatus 211; and signal 204e, a high-output narrow band interference wave from the narrow band interference wave originator 204f (e.g., aeronavigation radar).

FIGS. 7B, 8B and 10B show radiowave statuses within a transmission frequency band of the communication apparatus 200 during transmission. Further, FIGS. 7A, 8A, 9 and 10A show waveforms detected by the transmission status detector 203 during transmission of the apparatus 200. These diagrams show signal statuses after cancellation of the direct wave 204a by the cancel circuit 203-1.

FIG. 7A shows a case where the reflection wave 204b of the apparatus 200 transmission signal is detected (FIG. 7B). FIGS. 8A and FIG. 9 show a case where the reflection wave 204b and another spread signal from another station which uses the same code and the same frequency band (in FIG. 6, signals 204c and 204d from the apparatus 211) are detected (FIG. 8B). FIG. 10A shows a case where the reflection wave 204b and the narrow band interference wave 204e such as signals from an aero-navigation radar are detected (FIG. 10B).

Next, the operations of the communication apparatus 200 will be described with reference to FIGS. 7A to 10B and FIG. 11 which illustrates data communication control.

First, data transmission operation will be described below.

The transmission controller 206 examines a status signal outputted from the transmission detector 203. If the transmission controller 206 judges that the space propagation condition is "fine", it transmits a TXOK signal to the wireless protocol controller 201, and if not, (e.g., the communication apparatus 211 is performing communication using the same frequency and the same code, or degradation of the wireless communication path due to the high-output narrow band interference wave 204e has occurred), the controller 206 transmits a TXNG signal to the wireless protocol controller 201 to keep the transmission AMP 202d turned off. When the wireless communication path has recovered, the controller 206 transmits a TXOK signal as transmission permission.

The wireless protocol controller 201 receives the TXOK signal, and if there is data to be transmitted, provides the transmission data to the code generator 202a. If the data is "1", the code generator 202a outputs a spread code block (one period) to the mixer 202c without inversion. If the data is "0", the code generator 202a inverts the spectrum code block and outputs the inverted spread code block to the mixer 202c. Further, the code generator 202a outputs an inverted spread code to the mixer 203a if the data is "1", while outputs a non-inverted spread code to the mixer 203a if the data is "0".

The mixers 203a and 202c secondarily modulate a carrier signal from the oscillator 202b using the spread code modulated corresponding to the transmission data and output the secondarily-modulated carrier signal to the AMP's 202d and 203d.

The AMP 202b output (spread signal) enters the BPF 202e where high-frequency component is cut off, and the data is transmitted as transmission signal 204a from the transmission antenna 204.

The transmission signal 204a includes signals such as a reflection wave on space propagation, and is received by the reception antenna 205 as a reception direct wave. This reception signal is separated into reception wave for status detection and reception wave for data reception by transmission BPF 203c having the same pass band as that of the transmission BPF 202e and the BPF 207a having a different pass band.

The reception wave for status detection, i.e., the reception wave including the reflection wave 204b of the transmission signal passes through the BPF 203c and enters the delay circuit 203d for phase matching for the cancel circuit 203-1.

On the other hand, the AMP 203b amplifies the spread signal for cancellation modulated by the mixer 203a with inverted-phase signal to the level of the reception direct wave 204a and inputs the adjusted signal into the delay circuit 203e. The AMP's 203f and 203g amplify the signal phase-matched by the delay circuits 203d and 203e, and input the signal into the adder 203h, and signal 212f in which only the reception direct wave 204a component is cancelled is obtained. The signal 212f enters one of two input terminals of the SAW convolver 203k. The reference spread code modulated by the mixer 203j with a inverted-spread code from the code generator 202a based on the carrier generated by the oscillator 203i is inputted into the SAW convolver 203k from the other input terminal. The SAW convolver obtains correlation between the reference spread code and the signal 212f.

The detector 203l detects an envelope out of the SAW convolver 203k correlation output and inputs the detected envelope into the level judgment circuit 203m comprising of a plurality of comparators. The level judgment circuit 203m compares voltage 212a (FIG. 7A) as reception limitation set to the respective comparators with voltage 212b (FIG. 7A) as SAW convolver 203k output detection voltage (voltage which has included only the reflection wave 204b and which has not received noise-level influence), and outputs a level judgment signal indicating the comparison result to the transmission controller 206. The transmission controller 206 recognizes the transmission status in accordance with the signal pattern of the level judgment signal.

Followings are examples of transmission status recognition by the transmission controller 206:

(1) When the direct wave 204a and the reflection wave 204b exist (FIGS. 7A and 7B):

In the output signal from the cancel circuit 203-1 a sharp peak appears only when the SAW convolver 203k output coincides with the reference spread code (213a in FIG. 7A). The detector 203l detects an envelope out of the SAW convolver 203k output. The level judgment circuit 203m compares the detected envelope with predetermined comparison voltages 212a and 212b and outputs comparison signals 213c and 213d to the transmission controller 206. The transmission controller 206 measures pulse periods of the comparison signals 213c and 213d. If a period the same as that of the spread code is obtained for a predetermined period, it is judged that the transmission is normally performed. In case where the reflection wave 204b does not exist, comparison signals 213c and 213d cannot be obtained. In this case, it is also judged that the transmission is normally performed by detecting the status where comparison signals 213c and 213d do not exist for a predetermined period, since if signals 204c and 204d from another station exist, the SAW convolver 203k output can be obtained unless all the transmission data is inverse. In this manner, if the transmission controller 206 judges the transmission status normal, it continuously transmits a TXOK signal to the wireless protocol controller 201.

(2) When the reflection wave 204b and a signal from the narrow band interference wave originator 204f having the same code and the same frequency as those of the reflection wave 204b exist (FIGS. 8A and 8B):

The output 214a from the SAW convolver 203k may be cancelled if the phase is inverted with the respective spread signal data. For this reason, the detected signal 214b is not compared with either of the comparison voltages 212a or 212b, and comparison signals 214c and 214d cannot be transmitted to the transmission controller 206 by spread code period. Accordingly, transmission collision with the transmission by the narrow band interference wave originator 204f can be recognized by detecting lack of the comparison signals 214c and 214d.

(3) When the reflection wave 204b and a signal from the narrow band interference wave originator 204f having the same code and the same frequency with timing shifted by one spread code chip from the reflection wave 204b exists (FIG. 9):

The SAW convolver 203k output has twin peaks as shown in 215a of FIG. 9. (Basically, in bidirectional communication using the same code and the same frequency, carrier sense is performed before transmission signal is outputted, therefore, these peaks do not appear.) In this case, the detection signal becomes as shown in 215b of FIG. 9. The level judgment circuit 203m judges these peaks and transmits a plurality of pulses as shown in 215c and 215d of FIG. 9. The transmission controller 206 recognizes that interference wave exists, at this time transmits a TXNG signal to the wireless protocol controller 201 and outputs an output-off signal to the transmission AMP 202d.

(4) When the direct wave 204a and the narrow band interference wave 204e exist (FIGS. 10A and 10B)

The cancel circuit 203-1 eliminates the direct wave 204a. The narrow band interference wave 204e is discriminated in accordance with the SAW convolver 203k output.

First, if the level of the narrow band interference wave 204e is low, noise level of the SAW convolver 203k output becomes higher to some extent than that of the SAW convolver 203k output 213a (FIG. 7A). However, as far as the noise level of the SAW convolver 203k output is not over the reception limitation voltage 212a, communication is possible, and the transmission controller 206 recognizes that degradation of communication status occurs.

On the other hand, when the narrow band interference wave 204e is high-output wave such as a wave from an aero-navigation radar, even though the cancel circuit 203 eliminates the direct wave 204a, the noise level of the SAW convolver 203k output 216a is very high as well as the correlation peaks, as shown in FIG. 10A. In this case, many of the detection output 216b peaks exceed the comparison voltage 212a. Accordingly, the level judgment circuit 203m transmits a plurality of pulses as judgment signal 216c. The transmission controller 206 recognizes that the transmission is impossible.

Further, if interference wave from another station exists and its level is high, the SAW convolver 203k output becomes similar to the above status. The transmission controller 206 recognizes that the transmission is impossible, transmits a TXNG signal to the wireless protocol controller 201 and transmits a transmission-off signal to the transmission AMP 202b.

The wireless protocol controller 201 that receives a transmission status signal (TXOL or TXNG) from the transmission controller 206 performs the following operations based on the transmission status signal.

Figure 11:
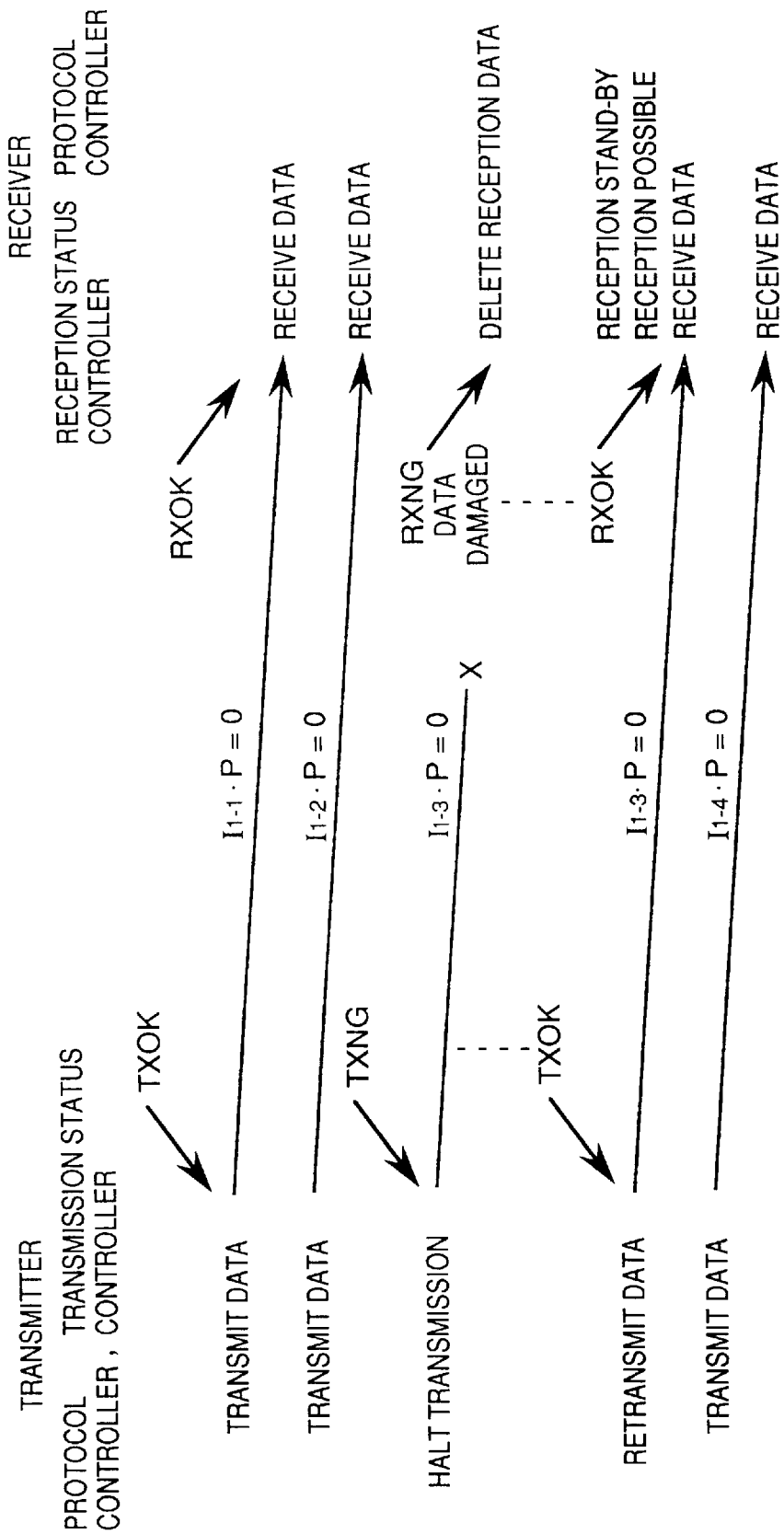
FIG. 11 illustrates data communication control.

In FIG. 11, when the wireless protocol controller 201 receives a TXOK signal, similarly to the conventional protocol, it sequentially transmits transmission data (I) in packet mode as $I_{1-1}$, $I_{1-2}$ . . . . If the wireless protocol controller 201 receives a TXNG signal from the transmission controller 206 during transmission of data packet $I_{1-3}$, it stops the transmission of the data packet $I_{1-3}$, and transmits a communication halt signal to a user interface (not shown). The user interface sets the data transmission in waiting status. The wireless protocol controller 201 waits for a TXOK signal from the transmission controller 206.

Thereafter, when the wireless protocol controller 201 receives a TXOK signal, it retransmits the data packet $I_{1-3}$, then returns to the initial normal data transmission sequence.

Next, data reception by the communication apparatus 210 having the same construction as that of the apparatus 200 will be described below.

In the communication apparatus 210, a data signal received from the reception antenna 205 passes through the BPF 207a which passes only a reception band signal, and enters, via the AGCAMP 207b, the synchronization seizure circuit 207c, the synchronization hold circuit 207d and the demodulator 207e.

The reception demodulator 207 performs initial synchronization by the synchronization seizure circuit 207c comprising such as a SAW convolver, a detector and a counter. When the synchronization is completed, the synchronization seizure circuit 207c outputs the synchronized timing and a signal detected from the SAW convolver output to the synchronization hold circuit 207d.

The synchronization hold circuit 207d transmits a clock and a code for spread spectrum demodulation to the demodulator 207e while maintaining synchronization using such as a DLL (delay lock loop) circuit. The demodulator 207e performs spread spectrum demodulation and bit error correction to the reception data, and transmits the data to the wireless protocol controller 201.

The synchronization hold circuit 207d and the demodulator 207e detect the reception status, and the reception status controller 208 judges the reception status.

First, the synchronization hold circuit 207d judges a detection signal from the synchronization seizure circuit 207c in a similar manner to that of the level judgment circuit 203m of the transmission status detector 203, and outputs a judgment signal to the reception status controller 208.

The reception status controller 208 judges the reception status based on approximately similar judgment standards to those of the transmission controller 206. Following is a difference from transmission status judgment by the transmission controller 206.

The reception status controller 208 uses data generated by the bit-error corrector incorporated in the the demodulator 207e as well as the SAW convolver output. More specifically, the bit-error corrector recognizes occurrence of bit error and transmits error information to the reception status controller 208.

The reception status controller 208 examines whether or not burst error has occurred based on the error information. In case of burst error, whether the wireless communication propagation condition is degraded or not is judged in a similar manner to that of the transmission status judgment by the transmission controller 206. Only if degradation of the wireless communication is recognized, it judges that the reception is impossible and transmits a RXNG signal to the wireless protocol controller 201 continuously till the reception status is recovered.

On the other hand, the wireless protocol controller 201 that receives the RXNG signal deletes the packet data $I_{1-3}$ currently being received and stops the reception operation as shown in FIG. 11. The wireless protocol controller 201 transmits a communication halt signal to the user interface, which sets the communication in reception waiting status until the reception status is improved, i.e., the wireless protocol controller 201 receives a RXOK signal.

In this embodiment, the SAW convolver is employed as a correlator between the wireless communication status detection and the initial synchronization seizure of the reception circuit. This arrangement enables monitoring communication by another station by sequentially changing a reference spread code. In a spread spectrum demodulation communication apparatus using a Code Division Multiple Access method, if assignment of a spread code is changed at every communication, the SAW convolver can also be used for detecting an available code. Further, the SAW convolver can be replaced with a matched filter to reduce the number of parts, realizing the function as shown in this embodiment.

As described above, upon data transmission, a direct wave of a transmission signal inputted from the reception antenna can be eliminated and a radiowave level on the transmission frequency band can be detected, to judge transmission data damage status and channel collision status. On the other hand, upon data reception, reception data damage status can be judged based on synchronization holding status and data bit-error status and the data communication can be temporarily stopped and restarted in accordance with the judgment of the frequency band radiowave status. In this manner, as the data communication can be temporarily halted till the space radiowave propagation condition has recovered, wasteful retransmission can be omitted. Further, data link disconnection after retransmission operations can be avoided. Thus, the throughput of data communication can be improved.

As communication status can be recognized in a real-time manner during data communication, this embodiment can achieve improvement of throughput similarly to the conventional SRej procedure by simple control. Moreover, according to this embodiment, transmission data buffer capacity can be saved, since it is not necessary to store data whose amount corresponds to an outstanding number, thus downsizing and reduction of production costs can be attained. Further, in non-communicable status, data communication can be stopped and radiowave output is stopped, thus the apparatus does not influence other systems and effective use of radiowave resources can be attained.

Figure 12:
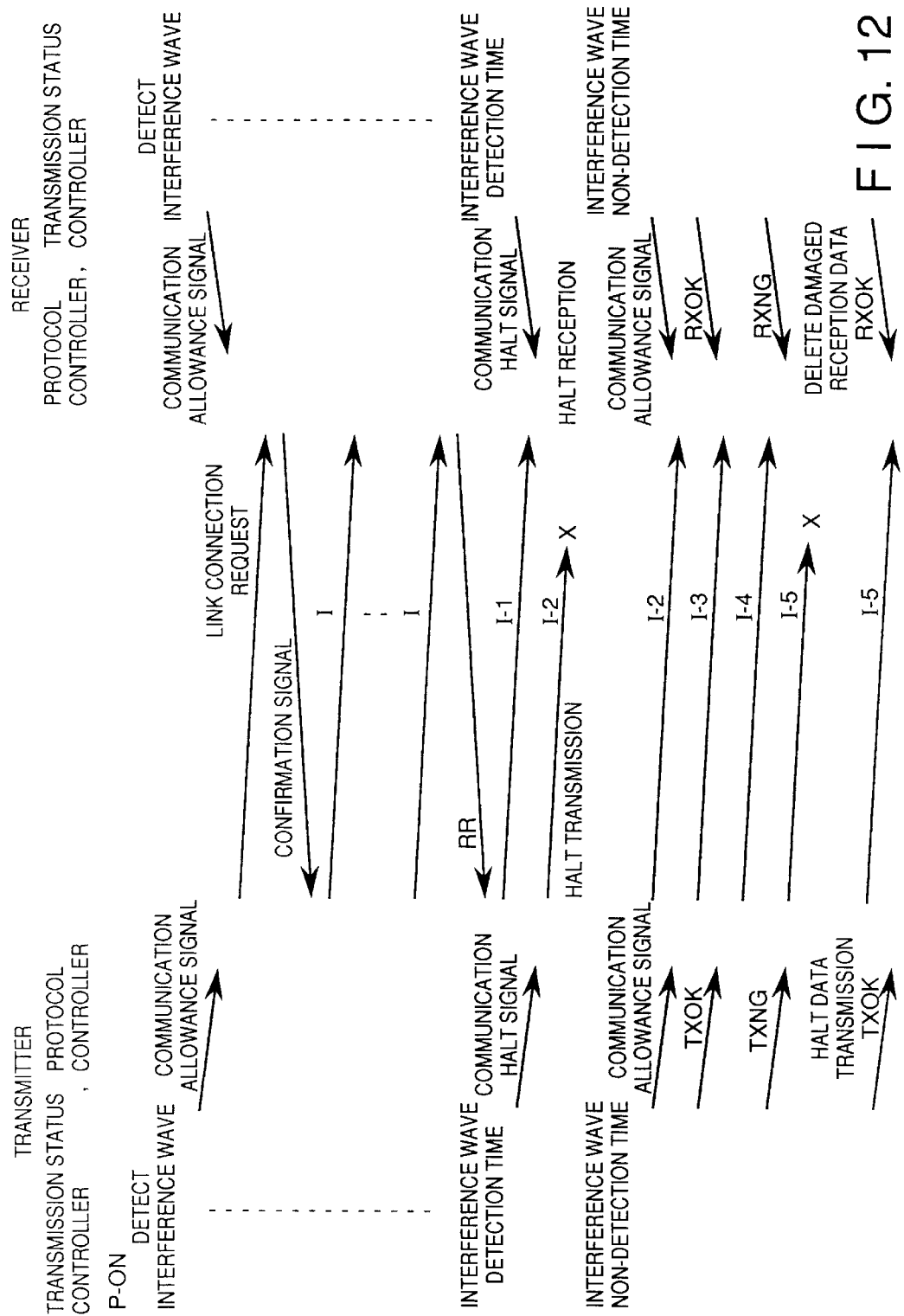
FIG. 12 illustrates data communication control when interference wave transmission status is detected upon activating the communication apparatus 200.

As described above, in this embodiment, presence/absence of interference waves and degradation of communication quality are recognized based on communication status detected during communication in a real-time manner, and the communication is temporarily stopped based on the recognition result. However, the present invention is not limited to this arrangement. For example, when the apparatus is turned on, interference wave transmission status can be detected, and further, period and time of interference wave can be detected. In this case, if a periodical interference wave is detected, transmission can be temporarily stopped and restarted when the interference wave is not detected. FIG. 12 illustrates data communication in this case. It should be noted that in FIG. 12, the operations are not related to poll bit (P) values. Therefore, the poll bit values are omitted and the respective data packet are represented as "frame I".

When the apparatus communication 200 is turned on, the transmission controller 206 measures, for a predetermined period, interference wave detection time outputted from the transmission status detector 203 and interference wave non-detection time detected using an inner timer. In this manner, the transmission controller 206 measures period of generation of interference wave (e.g. aero-navigation radar signal) and interference wave generation time. If interference wave is not detected at this time, the transmission controller 206 judges that there is no periodical interference wave and terminates the interference wave detection operation.

If the wireless protocol controller 201 requires data communication after the interference wave detection, the transmission controller 206 sends a communication allowance signal indicating communication time corresponding to the interference wave non-detecting period to the wireless protocol controller 201. Thereafter, the transmission controller 206 monitors transmission status until the communication time is over and the interference wave detection time begins.

On the other hand, the wireless protocol controller 201 that has received the communication allowance signal sets up link connection of the wireless communication path and starts data communication. If beginning of the interference wave detection time is notified by the inner timer of the transmission controller 206, it transmits a communication halt signal to the wireless protocol controller 201 and starts interference wave detection operation. In this operation, similarly to the measurement when the apparatus was turned on, the transmission controller 206 detects differences between the transmission status detector 203 output and the detection time by the inner timer, and adjusts the difference.

The wireless protocol controller 201 temporarily stops the data transmission upon receiving the communication halt signal, sets data buffer address again for retransmission, and waits for a communication allowance signal.

If the wireless protocol controller 201 receives a communication halt signal in reception stand-by status, it temporarily stops a reception confirmation timer and waits for a communication allowance signal. On receiving the communication allowance signal, the wireless protocol controller 201 restarts the reception confirmation timer.

If the wireless protocol controller 201 receives a communication halt signal during data reception, it deletes the data currently being received, and restarts the reception after receiving a communication allowance signal.

It goes without saying that in this arrangement, transmission/reception status is monitored and the transmission/reception is temporarily stopped upon receiving an intense interference wave.

In the second embodiment, the communication apparatus monitors transmission/reception status and when it receives an intense interference wave, temporarily stops the transmission/reception. However, the present invention is not limited to this arrangement. The communication apparatus may monitor mainly transmission status.

Figure 13:
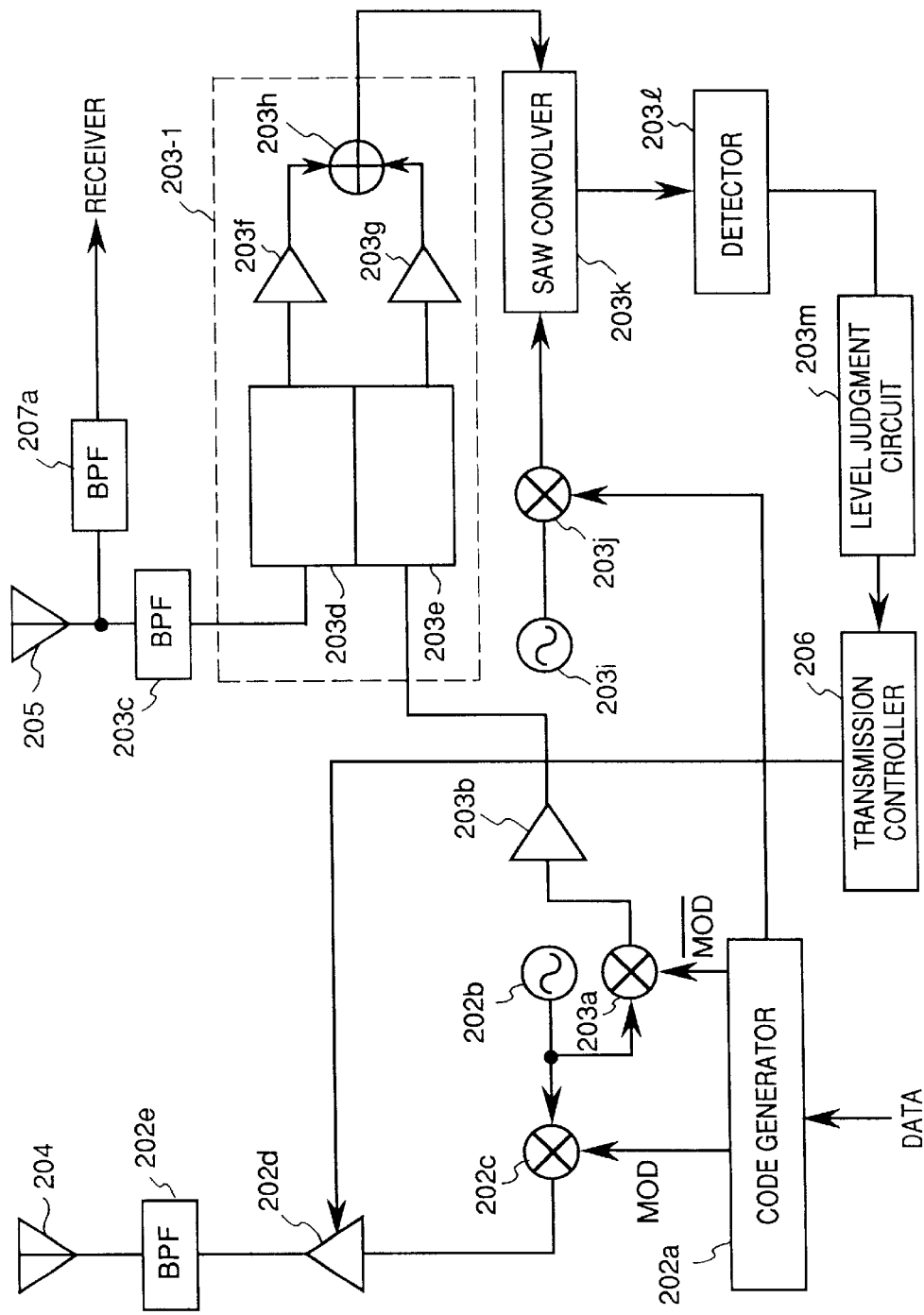
FIG. 13 is a block diagram showing the configuration of a communication apparatus which monitors transmission status.

FIG. 13 is a block diagram showing the configuration of the communication apparatus that mainly monitors transmission status. In FIG. 13, except for the wireless protocol controller 201, the reception demodulator 207 and the reception status controller 208, the apparatus comprises the elements corresponding to those of the apparatus shown in FIG. 4, therefore, the correspondent elements have the same reference numerals. The apparatus of this construction can detect data transmission status by processings similar to those in the second embodiment.

Figure 14:
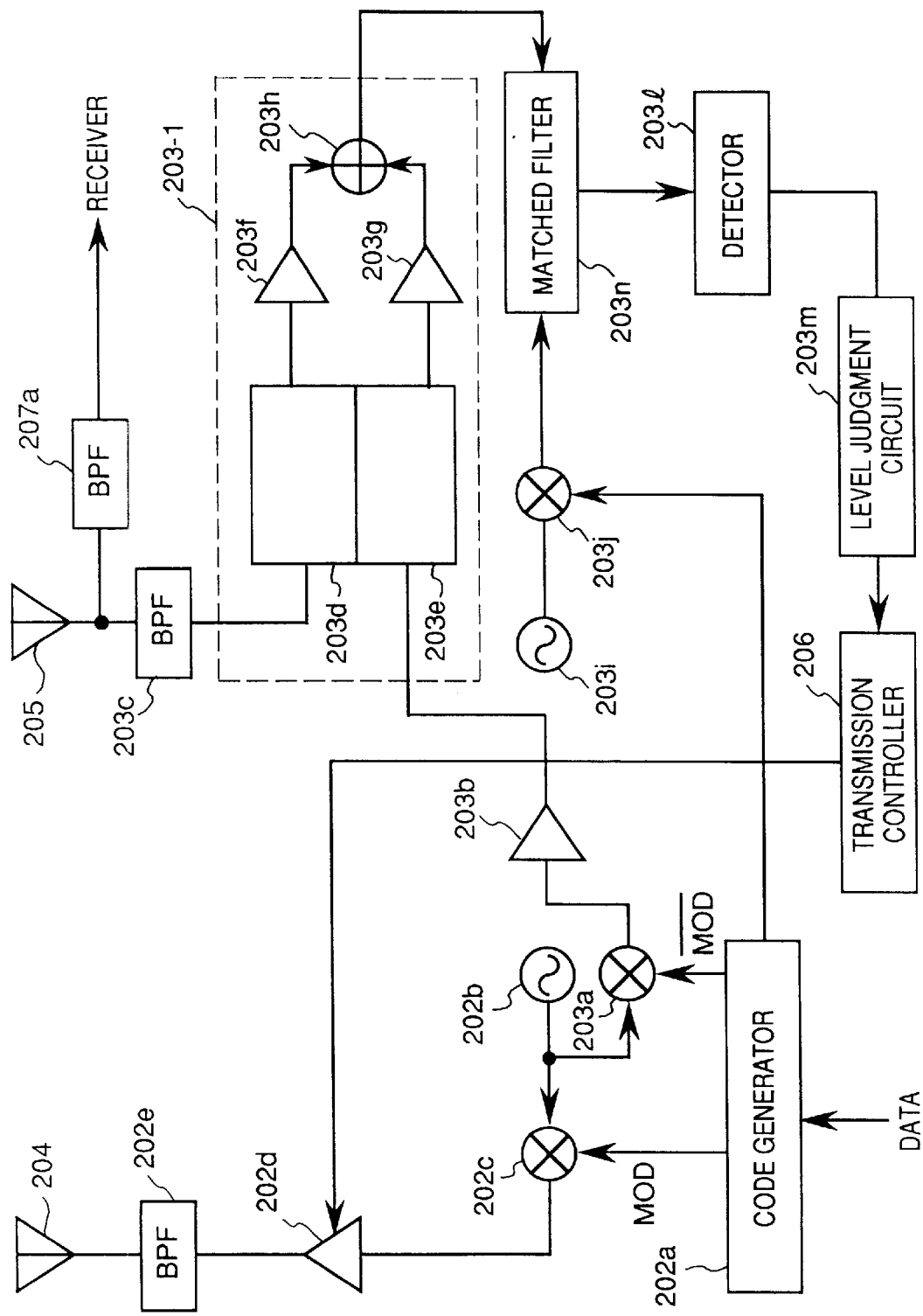
FIG. 14 is a block diagram showing the configuration of a communication apparatus which monitors transmission status using matched filter 203n in place of SAW convolver 203k used in the apparatus of FIG. 13.

Further, as shown in FIG. 14, the SAW convolver 203k of FIG. 13 can be replaced with matched filter 203n for detecting transmission status.

In the second embodiment, an outstanding number is not controlled during data transmission/reception. However, the present invention is not limited to this arrangement. For example, upon data transmission/reception, the outstanding number in the wireless communication path can be changed corresponding to the number of retransmission. More specifically, the outstanding number can be reduced to a low value before the space radiowave propagation condition is recovered, thus wasteful retransmissions can be omitted and the throughput can be improved by simple control. The reduced transmission data buffer capacity in this manner contributes largely to downsizing of the apparatus and reduction of production costs.

Figure 15:
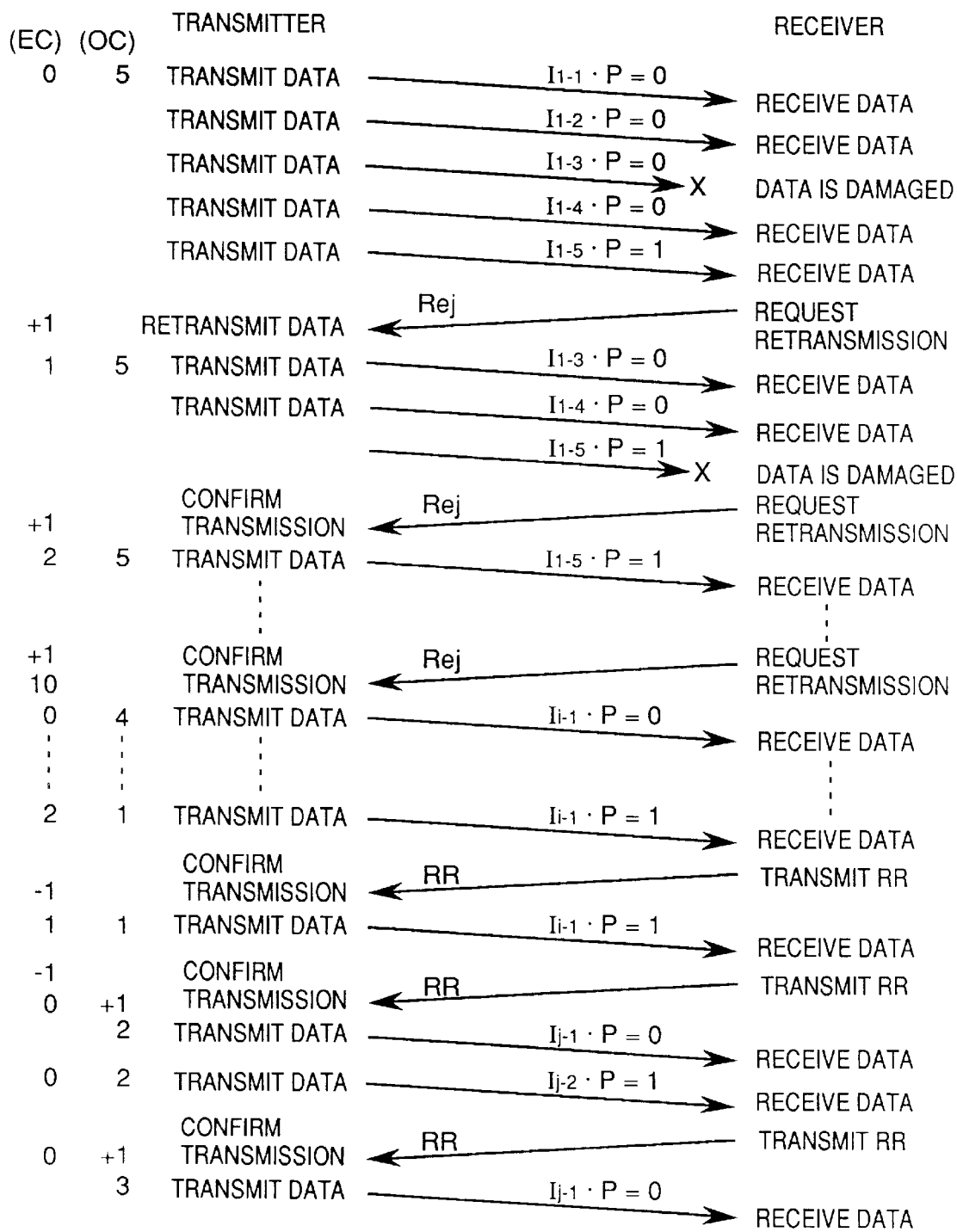
FIG. 15 illustrates data communication control upon controlling an outstanding number.
Figure 16:
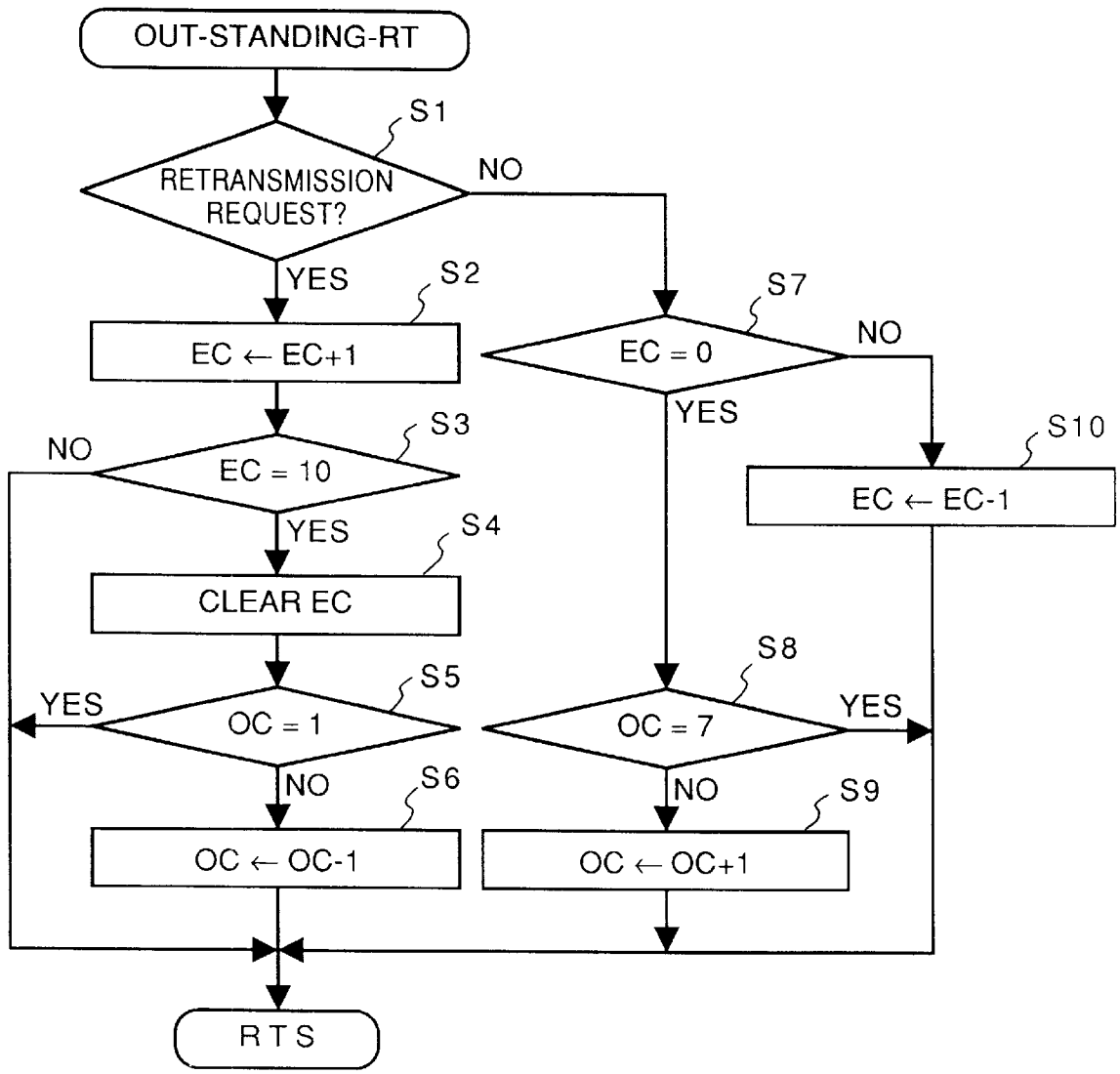
FIG. 16 is a flowchart showing the outstanding number control.

FIG. 15 illustrates data communication control and changing of the outstanding number in the above example, and FIG. 16 is a flowchart showing the outstanding number control.

In FIG. 15, error counter (EC) is provided in a wireless communication path controller (not shown). The count value is incremented (+1) (step S2) by every retransmission request (step S1), and when the value becomes a predetermined value (in FIG. 16, "10"), it is cleared (steps S3 and S4). Further, the EC value is decremented (−1) (step S10) every time it is judged that frame I is correctly transmitted/received, i.e., there is no retransmission request (step S1), unless the value is "0" (the minimum value).

Similarly to the error counter, outstanding number counter (OC) counts an outstanding number set to the wireless communication path controller. Frame I, in which the poll bit value is "0", i.e., reception confirmation request is not made, is retransmitted in accordance with the OC value. The OC value is decremented (−1) (step S6) if it is judged that retransmission of the frame I is performed (step S1) and if the EC value becomes the maximum value "10" (step S3) and the EC value is not the minimum value "1" (step S5).

When the frame I is correctly transmitted, if the EC value is "0" (step S7) and if the OC value is not "7" (modulo is "8") (step S8), the OC value is incremented (+1) (step S9).

The transmission control as shown in FIG. 15 is made using the counters EC and OC as described above. Initially, the EC value is "0" and the OC value is "5".

The communication apparatus on the transmitting side (hereinafter, referred to as "transmitter") transmits frames $I_{1-1}$ to $I_{1-4}$ in which the poll bit value is "0" and frame $I_{1-5}$ having the poll bit "1". However, the communication apparatus on the receiving side (hereinafter, referred to as "receiver") did not correctly receive the $I_{1-3}$ frame data. The receiver deletes the $I_{1-4}$ and $I_{1-5}$ frames, and transmits a Rej signal, requesting retransmission from the $I_{1-3}$ frame.

The transmitter receives the Rej signal, increments the EC value (+1) and retransmits from the $I_{1-3}$ frame.

The receiver correctly receives the retransmitted $I_{1-3}$ and $I_{1-4}$ frames. However, it does not correctly receives the $I_{1-5}$ frame. The receiver transmits a Rej signal again. The transmitter receives the Rej signal, increments the EC value (+1) and retransmits from the $I_{1-5}$ frame.

The EC value increases in this manner, and when it becomes the predetermined threshold value "10", the wireless communication path controller examines the OC value, and if the value is not "1", decrements the value (−1) and retransmits not-received frame(s) I. If the OC value is "1", the poll bit of the frame I is set to "1". The receiver receives the frame I having the poll bit "1", and if the data is correctly received, transmits a reception confirmation signal RR. The transmitter detects the EC value upon receiving the RR signal, and if the EC value is not "0", decrements the value (−1) and retransmits the frame I.

The communication operations are repeated until the EC value becomes "0" and a RR signal is received, when the wireless communication path controller increments the OC value (+1) and sequentially transmits frames I in which the poll bit P is set to "0". At this time, the number of the frames corresponds to the OC value smaller than the incremented (+1) value by one. Thereafter, the wireless communication path controller sequentially transmits I frames in which the poll bit P is set to "1" and waits for a reception confirmation signal RR.

As described above, in accordance with communication status, transmission with reception confirmation or sequential transmission without reception confirmation within a given number of times can be selectively performed. In this manner, data communication can be performed with an appropriate procedure and the highest total throughput.

In FIG. 15, the upper limit of the EC value is fixed. However, the value can be varied in accordance with retransmission requesting status. Further, as the outstanding number is monitored, the following procedure can be added: if retransmission request is continuously received and the outstanding number is not changed from "1", it is recognized that rapid degradation of radiowave propagation condition has occurred and the wireless communication path controller temporarily halts the communication. This arrangement has an advantage in that influence of the degraded propagation condition upon other systems can be suppressed.

In addition, wasteful retransmissions and data link disconnection after retransmission operation can be avoided, thus improving the throughput.

Moreover, the outstanding number can be decreased in accordance with the communication status, and the total throughput can be improved by adding a simple software.

[Third Embodiment (FIGS. 17–21)]

Figure 17:
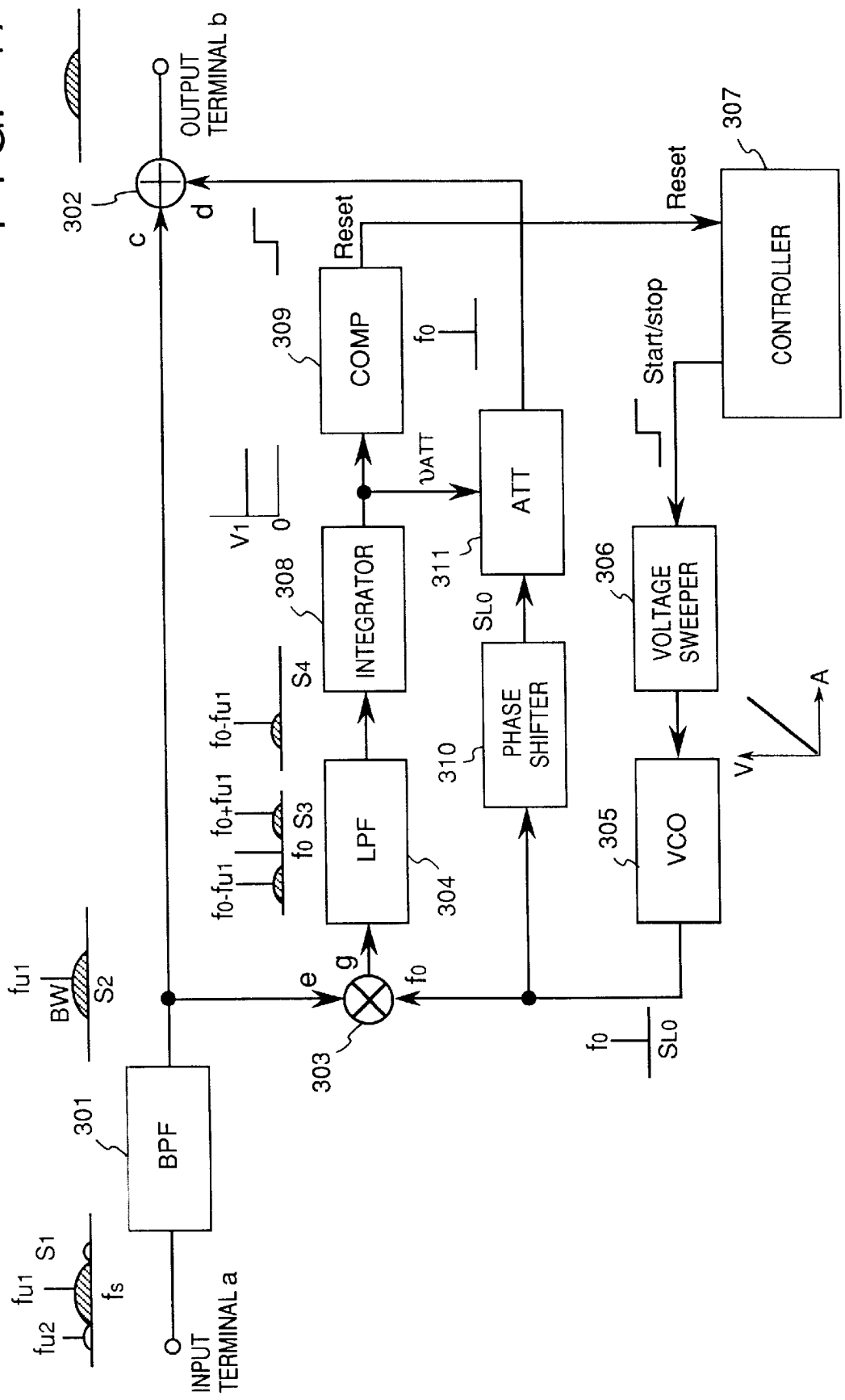
FIG. 17 is a block diagram showing the configuration of a receiver of a communication apparatus for spread spectrum modulation according to a third embodiment of the present invention.

FIG. 17 is a block diagram showing the configuration of a receiver of a spread spectrum modulation communication apparatus according to a third embodiment of the present invention.

In FIG. 17, reference numeral 301 denotes a BPF having a pass band corresponding to a reception spectrum signal band; 305, a voltage controlled oscillator (VCO) whose oscillation frequency varies in accordance with an input voltage; and 306, a voltage sweeper for providing sweeping voltage to an input terminal of the VCO 305.

Further, numeral 303 denotes a multiplier which comprises such as a mixer for multiplying the VCO 305 output signal and a reception signal; 304, a low pass filter (LPF) for cutting off high-frequency component of the multiplier 303 output with a cutoff frequency $f_c$ and outputting only a difference frequency component; 308, an integrator for integrating the LPF 304 output signal and outputting direct current voltage; and 309, a comparator for detecting that the integrator 308 output voltage has become equal to/higher than a predetermined value.

Numeral 310 denotes a 180° phase shifter for inverting the VCO 305 output phase; 311, an attenuator (ATT) for adjusting the 180° phase shifter 310 output signal to an appropriate level in accordance with the integrator 308 output voltage; 302, an adder for adding the ATT 311 output signal to a reception signal from the BPF 301; 307, a controller for controlling the respective elements of the apparatus, especially for controlling, based on the comparator 309 output, starting/termination of sweeping by the voltage sweeper 306.

In the apparatus having the above-described construction, when reception spread spectrum signal $S_1$ including interference wave signal $f_{u1}$ is inputted from an antenna (ANT) (not shown) into reception input terminal a of the BPF 301, in which components other than a reception band signal are eliminated, the BPF 301 outputs reception band signal $S_2$.

The reception signal $S_2$ enters input terminal c of the adder 302 and input terminal e of the multiplier 303. Output signal $S_{LO}$ is inputted into another input terminal f of the multiplier 303.

The voltage sweeper 306 inputs sweeping voltage into the VCO 305 so that the VCO 305 output frequency can be $f_s-BW/2$ to $f_s+BW/2$ ($f_s$=the reception signal central frequency, BW=spread bandwidth). The controller 307 outputs a start/stop signal to the voltage sweeper 306 to start/stop sweeping operation.

Figure 18:
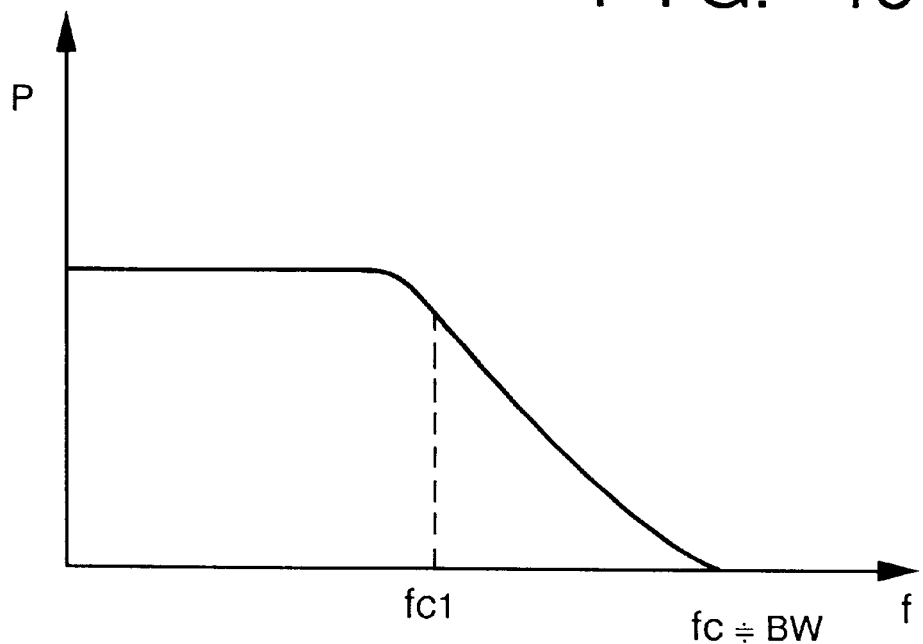
FIG. 18 illustrates frequency characteristic of low pass filter (LPF) 304 in the third embodiment.
Figure 19:
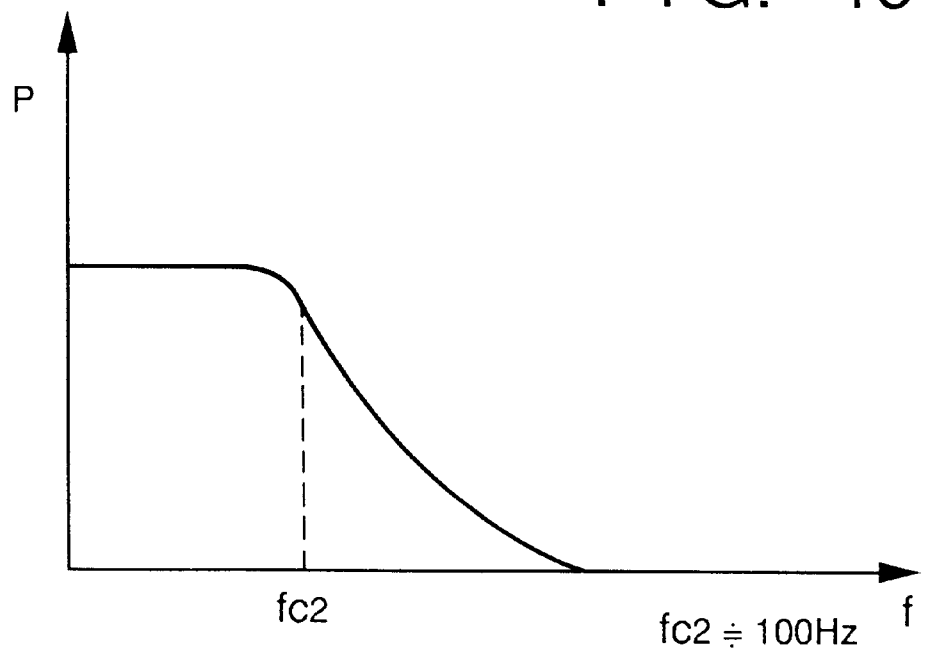
FIG. 19 illustrates frequency characteristic of integrator 308 in the third embodiment.

Accordingly, the multiplier 303 receives the reception spread signal S2 including the interference wave ($f_{u1}$) via the input terminal e, and via the input terminal f, the signal $S_{LO}$ having frequency $f_0$ from the VCO 305. The multiplier 303 outputs spread signal $S_3$ having central frequency $|f_0 \pm f_{u1}|$ full and bandwidth BW into output terminal g of the multiplier 303. The spread signal $S_3$ passes through the LPF 304, in which all the high-frequency components are eliminated, and becomes signal $S_4$ having central frequency $f_0-f_{u1}$ and bandwidth BW. As shown in FIG. 18, a cutoff frequency of the LPF 304 can be approximately BW. If the LPF 304 cutoff frequency is equal to/lower than the BW, the interference component $f_{u1}$ is eliminated in the LPF 304 and cannot be detected.

The LPF 304 output signal $S4(f_0-f_{u1})$ enters the integrator 308. The integrator 308 comprises such as a resistor and a capacitor, and has cutoff frequency ($f_{c2}$) set to approximately 100 Hz.

Accordingly, if the LPF 304 output signal $S_4(f_0-f_{u1})$ is equal to/higher than 100 Hz, the signal is cut off, as a result, the signal $S_4$ never appears in the integrator 308 output. Further, as the integrator 308 output is equal to/lower than a voltage level ($V_a$) of the comparator 309, the comparator 309 does not output a comparison signal.

Figure 20:
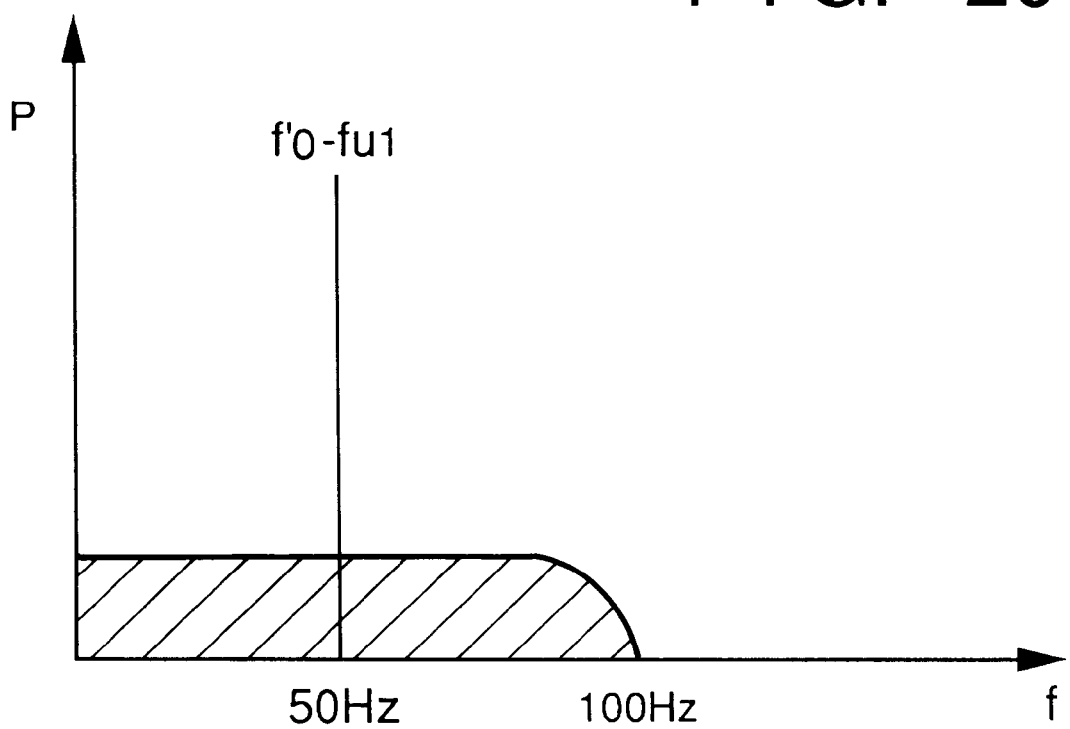
FIG. 20 illustrates output spectrum characteristic of the LPF 304.

If the voltage sweeper 306 voltage increases and the VCO 305 output signal $S_{LO}$ has frequency $f_0'$ which is fully close to the frequency $f_{u1}$ (e.g., $f_0'-f_{u1}=50$ Hz), signal $S_3$ having frequency $|f_0' \pm f_{u1}|$ can be obtained from the multiplier 303 output terminal g, and spread signal $S_4$ having central frequency $f_0'-f_{u1}$ as shown in. FIG. 20 can be obtained from the LPF 304.

The frequency $(f_0'-f_u')$ is low enough for passing the integrator 308. Accordingly, a predetermined level DC voltage ($V_1$) can be obtained from the integrator 308. If the $V_1$ becomes higher than the comparison voltage of the comparator 309, the comparator 309 outputs an output signal ($S_{rest}$) to the controller 307.

The controller 307 provides a stop signal to the voltage sweeper 306 to fix signal $S_{LO}$ frequency from the VCO 305. The frequency of the signal $S_{LO}$ at this time is approximately equal to the interference wave frequency $f_{u1}$. This means that frequency of interference wave can be detected.

The 180° phase shifter 310 inverts the phase of the signal $S_{LO}$, and the ATT 311 adjusts the phase-inverted signal to an appropriate level and provides the signal into input terminal d of the adder 302. The reception spread signal $S_2$ including the interference wave component $f_{u1}$ is inputted into another input terminal c of the adder 302, and a signal in which the interference wave component $f_{u1}$ is eliminated is outputted to output terminal b.

According to this embodiment, interference wave frequency is detected automatically, and a phase-inverted signal of the interference wave is generated. The phase-inverted signal is added to a reception signal including the interference wave, so that the interference wave can be eliminated.

In this embodiment, the 180° phase shifter 310 inverts the VCO 305 output phase, and the reception signal $S_2$ and the 180° phase shifter 310 output are inputted into the adder 302 to eliminate only the interference wave component, however, the present invention is not limited to this arrangement. For example, as shown in FIG. 17, instead of using the 180° phase shifter 310, the adder 302 can be replaced with a subtracter.

Figure 21:
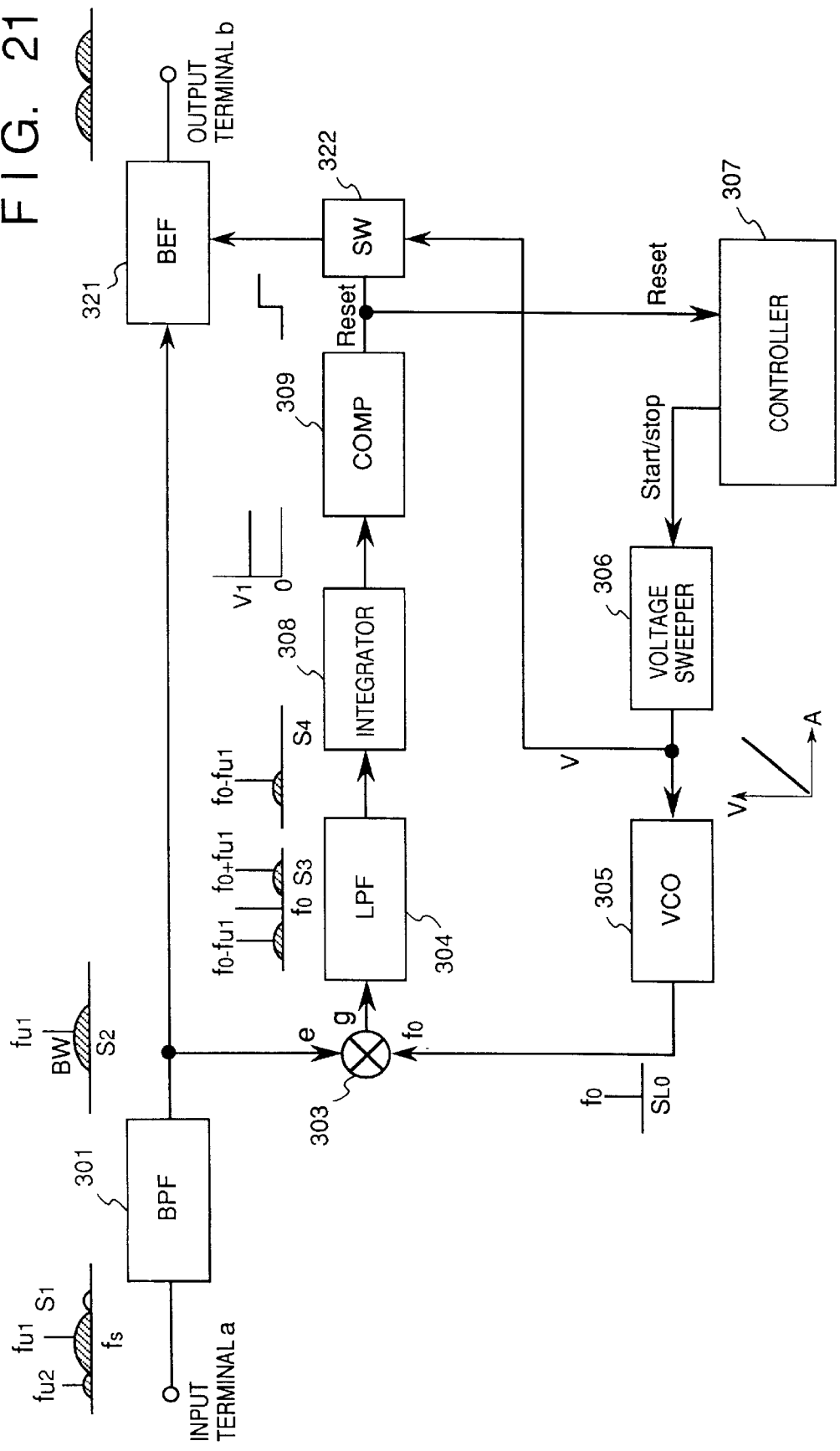
FIG. 21 is a block diagram showing as another example the configuration of the receiver of FIG. 17 in which 180° phase shifter 310 and attenuator (ATT) 311 are omitted and adder 302 is replaced with a BEF 321 and switch 322 for opening/closing a path between the BEF 321 and voltage sweeper 306.

In FIG. 21, the 180° phase shifter 310 and the ATT 311 are omitted, and the adder 302 is replaced with BEF (band elimination filter) 321 for restricting the BPF 301 output signal by a predetermined narrow band using an elimination frequency corresponding to the voltage sweeper 306 output voltage. Further, switch 322 for opening/closing a path between the voltage sweeper 306 and the BEF 321 in accordance with the comparator 309 output is provided. The BEF 321 comprises such as a voltage variable capacitor and a coil, and it varies its capacity corresponding to input voltage to change its filter characteristic.

In the above construction, similarly to the operations as shown in FIG. 17, the comparator 309 output signal (Reset) is provided to the controller 307. The controller 307 outputs a stop signal to the voltage sweeper 306 to fix the VCO 305 output signal $S_{LO}$ frequency, then to detect the interference wave frequency $f_{u1}$.

On the other hand, the comparator 309 output signal $S_{rest}$ is provided to the switch 322, which closes the path between the BEF 321 and the voltage sweeper 306 in accordance with the output signal (Reset). The voltage sweeper 306 output voltage is provided to the BEF 321.

Accordingly, in FIG. 21, if the interference wave frequency is detected, the apparatus can comprise a narrow band elimination filter which eliminates only an interference wave frequency. The narrow BEF can output a signal in which the interference wave component $f_{u1}$ included in the reception spread signal $S_2$ is eliminated to the output terminal b.

Further, in FIG. 21, the BEF 321 can be replaced with the combination of a LPF (low pass filter) and a HPF (high pass filter), which can obtain similar function by changing the pass band corresponding to input voltage.

[Fourth Embodiment (FIGS. 22–24)]

In the third embodiment, the voltage of the correlator output is integrated. However, in this embodiment, to obtain a constant output voltage from varying reception wave, the correlator output peak is detected to generate DC voltage appropriate to the peak level. Consequently, AGC voltage not influenced by noise in the correlation output can be generated.

Figure 22:
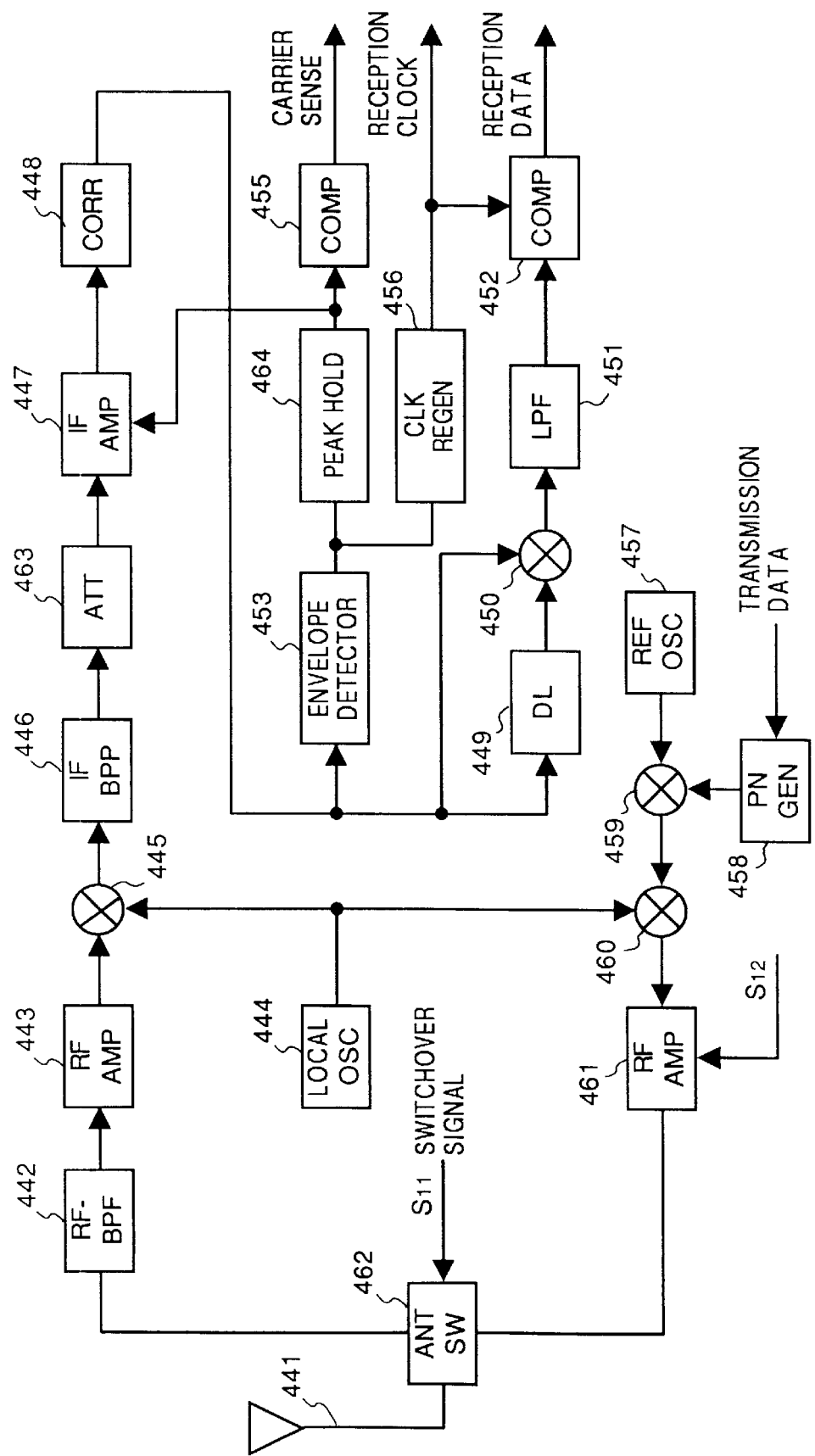
FIG. 22 is a block diagram showing the configuration of a communication apparatus according to a fourth embodiment of the present invention.

FIG. 22 is a block diagram showing a communication apparatus according to a fourth embodiment of the present invention. In FIG. 22, elements correspond to those in FIG. 53 showing the conventional apparatus have the same reference numerals and the explanations of these elements will be omitted.

Figure 53:
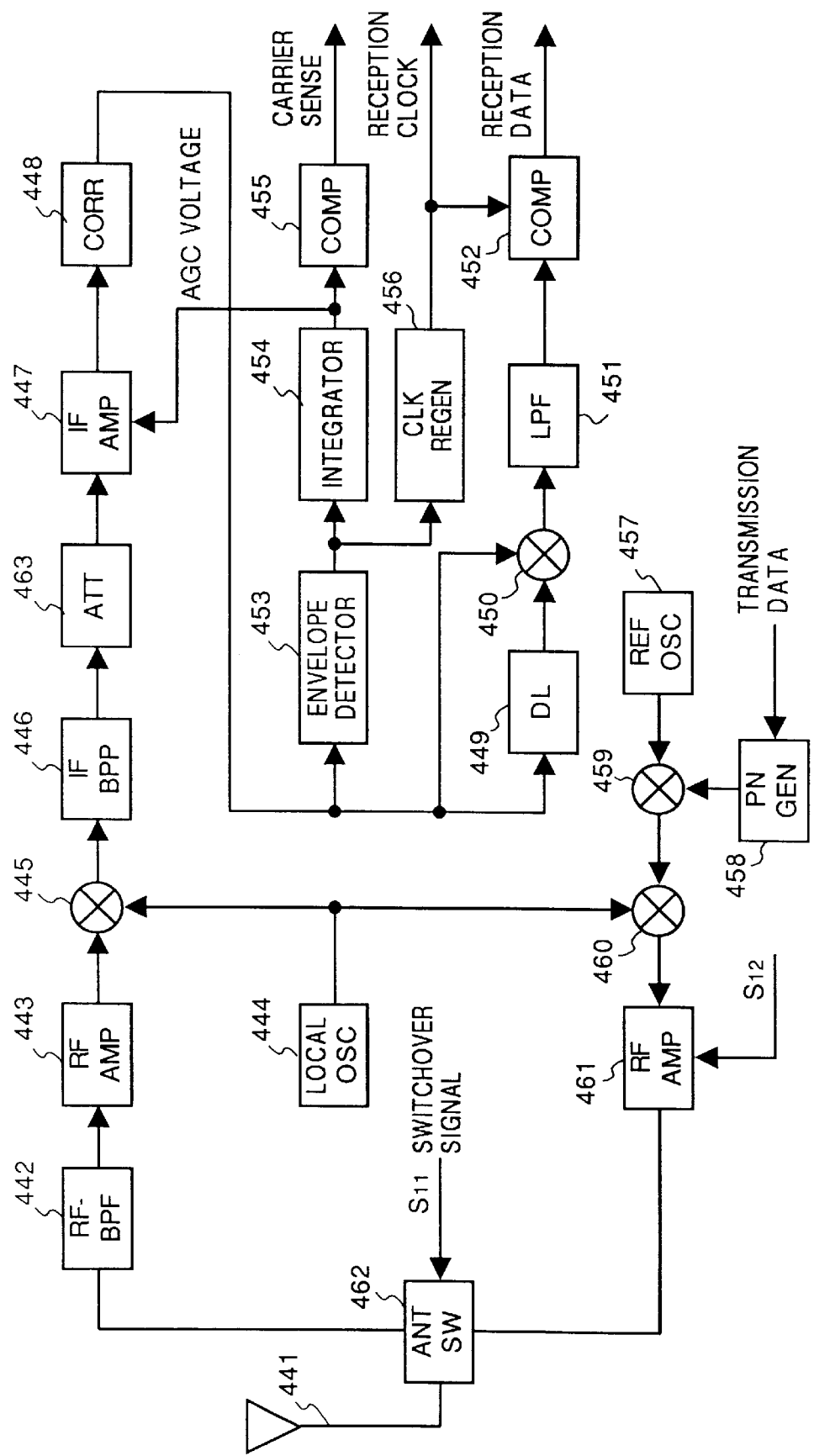
FIG. 53 is a block diagram showing the configuration of the conventional SS communication apparatus using the AGC of FIG. 52.
Figure 54:
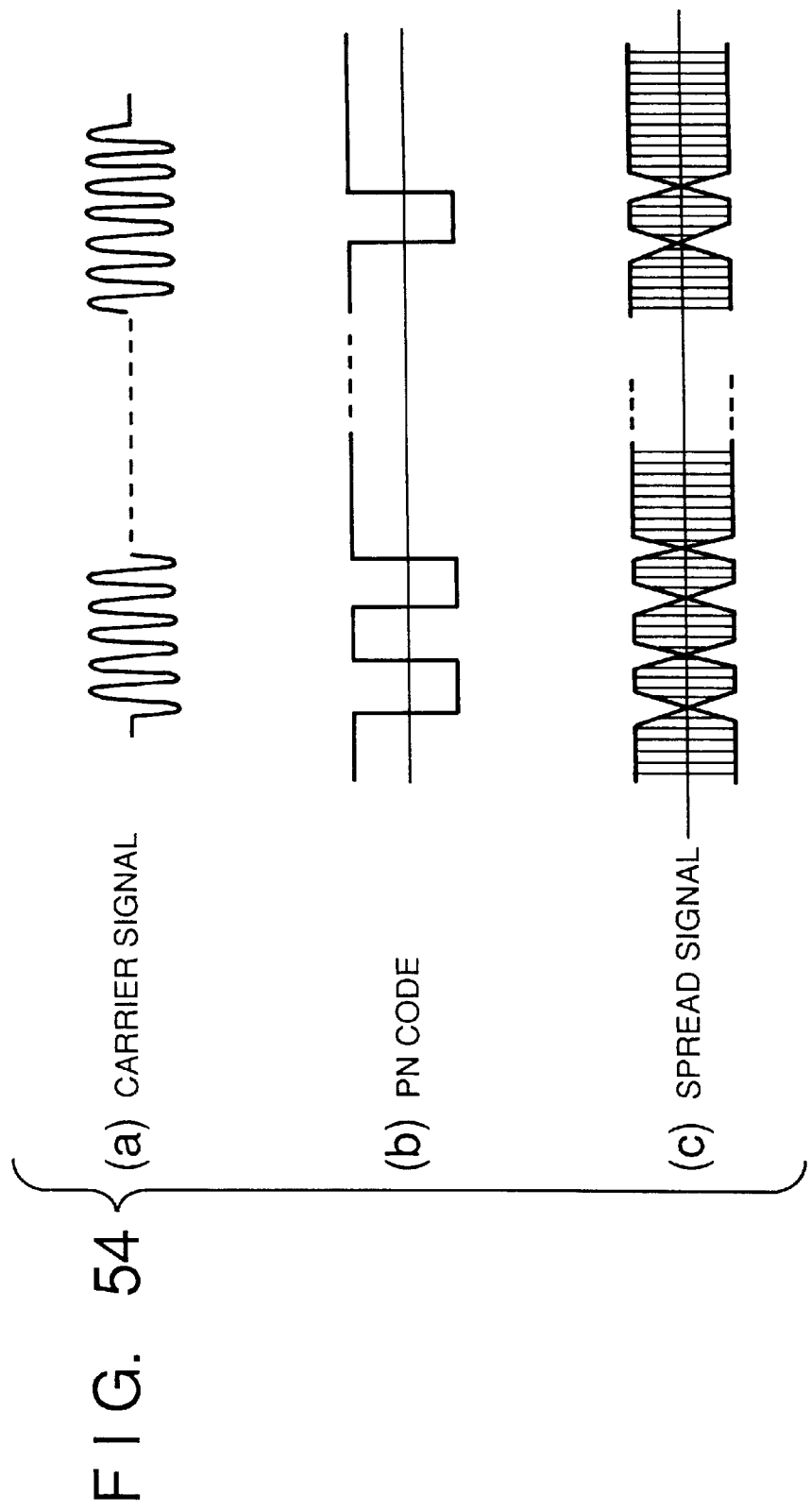
FIG. 54 shows a carrier signal, a PN code and a spread signal treated by the SS communication apparatus.
Figure 55:
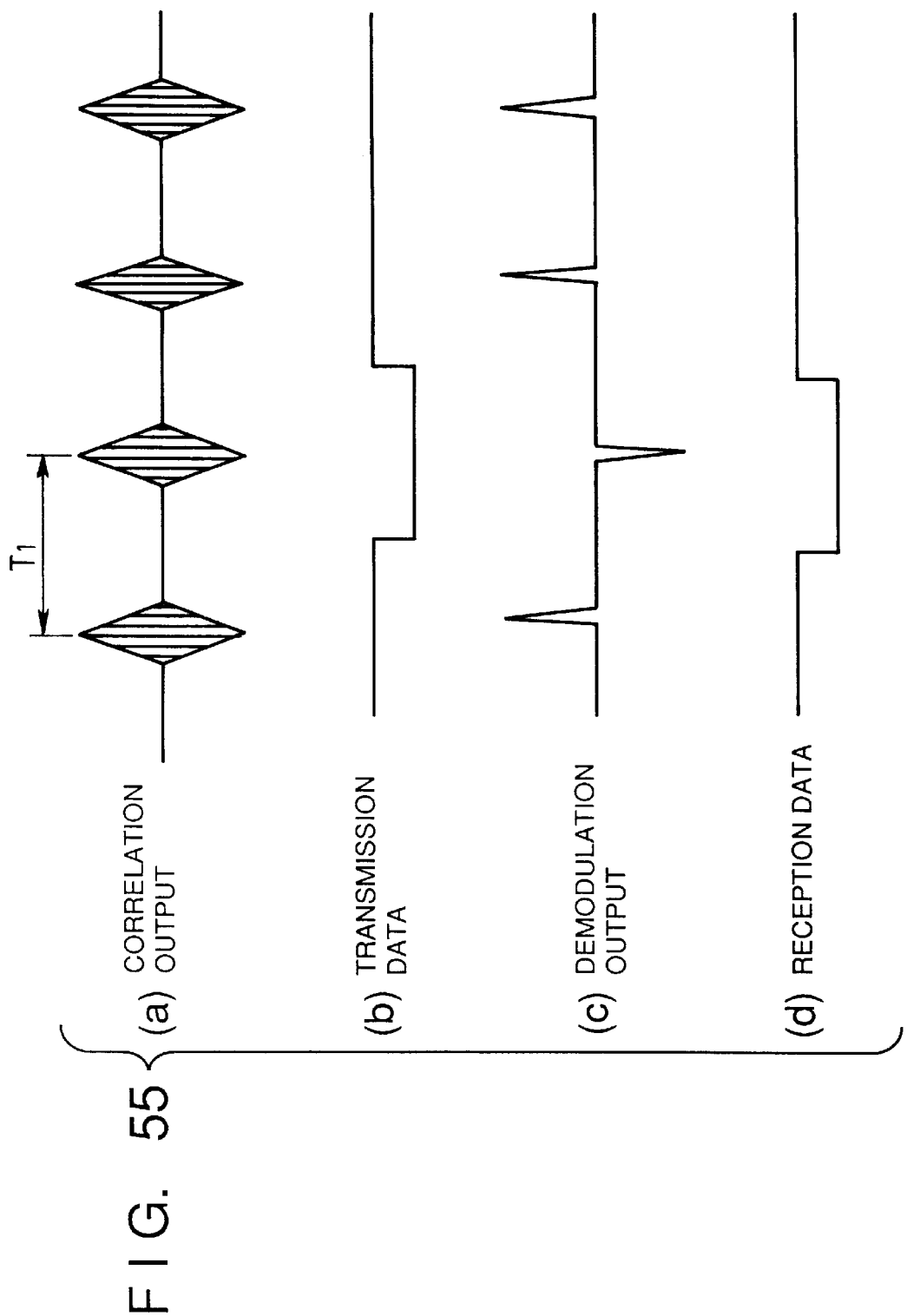
FIG. 55 shows a correlation output signal, a transmission data signal, a demodulation output signal and a reception data signal treated by the SS communication apparatus.
Figure 56:
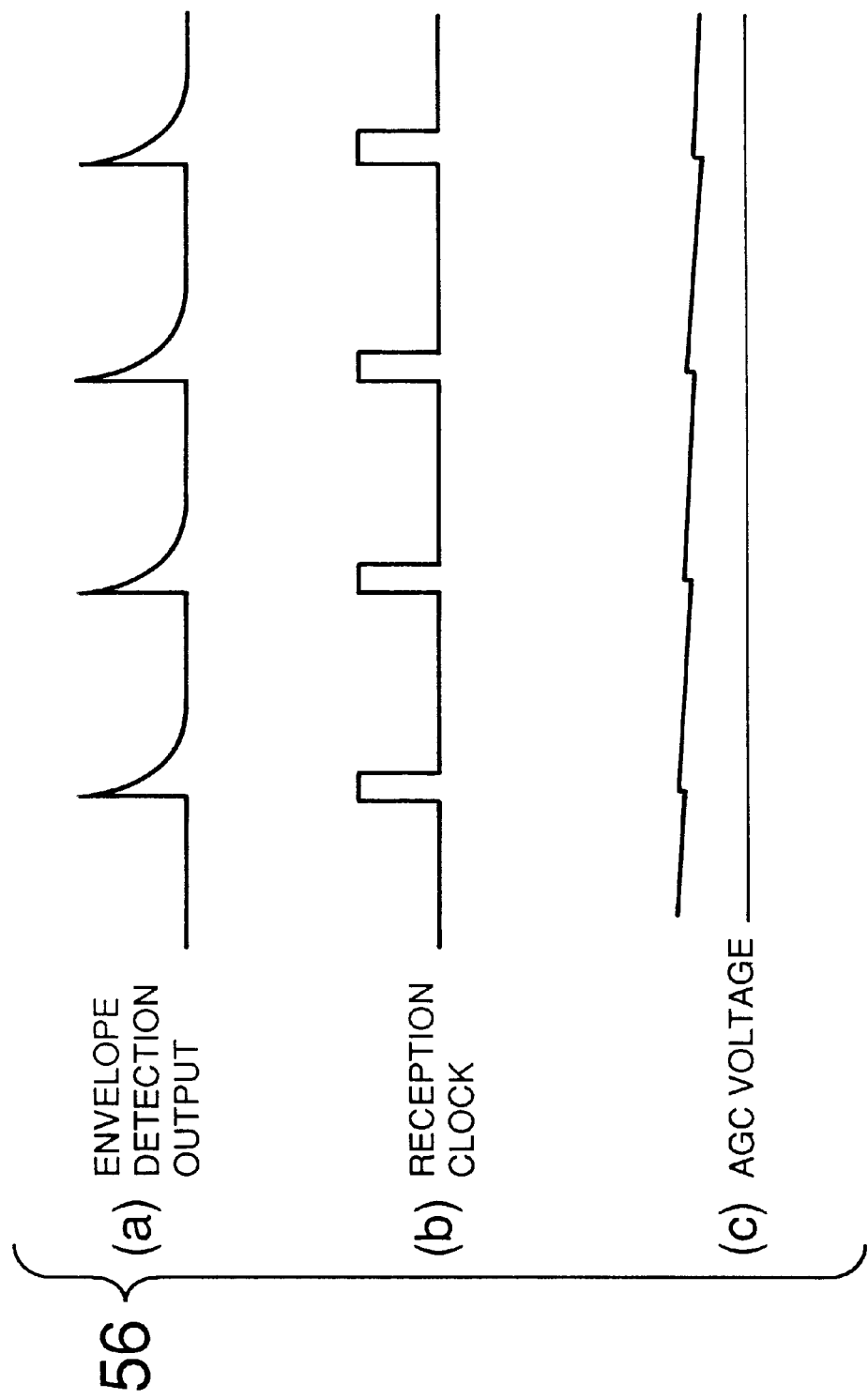
FIG. 56 shows an envelope detection output signal, a reception clock signal and an AGC voltage signal treated by the SS communication apparatus.
Figure 58:
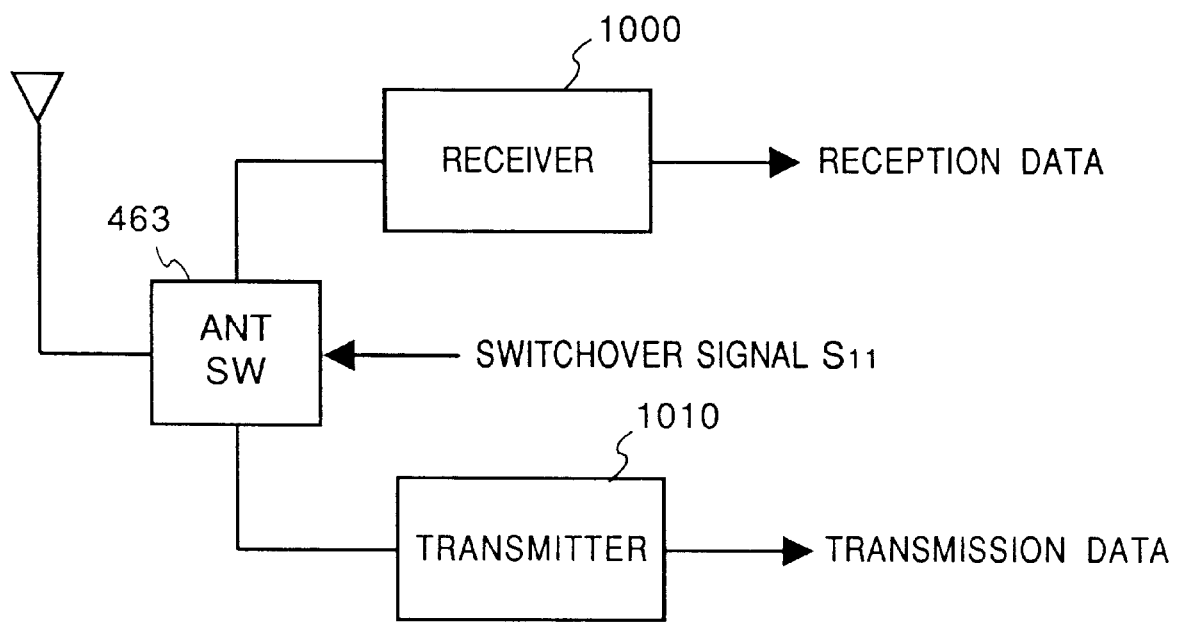
FIG. 58 is a block diagram highlighting a switchover by antenna switch (ANTSW) 62 in accordance with a transmission/reception switchover in half duplex communication.
Figure 59:
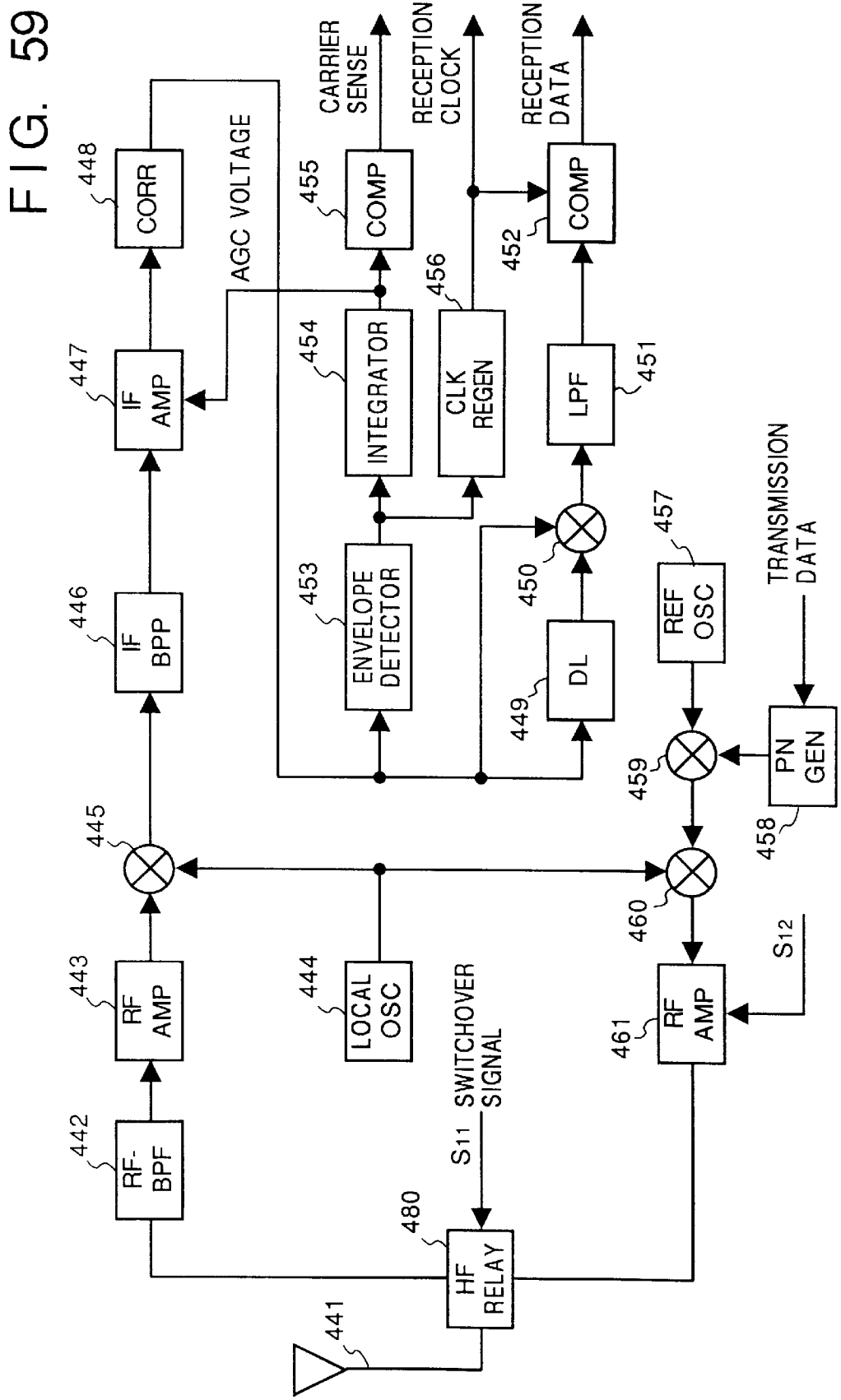
FIG. 59 is a block diagram showing the configuration of a SS communication apparatus using a high-frequency relay as an ANTSW.

The apparatus in FIG. 22 comprises peak hold circuit 464 instead of the integrator 454 of the apparatus of FIG. 53.

Figure 23:
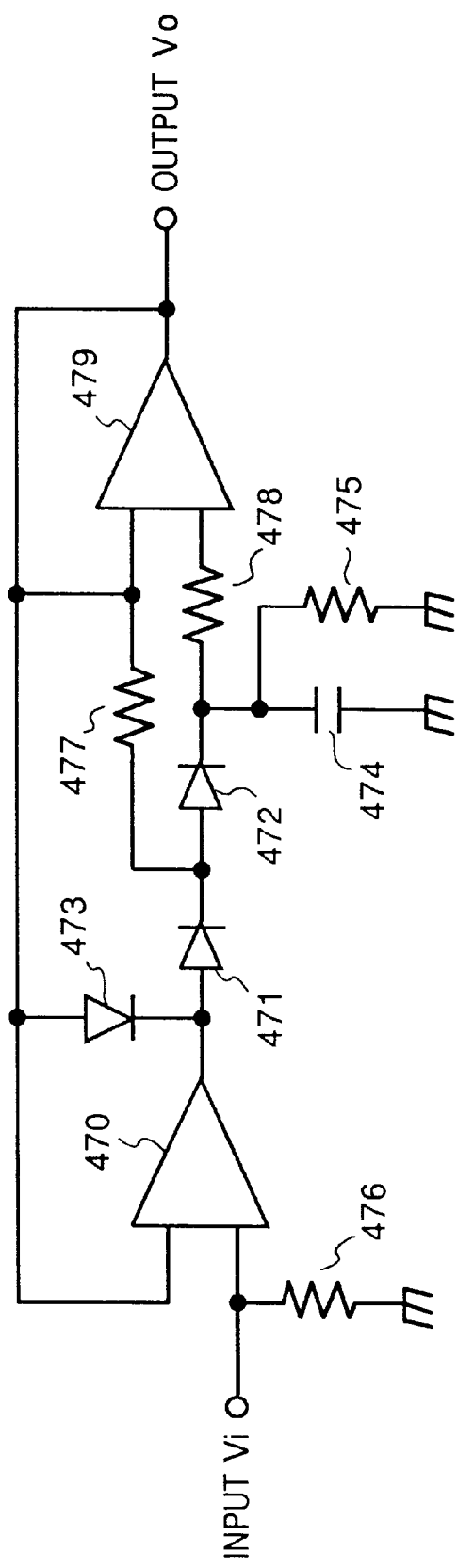
FIG. 23 shows the construction of peak hold circuit 464 in the fourth embodiment.

FIG. 23 shows the construction of the peak hold circuit 464. The peak hold circuit 464 has OP-amplifiers 470 and 479, diodes 471 to 473, capacitor 474 and resistors 475 to 478. The peak hold circuit 464 is a low-drift peak hold circuit which compensates the diode operation voltage ($V_f$) by the OP-AMP's 470 and 479 and reduces the diode leak voltage by boot strap.

In FIG. 23, if $V_i > V_{CH}$ ($V_i$=input voltage), the diodes 471 and 472 are turned on and the capacitor 474 is charged. As the OP-AMP 479 output is negative fed back to the OP-AMP 470, the diodes 471 and 472 voltage $V_f$ is compensated with high gain of the OP-AMP 470.

Next, if $V_i < V_{CH}$, the peak hold circuit 464 has a holding period. The diode 473 cramps the OP-AMP 470 output, and inverse bias of the diode 471 is lowered to voltage equal to the diode 471 voltage $V_f$. Further, the resistor 477 boot straps the diode 472 anode and inverse bias of the diode 472 becomes approximately "0" (V), thus there is little inverse current. The resistor 475 is a discharge resistor which is selected to discharge at appropriate time.

Figure 24:
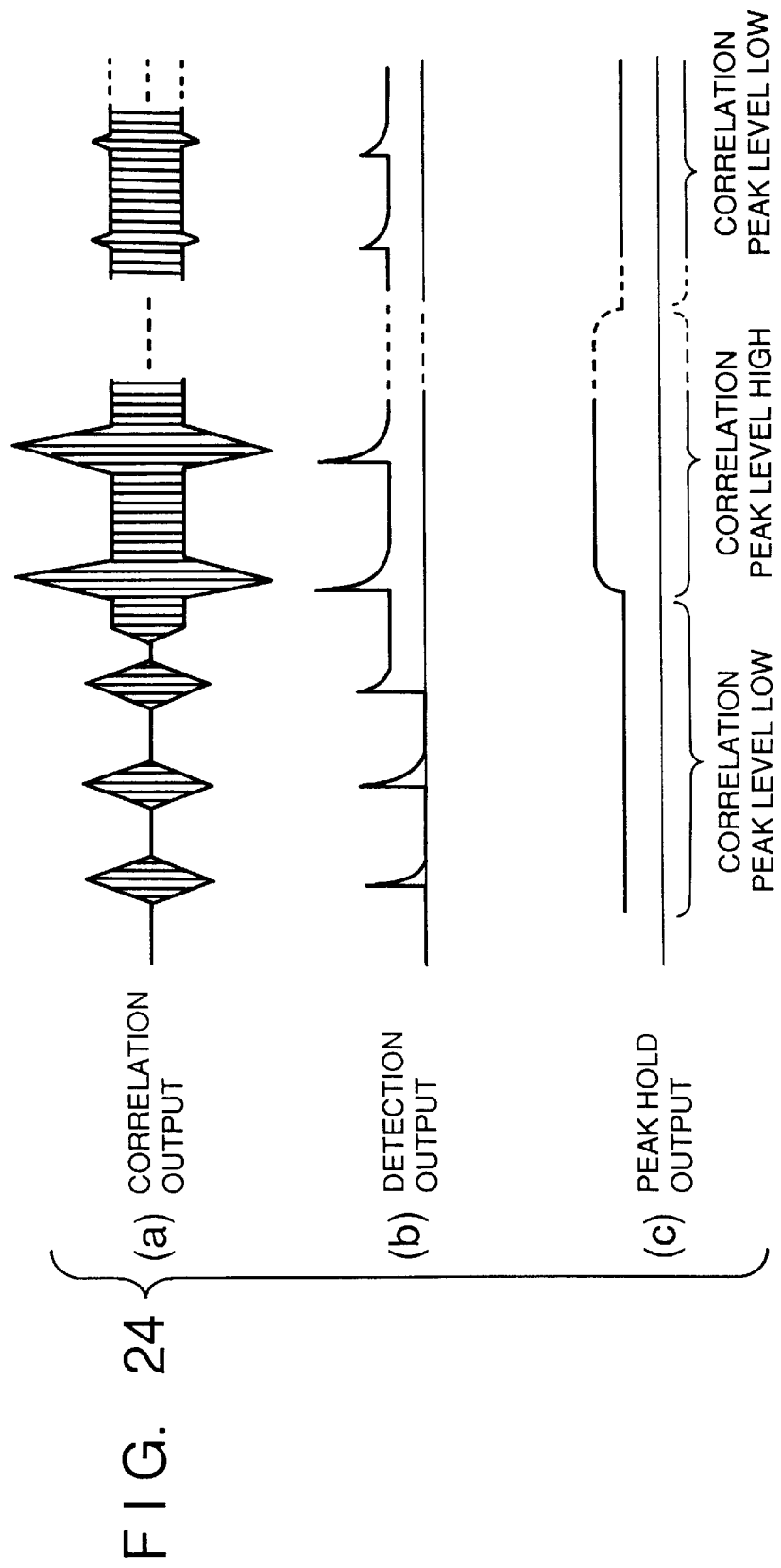
FIG. 24 shows status of AGC voltage which corresponds to correlation output.

FIG. 24 shows status of AGC voltage which corresponds to correlation output. As shown in FIG. 24, noise component overlapped with the correlation output ((a) in FIG. 24) influences detection output ((b) in FIG. 24), however, it does not appear in peak hold output ((c) in FIG. 24). In this manner, DC voltage which corresponds to respective correlation peak levels can be obtained.

In this embodiment, as shown in FIG. 23, the peak hold circuit is provided to detect peak level of envelope detection output, however, the present invention is not limited to this arrangement. For example, the peak hold circuit can be provided, not at output portion of the envelope detector 453, but at output portion of the delay device 449.

In this embodiment, the ATT 463 damping rate is changed for gain control. However, in an apparatus having a relatively narrow frequency band, the amplifying rate of the AMP 447 can be directly changed for the same purpose.

[Fifth Embodiment (FIGS. 25–27)]

In this embodiment, a receiver of a spread spectrum modulation communication apparatus has a desired band filter and a desired out-of-band filter for IF processing and selectively uses these band filters.

Figure 25:
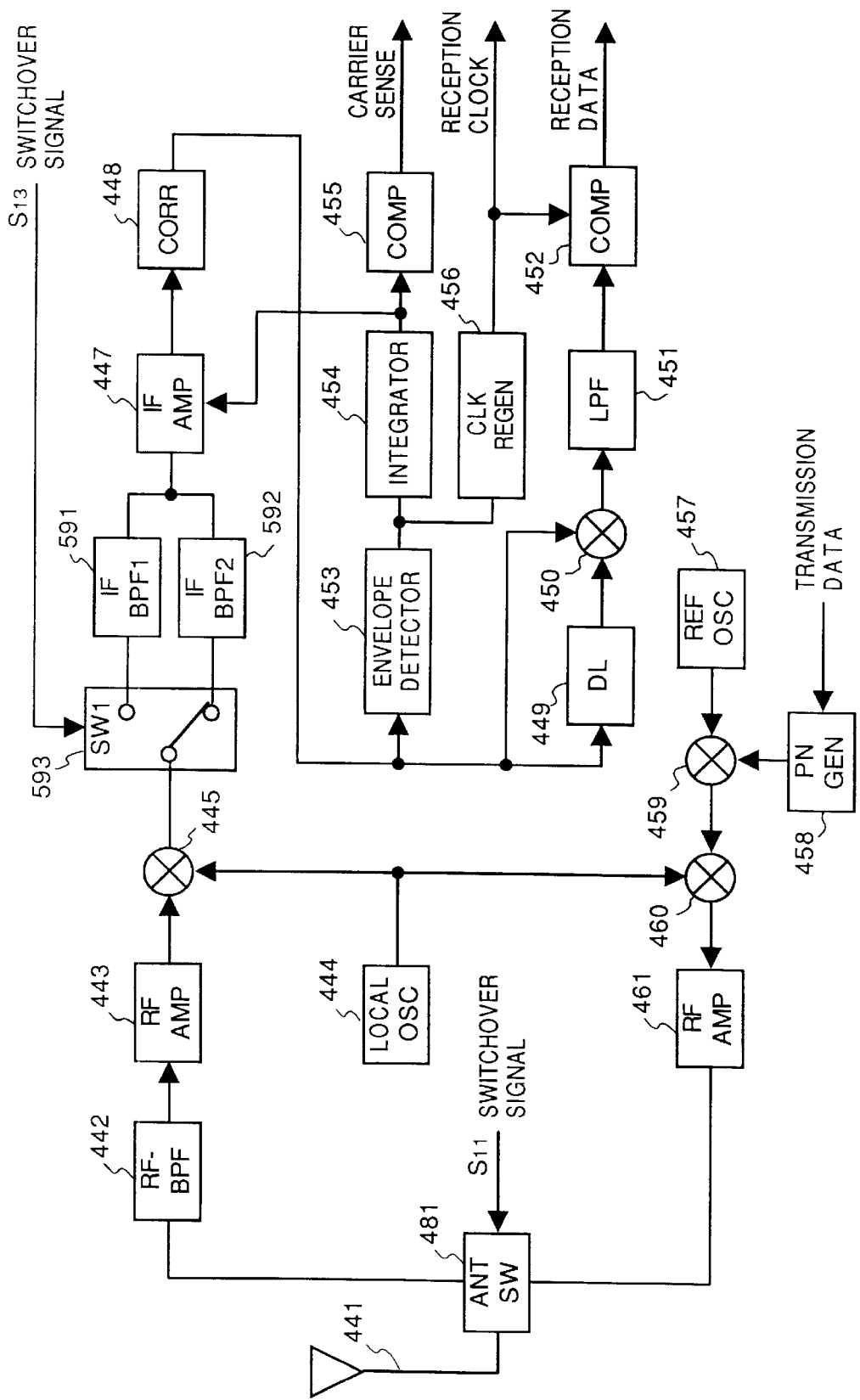
FIG. 25 is a block diagram showing the configuration of a half duplex communication apparatus according to a fifth embodiment of the present invention.
Figure 60:
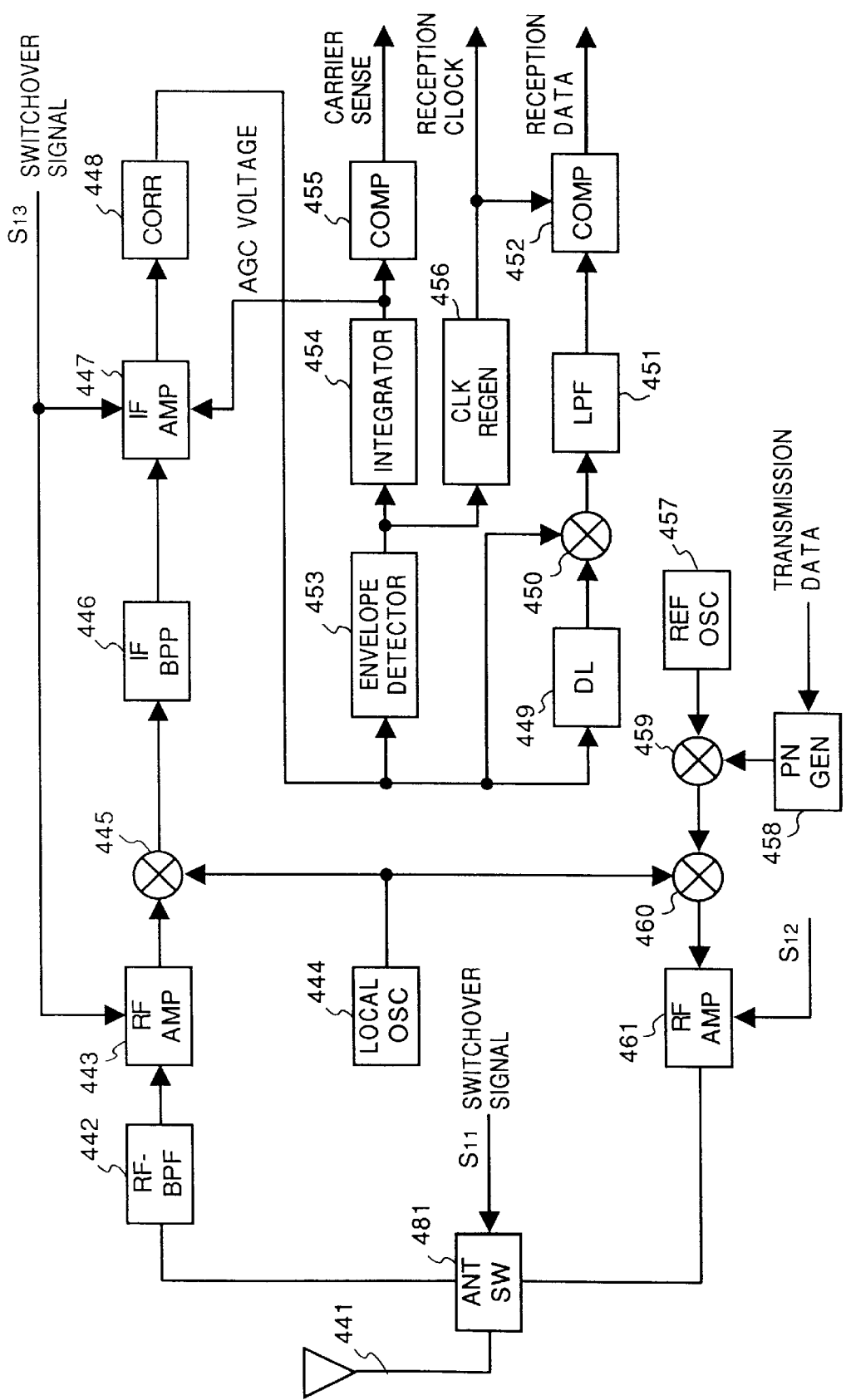
FIG. 60 is a block diagram showing the configuration of a SS communication apparatus using a semiconductor switch as an ANTSW.

FIG. 25 is a block diagram showing the configuration of a half duplex communication apparatus according to a fifth embodiment of the present invention. Compared with FIG. 60 showing the conventional apparatus, the communication apparatus according to the fifth embodiment has IFBPF's 591 and 592, and switch 593 for selecting these BPF's. In FIG. 60, the switchover signal $S_{13}$ is provided to the RFAMP 443 and the IFAMP 447, while the switchover signal $S_{13}$ in FIG. 25 is provided to the switch 593 for selecting a BPF in accordance with transmission/reception switchover. Note that in FIG. 25, elements correspond to those in FIG. 60 has the same reference numerals and the explanations of these elements will be omitted.

The switch 593 can be a semiconductor switch similar to the ANTSW 481. As IF frequency is approximately 144 MHz, isolation can be ensured and separation can be raised The respective pass bands of the IFBPF 591 and 592 are largely different for easily eliminating in-band signal generated by interference wave.

Upon normal reception, the IFBPF 591 having a desired IF band as its pass band is selected, and upon transmission, the IFBPF 592 having a desired band out of the IFBPF 591 pass band as its pass band is selected. Accordingly, interference wave which has mixed in the reception band is separated by the IFBPF 592 and it does not enter the IFAMP 447. Upon next reception, again the IFBPF 591 is selected for normal reception.

According to this embodiment, interference waves during transmission can be reliably eliminated without using an expensive high-frequency relay and on/off control of the RFAMP 443 and IFAMP 447. Thus, a communication apparatus which prevents degradation of system throughput can be provided at a low price.

Figure 26:
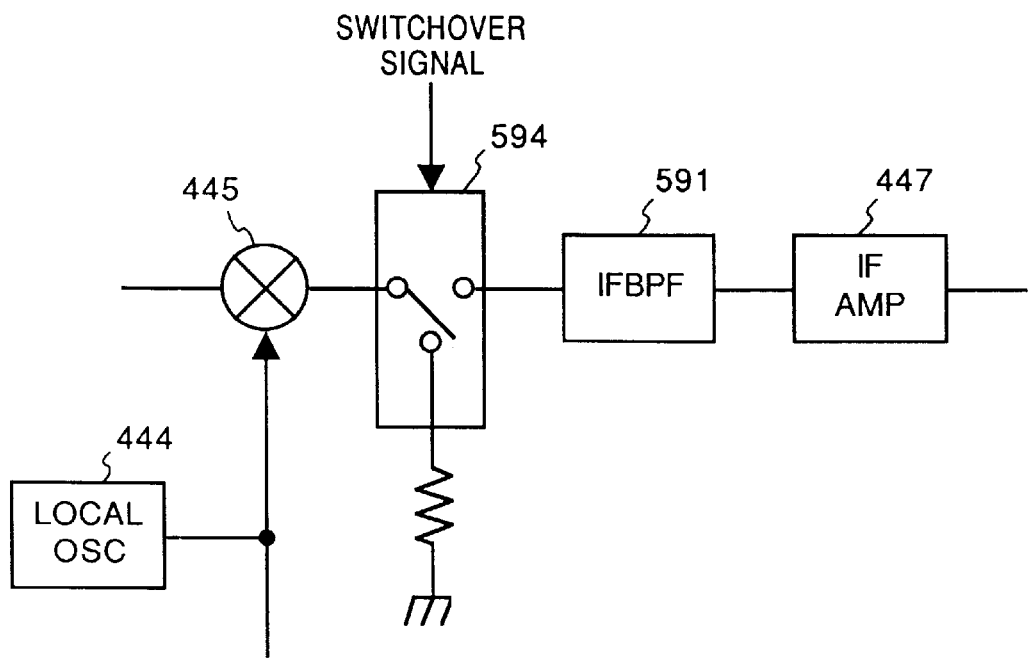
FIG. 26 is a block diagram showing as another example the configuration of the communication apparatus of FIG. 25 in which an input signal is grounded by switch 594.
Figure 27:
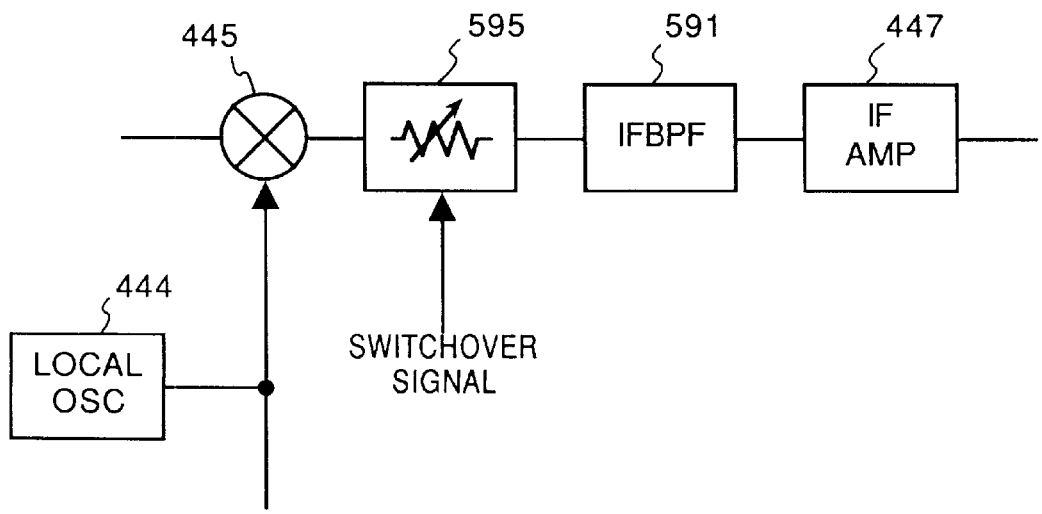
FIG. 27 is a block diagram showing as another example the configuration of the communication apparatus of FIG. 25 in which variable attenuator 595 attenuates an input signal upon transmission.

In this embodiment, the IFBPF 591 and 592 are provided for selective use. However, the present invention is not limited to this arrangement. FIG. 26 shows an example where the switch 593 is replaced with switch 594 for grounding an input signal upon transmission instead of switching over to the IFBPF 592. FIG. 27 shows another example where variable attenuator 595 is provided for the switch 593 for attenuating an input signal upon transmission.

[Sixth Embodiment (FIGS. 28–31)]

In this embodiment, a spread spectrum modulation communication apparatus which can detect interference wave and notify a user of it will be described.

Figure 28:
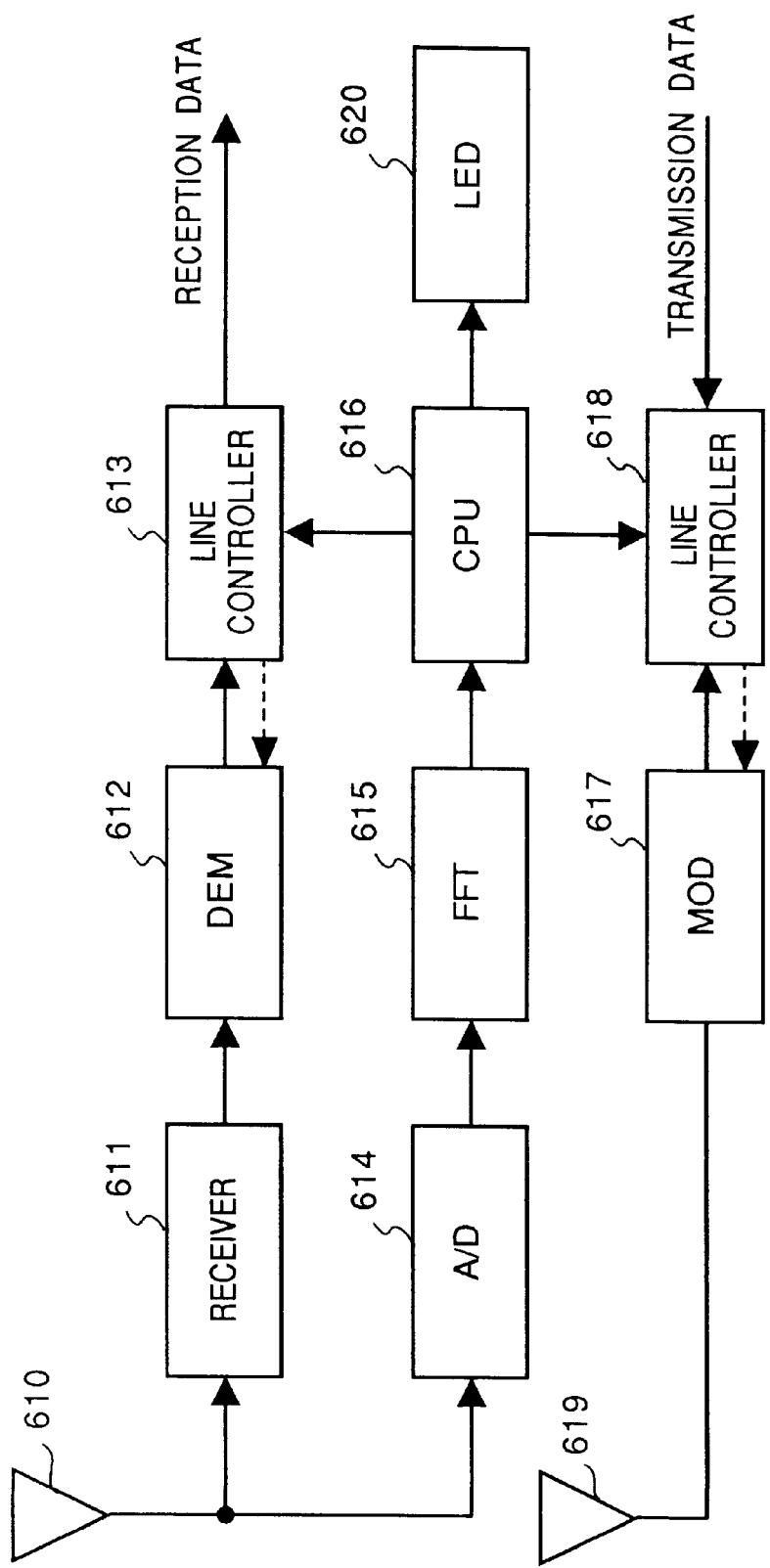
FIG. 28 is a block diagram showing the configuration of a transceiver of a communication apparatus according to a sixth embodiment of the present invention.

FIG. 28 is a block diagram showing the configuration of a transceiver of a communication apparatus according to the sixth embodiment.

In FIG. 28, receiver 611 has an AMP for amplifying a reception wave from antenna 610 and a BPF for passing a predetermined band wave. Demodulator 612 has a primary demodulator for converting a spread spectrum signal into a narrow band signal and a secondary demodulator for generating a digital data out of the primarily-demodulated signal. Line controller 613 controls wireless communication reception.

A/D converter 614 converts an analog signal received from the antenna 610 into a digital signal, and Fast Fourier transformer (FFT) 615 performs Fourier transformation to the digital signal from the A/D converter 614.

CPU 616 controls the respective elements of the transceiver shown in FIG. 28, and detects narrow band interference wave based on the FFT 615 output. Modulator 617 modulates transmission data and transmits the data via transmission antenna 619. Line controller 618 controls wireless communication line transmission.

When the CPU 616 detects an interference wave, LED 620 is turned on to notify a user of the detection of interference wave.

In the above construction, the communication apparatus in the sixth embodiment detects narrow band interference wave using the A/D converter 614, the FFT 615 and the CPU 616, and when the interference wave value is over a predetermined limitation value, notifies the user of it, so that the user can recognize the possibility that the reception information includes an error due to the interference wave.

In this embodiment, the influence of interference wave is notified by the LED 620, however, the LED 620 can be replaced with a buzzer which emits an alarm or a LCD which displays interference wave influence status for the same purpose.

Figure 29:
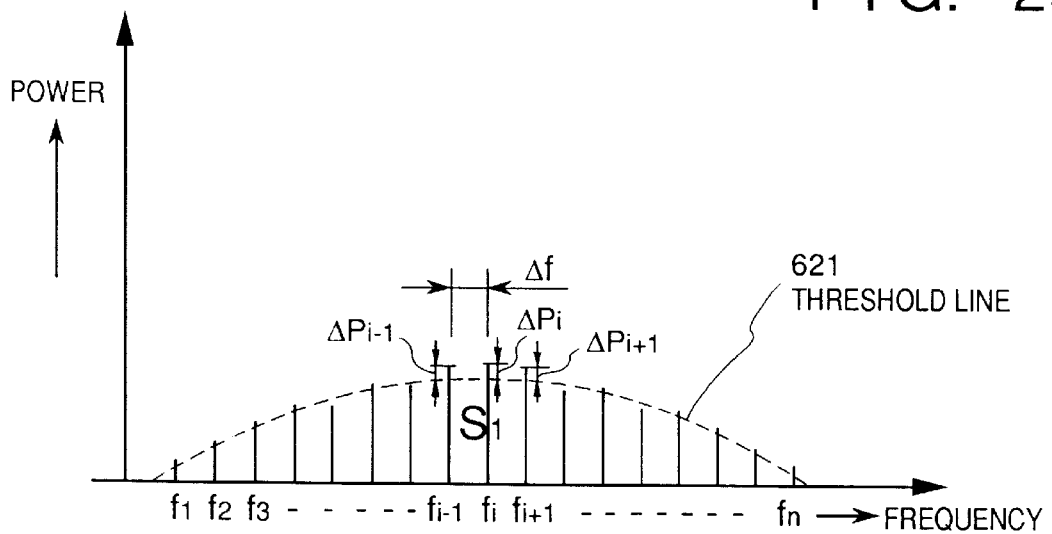
FIG. 29 shows reception data after A/D conversion and Fourier transformation in a case where no narrow band interference wave exists.
Figure 30:
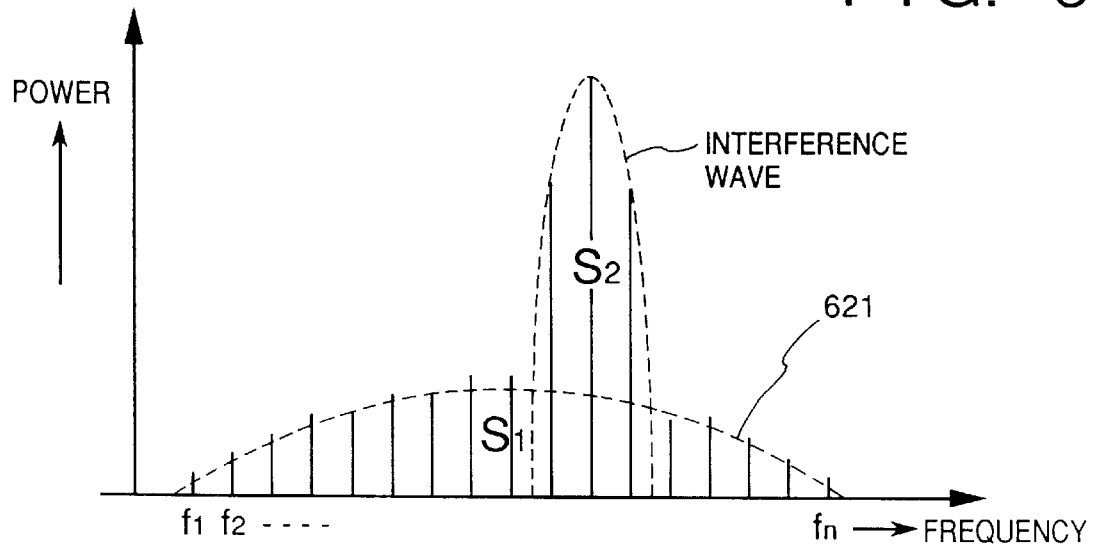
FIG. 30 shows reception data in a case where narrow band interference wave exists.

FIG. 29 shows reception data waveform after A/D conversion and Fourier transformation in a case where no narrow band interference wave exists. FIG. 30 shows reception data waveform in a case where narrow band interference wave exists. In FIGS. 29 to 30, the vertical axis represents spectrum power obtained from the Fourier transformation; and the horizontal axis, its frequency. The FFT 615 output is a discrete spectrum having spectrum width $\Delta f$, and it varies as spectrum values $f_1, f_2 \ldots f_n$ in ascending order. The power corresponding to the respective spectrum values $(f_1, f_2 \ldots f_n)$ is represented by $P_1, P_2 \ldots P_n$. Further, dotted line 621 is an envelope of spectrum which is obtained from the FFT 615 when ideal reception data is obtained. This envelope is used as a threshold line for interference wave detection.

Followings are procedures for processing the FFT 615 output performed by the CPU 616 to detect narrow band interference wave and judge its influence.

(1) Whether or not each of power values $(P_1, P_2 \ldots P_n)$ of obtained spectrum values $(f_1, f_2 \ldots f_n)$ is greater than the threshold line 621 is examined.

(2) Regarding data greater than the threshold line 621, the power values beyond the threshold line $(S_2)$ are added. In FIG. 29, the power values of the spectrum values $f_{i-1}, f_i,$ and $f_{i+1}$ exceed the threshold line 621 by $\Delta P_{i-1}, \Delta P_i$ and $\Delta P_{i+1}$, accordingly, the values $\Delta P_{i-1}, \Delta P_i$ and $\Delta P_{i+1}$ are added.

(3) Regarding data smaller than the threshold line 621, the power values of the respective spectrum values are added $(S_1)$. Regarding the data greater than the threshold line 621, the sum of corresponding threshold 621 values are added to the sum of the spectrum power values below the threshold line $(S_1)$.

Through the procedures (1) to (3), the sum of the spectrum power values beneath the threshold value $(S_1)$ and the sum of the power values beyond the threshold value $(S_2)$ can be obtained.

(4) The sums $S_1$ and $S_2$ are compared and whether or not the ratio of the sum $S_1$ to the sum $S_2$ is over the limitation value of an allowable range ($K_0$) is determined to judge the extent of interference wave influence.

(5) As a result, in case of $S_2/S_1 \leq K_0$ (within the allowable range), even if interference wave exists, its influence can be removed in the spread spectrum modulation communication. Consequently, normal communication control can be continued. In a case while $S_2/S_1 > K_0$ (out of the allowable range), it is judged that there is interference wave influence and the LED 620 is turned on.

Figure 31:
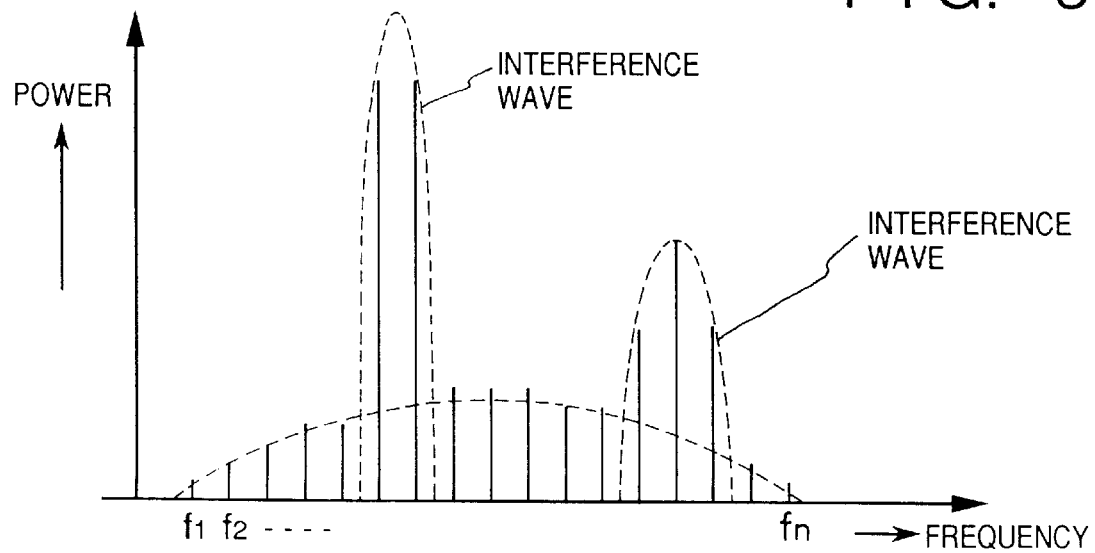
FIG. 31 shows reception data in a case where a plurality of narrow band interference waves exist.

According to this embodiment, presence/absence of influence of narrow band interference wave can be judged with $S_2/S_1$ ratio. Even if a plurality of narrow band interference waves exist within the communication apparatus band, as shown in FIG. 31, whether or not the extent of the interference wave influence exceed the allowable range can be judged, not only with reception levels of the respective interference waves, but also with the ratio of the sum of power values of spectrums influenced by the interference waves to the sum of not-influenced spectrums powers. Thus, presence/absence of interference wave influence can be correctly judged.

[Seventh Embodiment (FIGS. 32–36)]

The communication apparatus according to a seventh embodiment has a similar construction to that of the apparatus in the sixth embodiment. In the interference wave detection as described in the sixth embodiment, the seventh embodiment enables variable control of a marginal value (threshold line) and a limitation value of the allowable range (allowable range value), utilizing the characteristic of radiowave reception level which varies corresponding to the distance between transmitting and receiving apparatuses.

At communication starting time, the transmitter performs ranging (measuring the distance) between the transmitter and the receiver before actual data transmission, and informs the receiver of the ranging result. The receiver changes its marginal value and allowable range value based on the received data.

It should be noted that similarly to the sixth embodiment, the marginal value is a reference value for separating data after A/D conversion and Fourier transformation into a signal wave and interference wave(s). The allowable range value is a reference value for judgment of presence/absence of interference wave influence using the ration of the sum of signal wave spectrum power values ($S_1$) to the sum of interference wave spectrum power values ($S_2$), similar to the limitation value of allowable range ($K_0$) in the sixth embodiment.

Figure 32:
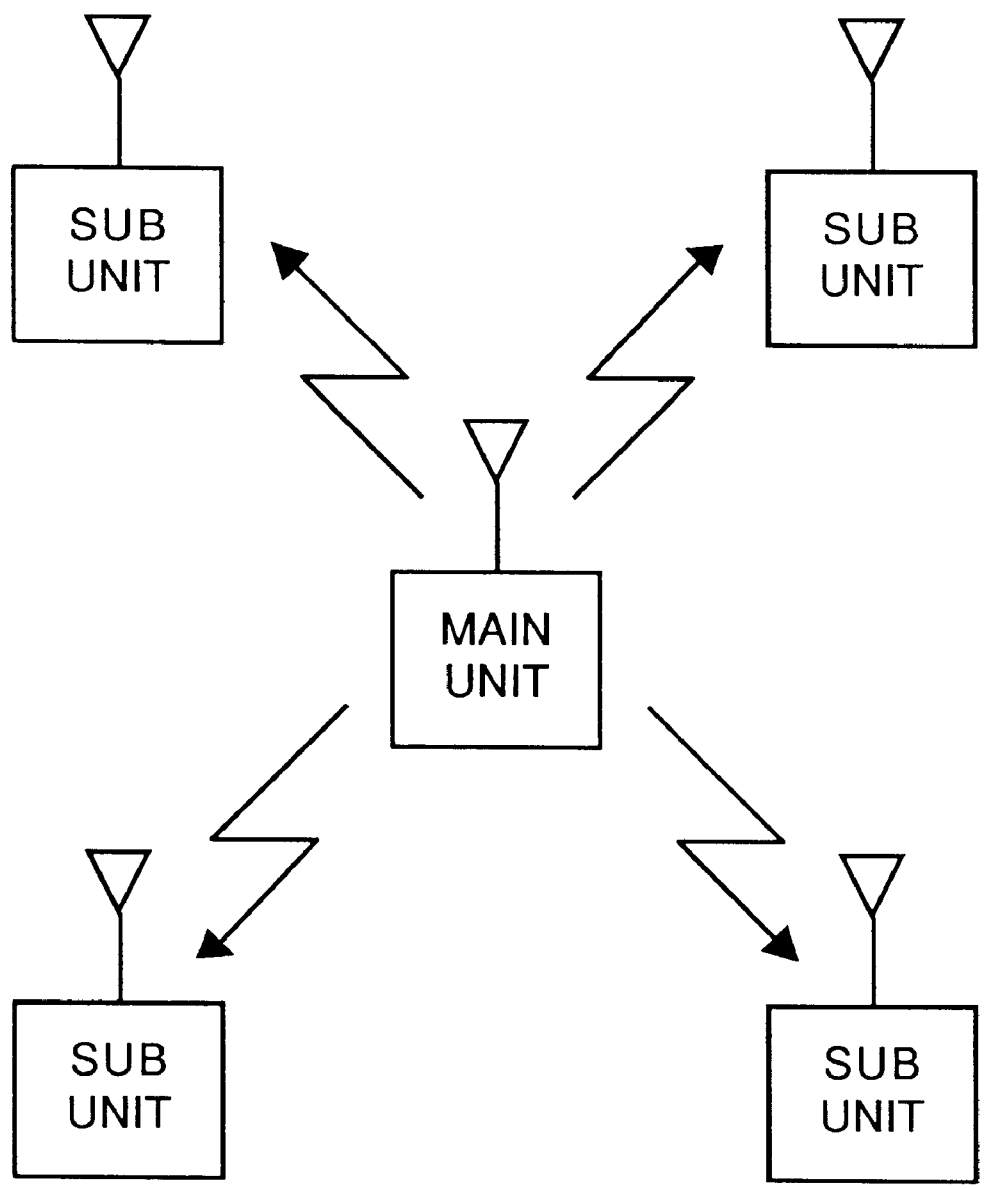
FIG. 32 illustrates a network environment in which an apparatus according to a seventh embodiment of the present invention is employed.

FIG. 32 illustrates as a network environment a star-type network including the communication apparatus according to the seventh embodiment which has exchange capability as a main unit and apparati communicable with only the main unit as subunits.

Next, the ranging process according to this embodiment will be described with reference to a flowchart of FIG. 33, in which a subunit is to start communication with the main unit.

In this network, the main unit or a subunit which is to start communication transmits ranging data to the destination unit, (main unit) when the communication has been established. As the ranging data, (1) a specific code
(2) time indicated by a clock integrated in the main/sub unit
which will start communication can be considered, and process at the transmission side differs more or less corresponding to the selected ranging data.

Figure 33:
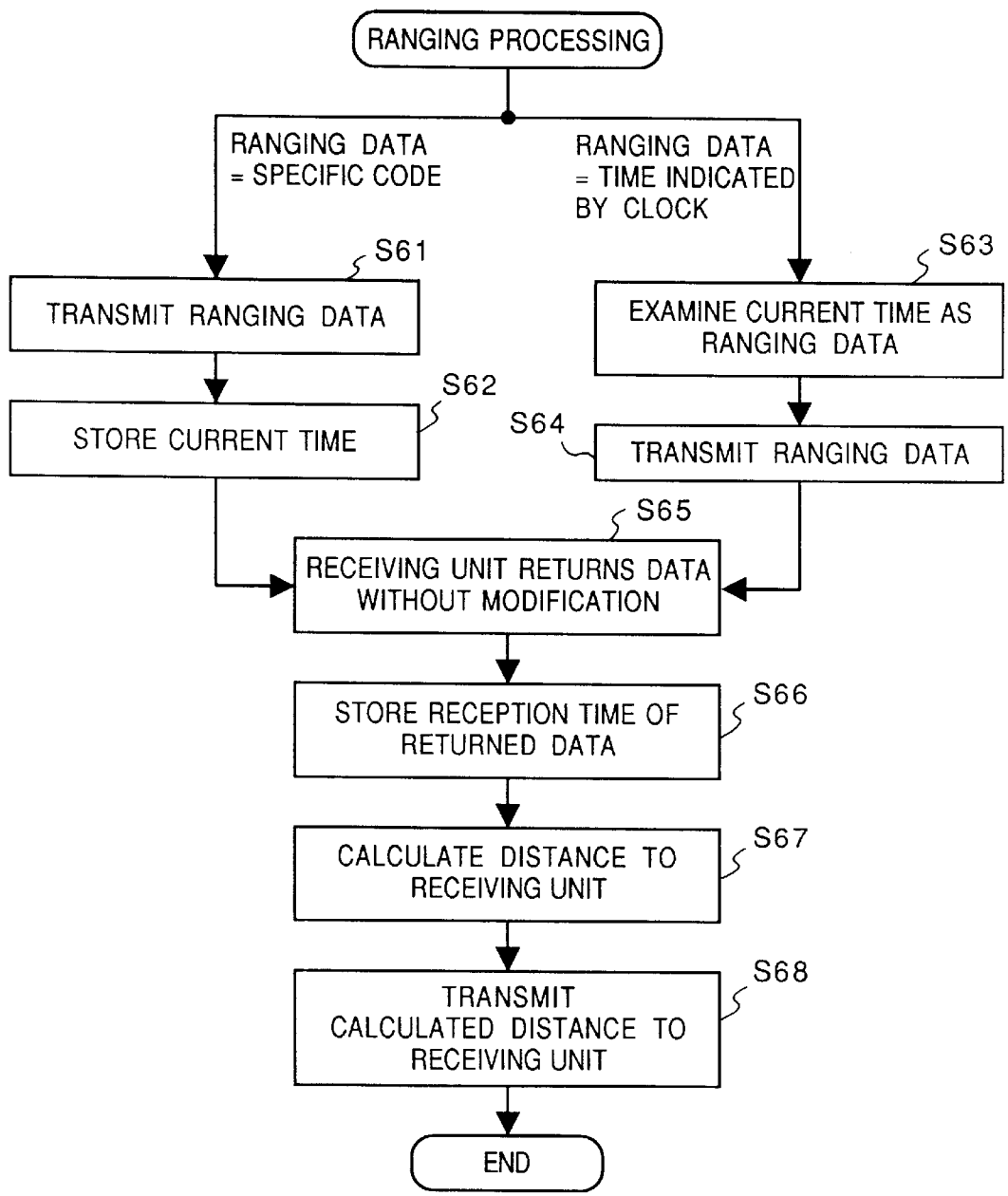
FIG. 33 is a flowchart showing ranging processing by the apparatus according to the seventh embodiment.

In FIG. 33, steps S61 to S65 via step S62 correspond to a case where a specific code is used as the ranging data, and steps S63 to S65 via step S64 correspond to a case where time indicated by a clock in the transmitting main/sub unit is used as the ranging data.

(1) When a specific code is used as the ranging data:

First, the subunit transmits the ranging data to the main unit (step S61). Further, the subunit stores time at which the data has been transmitted into a storage device such as a memory (step S62). On the other hand, the main unit receives the ranging data and transmits the code without any modification to the subunit (step S65). The subunit receives the ranging data returned from the main unit and stores time at which the data has been received into the storage device (step S66). The subunit compares the transmission time with the reception time and calculates the distance to the main unit, taking a predetermined internal process time into account (step S67). The subunit informs the calculated distance to the main unit (step S68).

(2) When time indicated by the clock integrated in the subunit is used as the ranging data:

The subunit initially examines current time (step S63) and transmits the current time as the ranging data to the main unit (step S64). Thereafter, the flow advances to step S65.

If the main unit is to start communication with a sub unit, the main unit performs the procedures performed by the subunit in FIG. 33, while the subunit performs the procedures performed by the main unit in FIG. 33.

In this manner, the distance between the transmitter and the receiver can be determined. An allowable range value ($K_0$) and an envelope of spectrum obtained the FFT 615 output when ideal reception data is obtained (marginal value) are set in accordance with the distance between the transmitter and the receiver. Thereafter, interference wave detection as described in the sixth embodiment is performed.

In this embodiment, if the detected interference wave value exceeds the allowable range value, the CPU 616 transmits interference wave detection signal to the line controllers 613 and 618. The line controller 618 stops transmission until the transmission halted status is removed. The line controller 613 stops demodulation until the transmission halted status is removed, too. When the communication condition has recovered, the communication is restarted and thus fine communication can be ensured.

Figure 34:
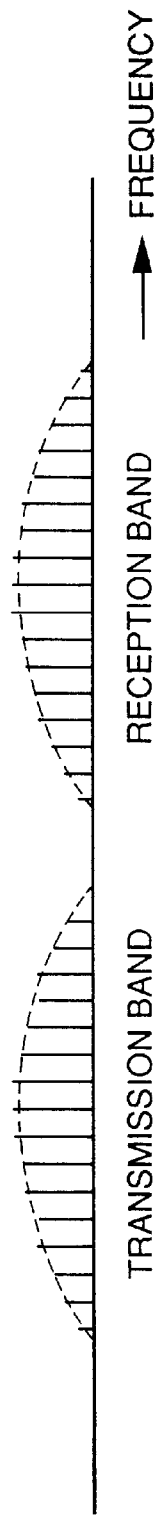
FIG. 34 shows spectrum waveform in a case where no narrow band interference wave exists in either of the transmission band and reception band.
Figure 35:
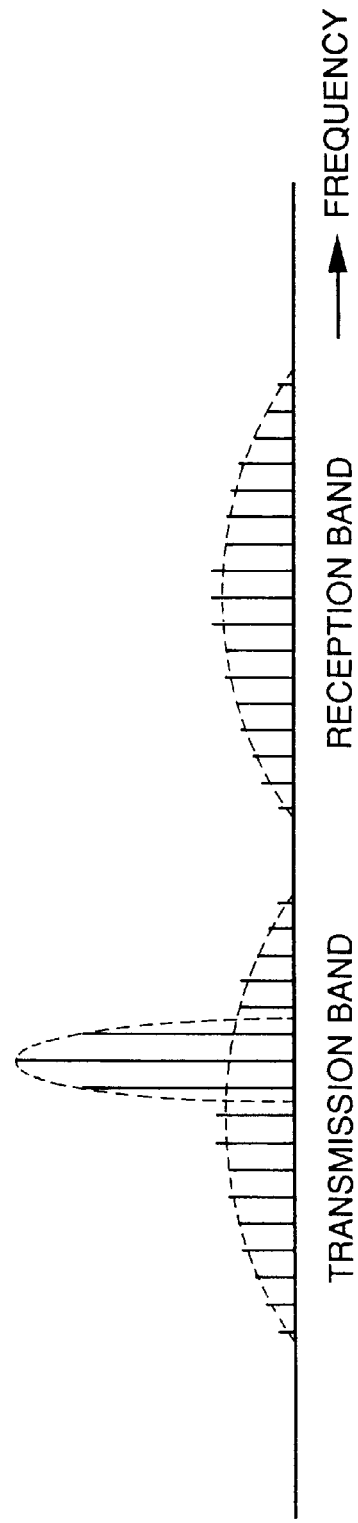
FIG. 35 shows spectrum waveform in a case where a narrow band interference wave exists in the transmission band.
Figure 36:
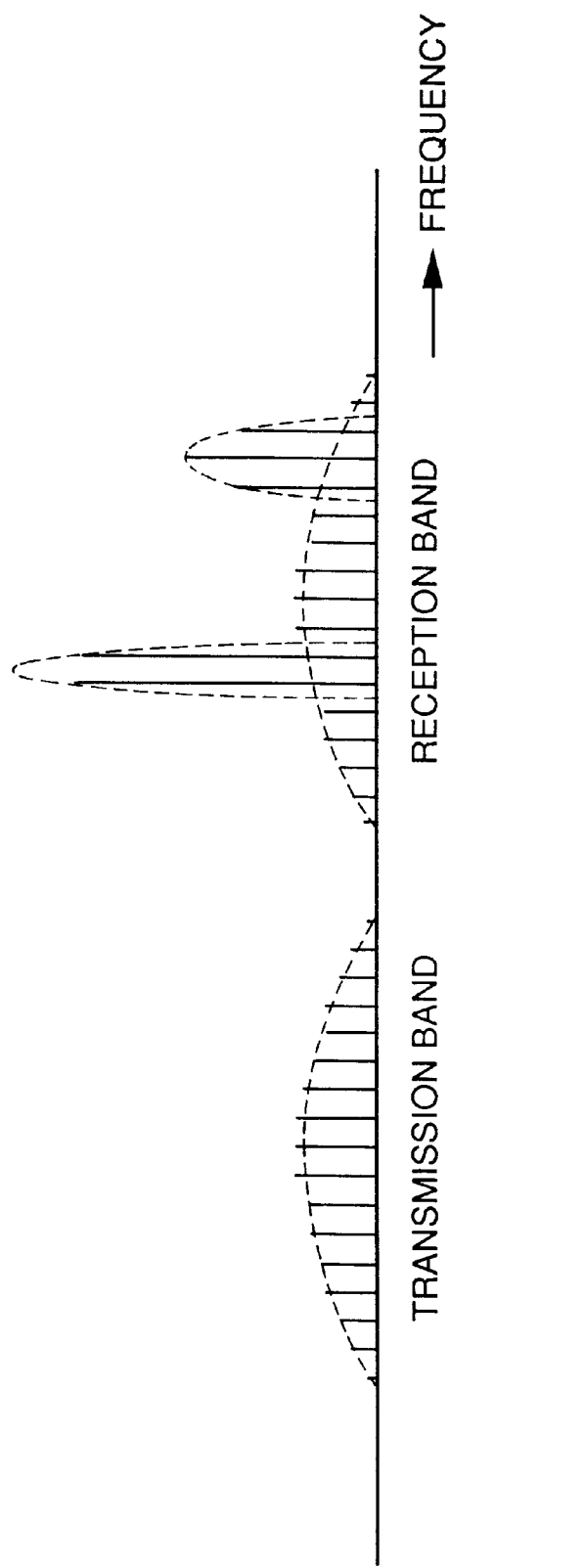
FIG. 36 shows spectrum waveform in a case where a narrow band interference wave exists in the reception band.

FIGS. 34 to 36 show waveforms in the transmission band and reception band in case a subunit transmits data to the main unit. FIG. 34 shows spectrum waveform in case where no narrow band interference wave exits in either of the transmission and reception bands. FIG. 35 shows spectrum waveform in case where narrow band interference wave exists in the transmission band. FIG. 36 shows spectrum waveform in case where narrow band interference wave exists in the reception band.

As shown in FIG. 35, if a narrow band interference wave exists in the transmission band from the subunit, the main unit receives the transmission signal from the subunit and detects the interference wave. If the detected interference wave value exceeds its allowable range value, the main unit performs the above-described communication halt process. If a narrow band interference wave exists in the reception band of the subunit, the subunit detects the interference wave. If the detected interference wave value exceeds its allowable range value, the subunit performs the above-described communication halt process. In this manner, the influence of the interference wave which appears unexpectedly can be suppressed.

As described above, this embodiment utilizes the generally-known characteristic of radiowave that easily varies its reception level by e.g. reflection. Before communication is started, the distance between the transmitting and receiving apparatuses is determined, and the marginal value and the allowable range value are changed in accordance with the ranging result. This realizes more exact interference wave detection with appropriate marginal value and appropriate allowable range value.

It should be noted that in this embodiment, the construction to detect interference wave in the reception band has been described, which does not pose any limitation upon the present invention. For example, before actual communication, interference wave detection regarding transmission band can be performed, and in accordance with the detection result, the allowable range value can be decided or communication starting can be delayed. In this case, processing speed can be improved by separating the A/D converter 614 and the FFT 615 into A/D converter and FFT for the transmission band and A/D converter and FFT for the reception band, as shown in FIGS. 34 to 36.

Further, in this embodiment, the apparatus has a full duplex communication type construction where the reception antenna and the transmission antenna are independently provided, however, the present invention is not limited to this construction. For example, a similar function can be realized using a half duplex communication type construction. It should be noted that in this case, it is necessary to have a dedicated reception antenna so that interference wave detection can always be made. In case where a plurality of frequency channels are used in the half duplex communication method, the apparatus can be equipped with a plurality of A/D converters and Fourier transformers for the respective channels so that a channel in which interference wave influence is the smallest can be selected. In this construction, line disconnection period due to communication halted status can be reduced.

[Eighth Embodiment (FIGS. 37–41)]

In this embodiment, a spread spectrum modulation communication apparatus divides a reception signal into a plurality of band zone signals and processes the divided signals independently. In the communication system according to this embodiment, a pair of communication apparatuses A and B have a corresponding construction and the reception signal is divided into signals for four band zones (band zones 1 to 4) in order to simplify the explanation.

Figure 37:
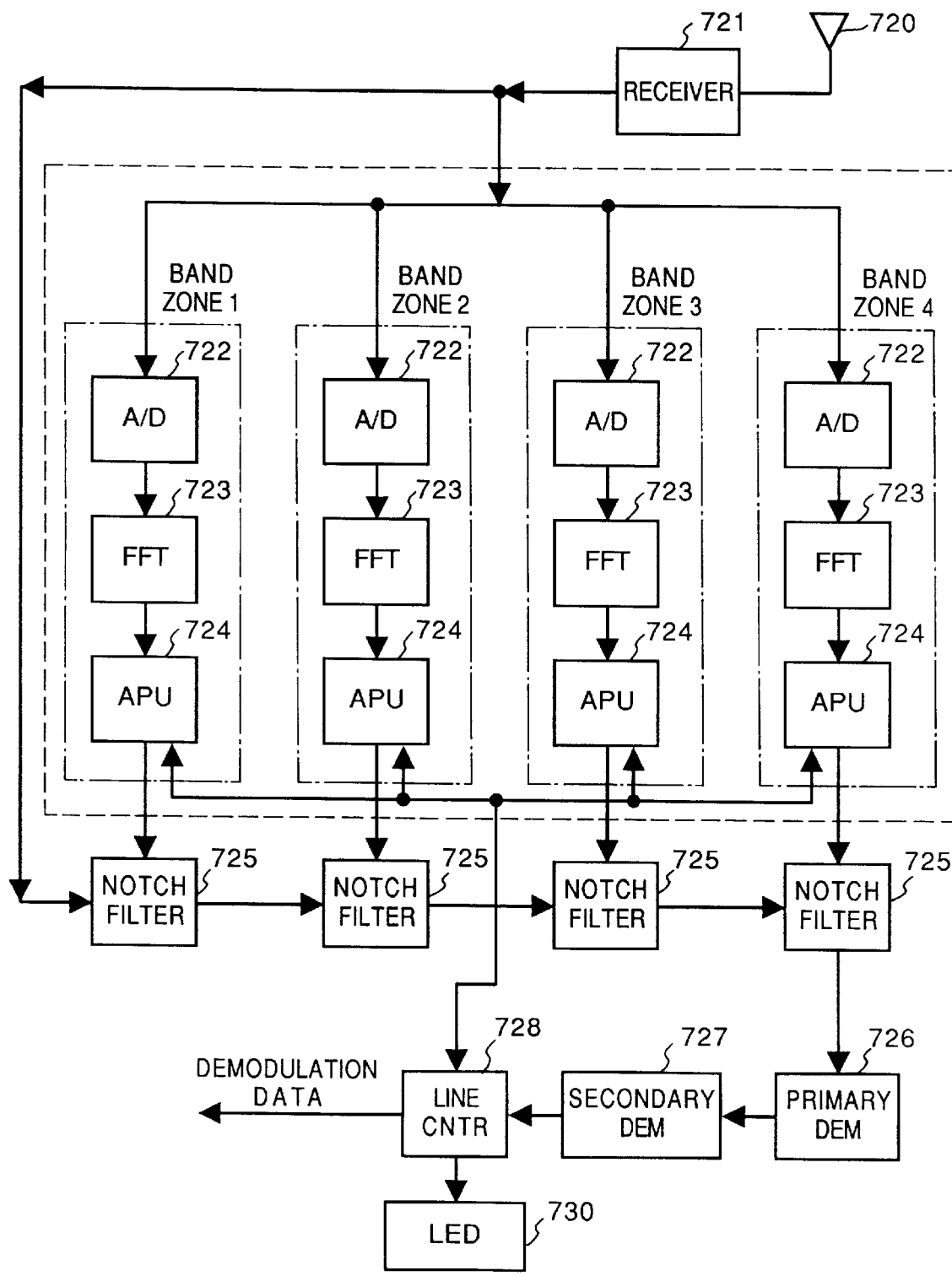
FIG. 37 is a block diagram showing the configuration of interference wave detector of a communication apparatus according to a eighth embodiment of the present invention.

FIG. 37 is a block diagram showing the configuration of an interference wave detector of a communication apparatus according to an eighth embodiment of the present invention. The apparatus divides a signal received by receiver 721 via reception antenna 720 into four band zone signals and processes the signals by A/D converters 722, FFT's 723 and arithmetic processing units (APU) 724 for the respective band zones in a parallel manner. Whether or not interference wave exists is judged in the respective band zone signals, and the APU's 724 perform on/off control of notch filters 725 for the respective band zones in accordance with the judgment results. Note that the A/D converters 722, the FFT's 723 and the APU's 724 are used as the interference detector.

On the other hand, the signal received by the receiver 721 enters primary demodulator 726 and secondary demodulator 727 via the respective notch filters 725 and further enters line controller 728. If interference wave influence is large, the line controller 728 which is connected to LED 730 turns on the LED 730 to notify a user of it.

In the apparatus having the above construction, when data reception has been correctly made, the reception data are stored into memories (not shown) integrated in the APU's 724. The stored data are used for comparison with input reception data newly inputted at another communication starting time. Detection of an interference wave in the respective bands are made by this comparison. Further, based on the detection results, the notch filter 725 of a band zone in which narrow band interference wave exists is turned on to prevent the reception input.

Figure 38:
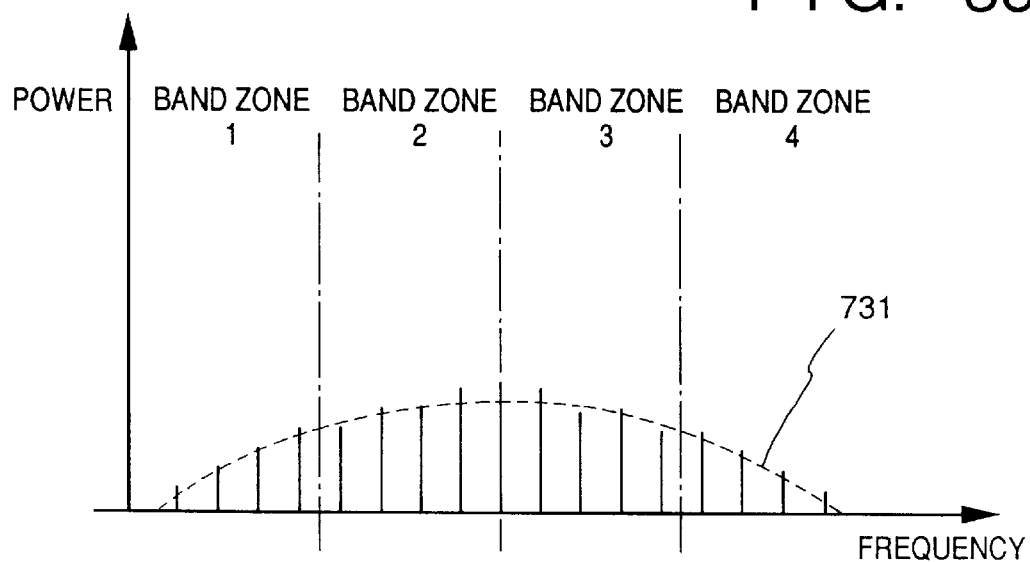
FIG. 38 shows spectrum distribution as an example of a judgment data for judging existence of narrow band interference wave.

FIG. 38 shows spectrum distribution as an example of judgment data for judging existence of narrow band interference wave. In FIG. 38, the vertical axis represents power of spectrum obtained by Fourier transformation; and the horizontal axis, frequency of the spectrum. Dotted line 731 is an envelope of spectrum from the FFT 723 when ideal reception data is obtained. The line 731 is used as a threshold line for interference wave detection, i.e., as judgment data.

This judgment data is made in the following manner.

Every time the communication apparatus A receives a signal from the communication apparatus B, the respective A/D converters 722 in the apparatus A perform A/D conversion to a divided band zone signal as well as data modulation. Thereafter, the respective FFT's 723 perform Fourier transformation to the A/D converted data. On the other hand, the line controller 728 notifies whether or not data has been demodulated to the APU's 724. The APU's 724 store the spectrum waveform data after Fourier transformation as judgment data with the information from the line controller 728 into the integrated memories. FIG. 38 shows the most ideal spectrum distribution as judgment data to be stored.

Next, a case where the apparatus A receives data from the apparatus B again is considered.

Similarly to the preparation of judgment data, the A/D converters 722 perform A/D conversion and the FFT's 723 perform Fourier transformation to the band zone signals, and the APU's 724 compare the spectrum data after Fourier transformation with judgment data stored in the memories of the APU's 724 to judge whether or not narrow band interference wave exists in the respective band zones. If a narrow band interference wave exists in a band zone, the APU 724 transmits a signal to operate the corresponding notch filter 725.

Figure 39:
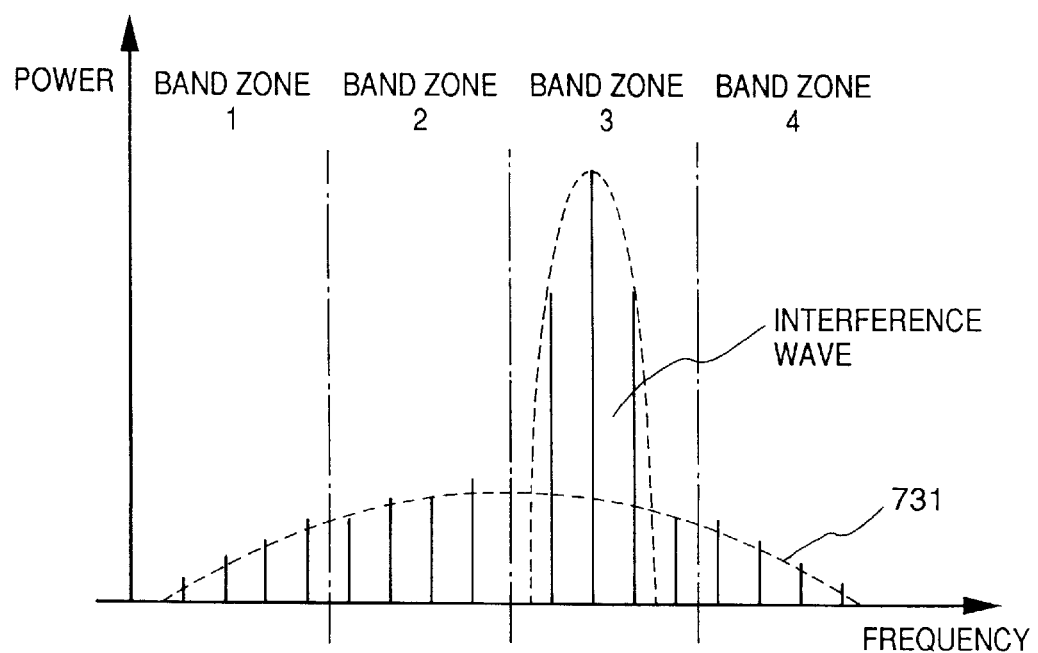
FIG. 39 shows spectrum distribution in case where a narrow band interference wave exists in band zone 3 of a reception data.

FIG. 39 shows spectrum distribution in a case in which a narrow band interference wave exists in band zone 3 of a reception data.

Figure 40:
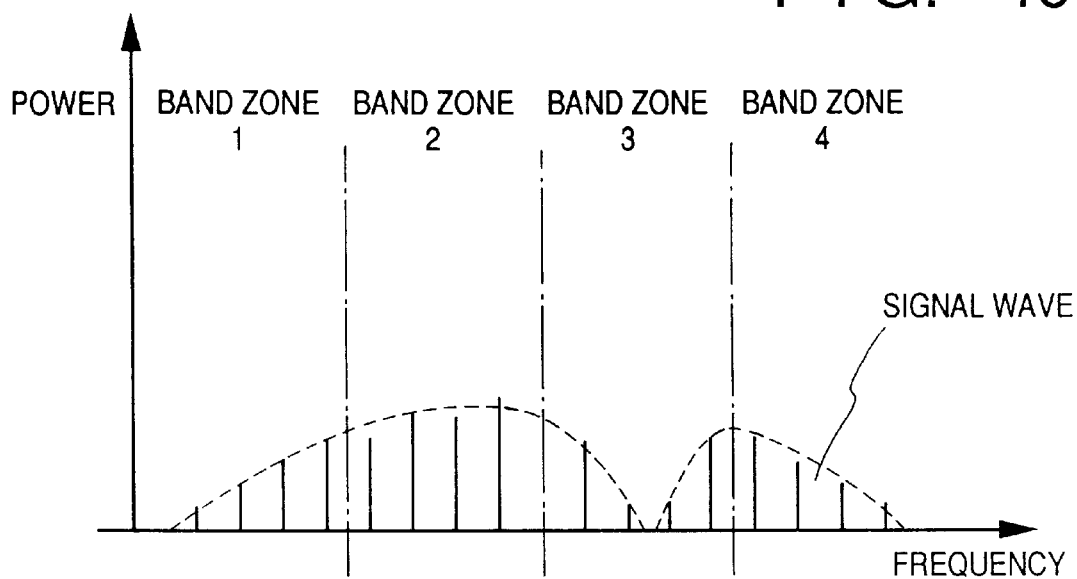
FIG. 40 shows spectrum distribution in case where the reception data in the band zone 3 is attenuated by notch filter 725.

In FIG. 39, the APU 724 for the band zone 3 detects the interference wave and operates the notch filter 725 for the zone 3 to attenuate the reception data in the zone 3. As a result, spectrum distribution as shown in FIG. 40 can be obtained.

In the interference wave detection and interference wave elimination as described above, if all the notch filters are not operated (e.g., only the notch filter 725 for the band zone 3 is operated) and the line controller 728 allows updating of judgment data, updating of judgment data stored in the memories of the APU's 724 is performed.

The line controller 728 issues a judgment data updating instruction to the APU 724 only if judges that data demodulation has been correctly performed.

Note that when no retransmission has been made, or when retransmission has been made but the number of retransmission was two or three, the line controller 728 also judges that correct data demodulation has been performed.

Accordingly, in this embodiment, a reception signal is divided into a plurality of band zone signals to be processed in a parallel manner and notch filters in the respective band zones are operated independently, the attenuation of the reception signal can be partially restricted.

In this embodiment, the interference wave elimination is performed upon reception. However, the present invention is not limited to this arrangement. For example, the apparatus can be constructed so that it can examine whether or not data transmission is interferred upon transmission.

In this case, e.g., before the apparatus A performs data transmission, the interference wave detector is operated to examine whether or not interference wave exists in the respective band zones. If the presence of interference wave is notified, the corresponding APU 724 judges whether or not the interference wave will cause errors in the current transmission, upon assumption that the receiving apparatus B also detects interference wave intensity which is approximately the same as that detected in the apparatus A. The judgment result is transmitted to the line controller 728, which, based on the judgment result, determines whether or not data transmission is possible. If it is possible, the line controller 728 performs normal data transmission. If impossible, it turns on the LED 730 to notify the user that data transmission is impossible, and stores the transmission data into a buffer memory (not shown) and waits till communication condition has recovered and line connection becomes possible.

The line controller 728 determines whether or not data transmission is possible using data stored in the memories of the APU's 724. More specifically, the line controller 728 adds the judgment data to Fourier-transformed interference wave data to generate an imaginary reception signal (signal which the apparatus B will probably receive) and infers whether or not this signal can be eliminated by the notch filters.

Figure 41:
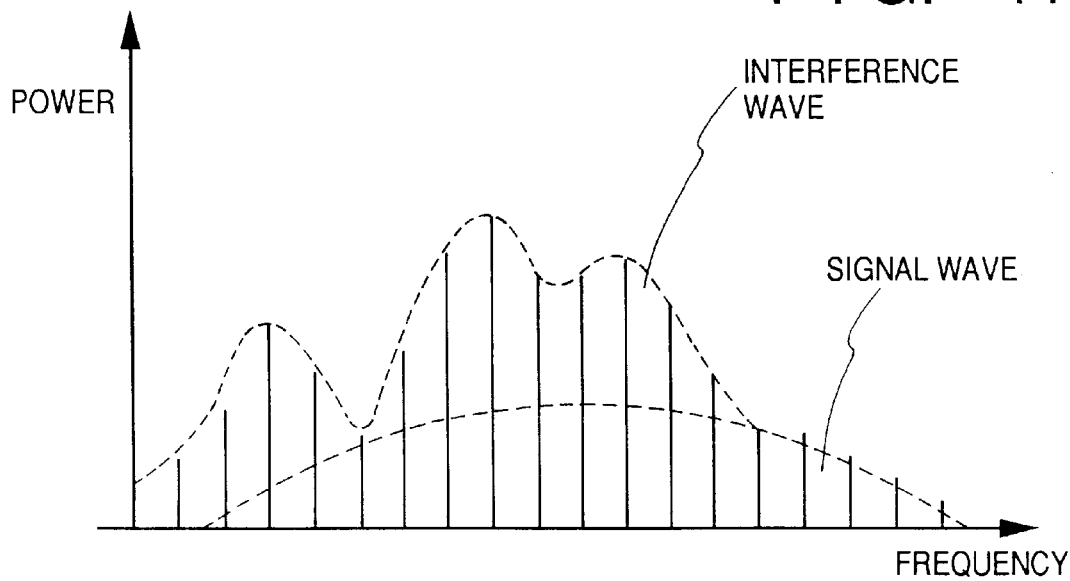
FIG. 41 shows reception signal waveform in a case where a wide band interference wave exists.

Further, in this embodiment, the reception wave band is divided into a plurality of band zones to generate judgment data for the respective band zones, and interference wave detection is made in the respective band zones. However, the present invention is not limited to this arrangement. For example, the whole band of the reception data can be A/D converted and Fourier-transformed and thus converted data can be used as judgment data in comparison with another reception data. In this case, attenuation of only a band zone where narrow band interference wave exists using a corresponding notch filter cannot be performed. However, regarding a wide band interference wave as shown in FIG. 41, this arrangement can perform effective interference elimination.

Further, in this embodiment, spectrum data in a case where communication has been correctly performed is stored into a memory as judgment data. However, spectrum data in a case where communication has not been correctly performed can be stored as judgment data for interference wave detection.

The present invention can be applied to a system constituted by a plurality of devices, or to an apparatus comprising a simple device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A reception apparatus comprising:
    receiving means for receiving a signal;
    detecting means for detecting reception results of a plurality of frequency bands received by said receiving means;
    storing means for storing reference data corresponding to the plurality of frequency bands;
    comparing means for comparing the reception results with the reference data; and
    elimination means for eliminating, from the reception results, a signal of a frequency band obtained from comparison results by said comparing means.

2. The apparatus according to claim 1, wherein said detecting means detects first reception results of the plurality of frequency bands in accordance with a first signal received by said receiving means at a first timing and second reception results of the plurality of frequency bands in accordance with a second signal received by said receiving means at a second timing, and said storing means stores the first reception results.

3. The apparatus according to claim 2, wherein said comparing means compares the second reception results with the first reception results, and said eliminating means eliminates, from the second reception results, the signal of the frequency band obtained from comparison results by said comparing means.

4. The apparatus according to claim 1, wherein said detecting means comprises transform means for performing Fourier Transform on the reception results; and
    said comparing means compares results from the Fourier Transform with the reference data.

5. The apparatus according to claim 1, wherein said eliminating means comprises:
    a plurality of serial-connected filter means; and
    selecting means for selecting at least one of the plurality of the serial-connected filter means in accordance with the comparison results by said comparing means.

6. A reception method comprising the steps of:
    receiving a signal;
    detecting reception results of a plurality of frequency bands received in said receiving step;
    storing reference data corresponding to the plurality of frequency bands;
    comparing the reception results with the reference data; and
    eliminating from the reception results, a signal of a frequency band obtained from comparison results in said comparing step.

7. The method according to claim 6, wherein said detecting step detects first reception results of the plurality of frequency bands in accordance with a first signal received in said receiving step at a first timing and second reception results of the plurality of frequency bands in accordance with a second signal received in said receiving step at a second timing; and
    said storing step stores the first reception results.

8. The method according to claim 7, wherein said comparing step compares the second reception results with the first reception results, and said eliminating step eliminates, from the second reception result, the signal of the frequency obtained from the comparison results in said comparing step.

9. The method according to claim 6, wherein said detecting step comprises a step of performing Fourier transform on the reception results; and
    said comparing step compares results from the Fourier Transform with the reference data.

10. The method according to claim 6, wherein said eliminating step comprises a step of selecting at least one of a plurality of serial-connected filters in accordance with the comparison results in said comparing step.

* * * * *

UNITED STATES PATENT AND TRADEMARK OFFICE
CERTIFICATE OF CORRECTION

PATENT NO. : 5,974,101
DATED : October 26, 1999
INVENTOR(S) : Hidetada Nago

It is certified that error appears in the above-identified patent and that said Letters Patent is hereby corrected as shown below:

Column 3, line 53, delete "a includes" and insert therefor -- $\underline{a}$ includes --.

Column 4, line 35, delete "terminal a" and insert therefor -- terminal $\underline{a}$ --.

Column 4, line 41, delete "terminal a" and insert therefor -- terminal $\underline{a}$ --.

Column 14, line 45, after "Further," delete "an".

Column 14. line 52, after "Further," insert -- an --.

Column 16, lines 62-63, after "of" delete "a".

Column 16, line 63, after "of" insert -- a --.

Column 20, line 34, delete "203/" and insert therefor -- 203$\ell$ --.

Column 20, line 36, delete "203/" and insert therefor -- 203$\ell$ --.

UNITED STATES PATENT AND TRADEMARK OFFICE
CERTIFICATE OF CORRECTION

PATENT NO. : 5,974,101
DATED : October 26, 1999
INVENTOR(S) : Hidetada Nago

It is certified that error appears in the above-identified patent and that said Letters Patent is hereby corrected as shown below:

Column 22, line 13, delete "203/" and insert therefor -- 203$\ell$ --

Column 20, line 32, delete "203/" and insert therefor -- 203$\ell$ --.

Column 28, line 48, delete "terminal a" and insert therefor -- terminal $\underline{a}$ --.

Column 28, line 66 delete "full".

Signed and Sealed this

Seventeenth Day of April, 2001

Attest:

NICHOLAS P. GODICI

Attesting Officer

Acting Director of the United States Patent and Trademark Office